(12) United States Patent
Lamontagne et al.

(10) Patent No.: US 9,246,341 B2
(45) Date of Patent: *Jan. 26, 2016

(54) MOBILE PRINTER NETWORKING AND INTERFACING

(71) Applicant: ZIH Corp., Lincolnshire, IL (US)

(72) Inventors: Michael L. Lamontagne, Johnston, RI (US); Hussam Eassa, Windham, NH (US); David F. Beck, Exeter, RI (US); Scott E. Lane, Rehoboth, MA (US); Patrick J. Hegarty, Dedham, MA (US); Michael Cranston, Carpentersville, IL (US); Craig A. Horrocks, Narragansett, RI (US); John Stevens, North Kingstown, RI (US); James Phillips, Medway, MA (US); Kevin M. Lemoi, Attleboro, MA (US); Gregory J. Klein, Wakefield, RI (US); Roy P. Lyman, Coventry, RI (US); Matthew D. Corvese, Warwick, RI (US)

(73) Assignee: ZIH Corp., Lincolnshire, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/269,987

(22) Filed: May 5, 2014

(65) Prior Publication Data

US 2014/0327927 A1 Nov. 6, 2014

Related U.S. Application Data

(63) Continuation of application No. 13/085,431, filed on Apr. 12, 2011, now Pat. No. 8,752,922.

(60) Provisional application No. 61/345,987, filed on May 18, 2010, provisional application No. 61/323,264, filed on Apr. 12, 2010.

(51) Int. Cl.
*H04N 1/034* (2006.01)
*H02J 7/00* (2006.01)

(Continued)

(52) U.S. Cl.
CPC ............ *H02J 7/0021* (2013.01); *B41J 3/36* (2013.01); *B41J 29/393* (2013.01); *G06F 3/1225* (2013.01);

(Continued)

(58) Field of Classification Search
CPC ........................ G06F 1/1683; G06F 3/1292
USPC ............................................................ 347/3
See application file for complete search history.

(56) References Cited

U.S. PATENT DOCUMENTS

| | | |
|---|---|---|
| 5,186,558 A | 2/1993 | Sherman et al. |
| 5,188,029 A | 2/1993 | Sugimoto et al. |

(Continued)

FOREIGN PATENT DOCUMENTS

| | | |
|---|---|---|
| DE | 36 09 789 A1 | 10/1987 |
| EP | 0 908 318 A2 | 4/1999 |

(Continued)

OTHER PUBLICATIONS

Moens et al., "Guest Editorial Introduction to the Special Issue on Smart Power Device Realiablity," IEEE Transactions on Device and Materials Reliability, 6(3):347-348, (2006).

(Continued)

*Primary Examiner* — Jannelle M Lebron
*Assistant Examiner* — Jeremy Bishop

(57) ABSTRACT

Provided herein are devices, methods and other means, including those related to printers, as well as computer readable media for storing code to execute instructions for a device, and other systems for providing and supporting mobile printing and other types of devices. The printer, for example, can be coupled with one or more docks and/or other accessory devices, examples of which are also discussed herein.

20 Claims, 28 Drawing Sheets

(51) Int. Cl.
  *B41J 3/36*     (2006.01)
  *B41J 29/393*   (2006.01)
  *G06F 3/12*     (2006.01)
  B41J 29/38      (2006.01)
  H04W 76/04      (2009.01)

(52) U.S. Cl.
  CPC ............ *G06F 3/1236* (2013.01); *G06F 3/1292* (2013.01); *H02J 7/0042* (2013.01); *H04W 76/04* (2013.01); *Y10T 29/49002* (2015.01)

(56) References Cited

U.S. PATENT DOCUMENTS

| | | |
|---|---|---|
| 5,209,374 A | 5/1993 | Seidl-Lichthardt |
| 5,267,800 A | 12/1993 | Petteruti et al. |
| 5,427,460 A | 6/1995 | Kajiya |
| 5,520,470 A | 5/1996 | Willett |
| 5,713,679 A | 2/1998 | Taylor |
| 5,820,068 A | 10/1998 | Hosomi et al. |
| 6,092,945 A | 7/2000 | Takami et al. |
| 6,095,704 A | 8/2000 | Jaeger et al. |
| 6,351,621 B1 | 2/2002 | Richards et al. |
| 6,491,459 B2 | 12/2002 | Hosomi |
| 6,505,981 B1 | 1/2003 | Takami et al. |
| 6,530,705 B1 | 3/2003 | Petteruti et al. |
| 6,607,316 B1 | 8/2003 | Petteruti et al. |
| 6,665,089 B1 * | 12/2003 | Austin et al. ................. 358/1.18 |
| 6,742,887 B2 | 6/2004 | Ando |
| 6,776,542 B1 | 8/2004 | Kearney |
| 6,789,969 B2 | 9/2004 | Hirabayashi et al. |
| 6,916,128 B1 | 7/2005 | Petteruti et al. |
| 6,962,292 B1 | 11/2005 | Benton et al. |
| 6,991,130 B2 | 1/2006 | Presutti et al. |
| 7,033,097 B2 | 4/2006 | Petteruti et al. |
| 7,066,754 B2 | 6/2006 | Beck et al. |
| 7,153,051 B2 | 12/2006 | Takahashi |
| 7,286,260 B2 | 10/2007 | Silverbrook |
| 7,287,850 B2 | 10/2007 | Matsui et al. |
| 7,306,386 B2 | 12/2007 | Lyman et al. |
| 7,347,543 B2 | 3/2008 | Kan et al. |
| 7,489,902 B2 * | 2/2009 | Amani et al. ................. 455/63.1 |
| 7,500,732 B2 | 3/2009 | James et al. |
| 7,578,332 B2 | 8/2009 | Murata et al. |
| 7,695,206 B2 | 4/2010 | Kawakami et al. |
| 7,871,009 B1 | 1/2011 | Blonigen et al. |
| 7,989,969 B2 * | 8/2011 | Grant et al. ................. 290/1 A |
| 8,752,922 B2 * | 6/2014 | Lamontagne et al. ............ 347/3 |
| 2006/0046543 A1 | 3/2006 | Fujii |
| 2006/0250480 A1 | 11/2006 | King et al. |
| 2007/0052991 A1 | 3/2007 | Goodman et al. |
| 2007/0066343 A1 | 3/2007 | Silverbrook et al. |
| 2008/0075513 A1 | 3/2008 | Robertson et al. |
| 2008/0298870 A1 | 12/2008 | Tsirline et al. |
| 2009/0317161 A1 * | 12/2009 | Vo et al. ........................ 400/207 |

FOREIGN PATENT DOCUMENTS

| | | |
|---|---|---|
| EP | 1 647 406 A1 | 4/2006 |
| EP | 1 679 198 A2 | 7/2006 |
| EP | 1 679 199 A2 | 7/2006 |
| EP | 2 322 435 A2 | 5/2011 |
| JP | 2001 106216 A | 4/2001 |
| JP | 2006 264313 A | 10/2006 |
| WO | WO 01/38098 A2 | 5/2001 |
| WO | WO 2005/042351 A1 | 5/2005 |
| WO | WO 2008/034018 A2 | 3/2008 |

OTHER PUBLICATIONS

Norford et al., "Near-Term Technology Review of Electronic Office Equipment," IEEE, pp. 1355-1362, (1993).
Nordman et al. "Save energy in Ethernet devices: network connectivity proxying enables existing power-management features to be utilizied more efficiently," Communications News, Nelson Publishing, 2 pages, (2008). [Retrieved from the Internet Dec. 2, 2010.
Partial PCT Search Report for International Application No. PCT/US2011/032167, mailed May 2, 2012.
Partial PCT Search Report for International Application No. PCT/US2011/032190, mailed Jun. 28, 2011.
Partial PCT Search Report for International Application No. PCT/US2012/071720, mailed Sep. 4, 2013.
PCT Search Report and Written Opinion for International Application No. PCT/US2011/032179, mailed Jun. 14, 2011.
PCT Search Report for International Application No. PCT/US2011/032167, mailed Aug. 29, 2012.
PCT Search Report for International Application No. PCT/US2011/032190, mailed Mar. 20, 2012.
Webber et al., "After-Hours Power Status of Office Equipment in the USA," Lawrence Berkeley National Laboratory, Energy Analysis Department, Environmental Energy Technologies Division, Berkeley, CA, 41 pages, (2005).

* cited by examiner

| Ethernet PHY in the Printer BUT the Magnetics in the Docking Cradle. | | USB HOST to Ethernet PHY and Magnetics in the Docking Cradle. | | Ethernet PHY and Magnetics in the Docking Cradle. | | USB HOST to External (non-Zebra) Ethernet "dongle". | |
|---|---|---|---|---|---|---|---|
| 1 | DOCKED# | 1 | DOCKED# | 1 | DOCKED# | 1 | DOCKED# |
| 2 | (+)CHARGE | 2 | (+)CHARGE | 2 | (+)CHARGE | 2 | (+)CHARGE |
| 3 | (+)CHARGE | 3 | (+)CHARGE | 3 | (+)CHARGE | 3 | (+)CHARGE |
| 4 | (-)CHARGE)GROUND) | 4 | (-)CHARGE)GROUND) | 4 | (-)CHARGE)GROUND) | 4 | (-)CHARGE)GROUND) |
| 5 | (-)CHARGE)GROUND) | 5 | (-)CHARGE)GROUND) | 5 | (-)CHARGE)GROUND) | 5 | (-)CHARGE)GROUND) |
| 6 | I²C_SCL | 6 | I²C_SCL | 6 | I²C_SCL | 6 | I²C_SCL |
| 7 | I²C_SCL | 7 | I²C_SCL | 7 | I²C_SCL | 7 | I²C_SCL |
| 8 | FEC_TRANSMIT(+) | 8 | USB_D(+) | 8 | FEC_TX_EN | 8 | GROUND |
| 9 | FEC_TRANSMIT(-) | 9 | USB_D(-) | 9 | FEC_TDATA0 | | |
| 10 | FEC_RECEIVE(+) | 10 | USB_VBUS | 10 | FEC_TDATA1 | | |
| 11 | FEC_RECEIVE(-) | 11 | USB_ID | 11 | FEC_RX_DV | | |
| 12 | FEC_LED_LINK | 12 | GROUND | 12 | FEC_CRS_DV | | |
| 13 | DEC_LED_SPEED | | | 13 | FEC_RX_ERR | | |
| 14 | GROUND | | | 14 | FEC_RDATA0 | | |
| 15 | POWER_BUTTON | | | 15 | FEC_RDATA1 | | |
| 16 | GROUND | | | 16 | FEC_MDIO | | |
| | | | | 17 | FEC_MDC | | |
| | | | | 18 | FEC_50HHZ_CLK | | |
| | | | | 19 | GROUND | | |

FIG. 16

| INTERFACE | SIGNAL | DESCRIPTION | 15 | 12 | 8 | 10 | 10 | 10 | 13 | 5 | 5 | 5 | 5 |
|---|---|---|---|---|---|---|---|---|---|---|---|---|---|
| DOCKED | DOCK# | DOCKED SIGNAL | X | X | X | X | X | X | X | X | X | X | X |
| BATTERY | BATT(+) | CHARGE(+) | X | X | X | X | X | X | X | X | X | X | X |
|  | BATT(+) | CHARGE(+) | X | X | X | X | X | X | X | X | X | X | X |
|  | BATT(-) | GROUND | X | X | X | X | X | X | X | X | X | X | X |
|  | BATT(-) | GROUND | X | X | X | X | X | X | X | X | X | X | X |
| ETHERNET | TX(+) | TRANSMIT (+) | X | X |  |  |  |  |  |  |  |  |  |
|  | TX(-) | TRANSMIT (-) | X | X |  |  |  |  |  |  |  |  |  |
|  | RX(+) | RECEIVE (+) | X | X |  |  |  |  |  |  |  |  |  |
|  | RX(-) | RECEIVE (-) | X | X |  |  |  |  |  |  |  |  |  |
|  | LINK LED | LINK LED | X | X |  |  |  |  |  |  |  |  |  |
|  | SPEED LED | SPEED LED | X | X |  |  |  |  |  |  |  |  |  |
|  | GND | GROUND | X | X |  |  |  |  |  |  |  |  |  |
| I2C | SDA | S-DATA | X |  | X |  |  |  | X |  |  |  |  |
|  | SCL | S-CLOCK | X |  | X |  |  |  | X |  |  |  |  |
|  | GND | GROUND | X |  | X |  |  |  | X |  |  |  |  |
| SPI | DI | DATA IN |  |  |  | X |  |  |  |  |  |  |  |
|  | DO | DATA OUT |  |  |  | X |  |  |  |  |  |  |  |
|  | CLK | CLOCK |  |  |  | X |  |  |  |  |  |  |  |
|  | CS | SELECT |  |  |  | X |  |  |  |  |  |  |  |
|  | GND | GROUND |  |  |  | X |  |  |  |  |  |  |  |
| RS232 | TXD | TRANSMIT |  |  |  |  |  | X |  |  |  |  |  |
|  | RXD | RECEIVE |  |  |  |  |  | X |  |  |  |  |  |
|  | RTS | Request To Send |  |  |  |  |  | X |  |  |  |  |  |
|  | CTS | Clear To Send |  |  |  |  |  | X |  |  |  |  |  |
|  | GND | GROUND |  |  |  |  |  | X |  |  |  |  |  |
| USB | D(+) | DATA (+) |  |  |  |  |  |  |  | X | X |  |  |
|  | D(-) | DATA (-) |  |  |  |  |  |  |  | X | X |  |  |
|  | VBUS | BUS VOLTAGE |  |  |  |  |  |  |  | X | X |  |  |
|  | ID | HOST ID |  |  |  |  |  |  |  | X | X |  |  |
|  | GND | GROUND |  |  |  |  |  |  |  | X | X |  |  |

FIG. 17

MOBILE PRINTER NETWORKING AND INTERFACING

CROSS-REFERENCE TO RELATED APPLICATIONS

This application is a continuation application of U.S. patent application Ser. No. 13/085,431, filed Apr. 12, 2011 which claims the benefit of U.S. Provisional Application No. 61/345,987, filed May 18, 2010, and U.S. Provisional Application No. 61/323,264, filed Apr. 12, 2010, which are all herein incorporated by reference in their entireties.

FIELD

Embodiments discussed herein are related to printers and, more particularly, to systems, methods, apparatuses, computer readable media products and other means for providing mobile printer networking and related functionality.

BACKGROUND

Printers are designed and known to be used in traditional office environments. Some printers have a more portable design that allows them to be used for many other applications beyond traditional office printing, such as printing customer receipts at the point of delivery, price tags at product display shelves, shipment labels, parking garage receipts, adhesive labels, law enforcement tickets, and gas and utility inspection documents at people's homes. Through applied effort, ingenuity, and innovation, various printer improvements are embodied by the present invention, examples of which are discussed below.

SUMMARY

Some embodiments discussed herein are related to a printer, dock and/or other electrical devices that can comprise a battery interface configured to receive power from at least two types of batteries. The battery interface can comprise at least two contacts. The first contact can be, for example, a chemistry pin that is unused when a first type of battery is installed in the device, but used with the second type of battery installed in the device. The second contact can be, for example, a charging pin that is used with both the first type of battery and the second type of battery.

In addition to the battery interface, the device can include control circuitry configured to determine whether the first contact is coupled to a battery, determine whether the second contact is coupled to the battery, determine whether the battery coupled with the battery interface is of the second type based on the first signal and the second signal, and/or operate in a smart battery mode in response to determining the battery is of the second type, among other things. Instructions describing functionality associated with the mode can be stored in memory (e.g., that is included in the printer, included in the battery, and/or stored remotely at a network database). A smart battery, for example, can provide a higher voltage and include its own circuitry (e.g., control circuitry, communications circuitry and/or memory, among other things), and the smart battery mode of the printer can cause the printer to be configured to utilize these features of the smart battery. For example, a smart battery can provide additional information to the printer, which the printer may be configured to process and/or transmit (e.g., relay) to the network for fleet management purposes.

When the second contact is unused, the device can determine the battery is of the first type and be configured to operate in a traditional battery mode. For example, the device can draw or provide power without attempting further communications with the battery. The amount of power drawn can also be determined by the printer's mode. For example, the traditional battery mode may draw or provide lower power from/to the battery than when in smart battery mode. Instructions describing functionality associated with the traditional battery mode can be stored in memory (e.g., that is included in the printer and/or stored remotely at a network database).

Some embodiments may also include a printer, comprising: a battery; a wireless communications component; an interface component and control circuitry. The interface component can be configured to electrically or electromechanically couple (sometimes referred to herein as "mating") with a docking station and/or facilitate a wired network connection.

The control circuitry can be configured to determine when the interface component is mated with the docking station. In response to determining the interface component is mated with the docking station, the control circuitry can be further configured to: cease wireless communications with the wireless communications component; facilitate wired communications with a remote network server via the interface component, the wired communications including communications to determine whether an update is available for the printer; determine whether the battery is to be charged via the interface component; and in response to determining the battery is to be charged, facilitate the charging of the battery.

The control circuitry can be further configured to disable printing functionality of the printer in response to determining the interface component is mated with the docking station.

The control circuitry can be further configured to determine the interface component is mated with the docking station in response to receiving a signal from a docking indicator pin included in the interface component. The docking indicator pin may be and/or function the same or similar to the battery type indicator contact discussed above (e.g., the chemistry pin). In response to being docked, a signal provided over the docking indicator pin can cause the generation of an interrupt command.

The printer's control circuitry can be further configured to initiate wireless communications using the wireless communications component in response to determining the interface component has been unmated with the docking station. A determination can be made that the printer has been unmated with the docking station when, for example, the printer stops receiving a signal from the docking indicator pin, an undocking signal is received, power from the dock is discontinued and/or any combination thereof, among other things.

Wired communications can be conducted while the printer is docked. For example, the wired communications may include downloading of printer firmware, updating printer configurations, downloading of printer fonts and graphics (and/or other copyrighted or protected information), facilitating diagnostic testing of the printer from a remote machine (such as a networked host device), and performing remote management of the printer (e.g., a remote host device providing technical support to the printer), among other things. Some of the actions executed over the wired communications may be prohibited by the printer and/or the other device(s) in the system. The wired communications may also include functionality that can be provided wirelessly.

The control circuitry of the printer can be configured to provide information about the battery to a remote machine. For example, the battery information can include the battery's age, the battery's charge level, a health indicator associated with the battery, and an indication as to whether reconditioning is recommended for the battery, among other things.

Some embodiments may also include a system comprising two or more printers, where the first printer comprises: printing components configured to facilitate the printing of indicia; a first communications component configured to facilitate network communications with a source device; a second communications component configured to facilitate communications with a second printer; and control circuitry. The control circuitry can be configured to: receive print instructions from the first communications component; control the printing components to print indicia based on the print instructions; receive a command from the first communications component; determine that the command is for the second printer; and in response to determining the command is for the second printer, routing the command to the second printer via the second communications port.

The first communications component can be configured to provide wireless communications. In some embodiments, the second communications component can be configured to provide wired communications, such as those via a universal serial bus ("USB") connection component. In some embodiments, the second communications component can be configured to provide wireless communications, such as those that use a Bluetooth connection component.

The second printer can include its own: printing components that are configured to facilitate the printing of indicia; at least two communications component(s) configured to facilitate network communications with the first printer, including receiving a print and/or other commands from the first printer as well as to facilitate communications with a third printer included in the system; and control circuitry configured to route data to the third printer via the second printer's communications port. The second printer's control circuitry can be further configured to receive one or more commands from the first printer's communications component(s); determine that the command is also for the third printer; and in response to determining the command is for the third printer, routing the command to the third printer via the second communications port.

The first printer can be configured to be a Bluetooth master device and the second printer and the third printer can be configured to be Bluetooth slave devices. In some embodiments, the first printer can be installed on a mobile print cart with or without the second and/or third printers.

Some embodiments discussed herein also include a component of a device comprising: an electrical interface component comprising at least 10 and no more than 19 individual electrical contacts, wherein the individual electrical contacts are arranged in a single linear row and each of the individual electrical contacts is electrically isolated from the others; and a mechanical interface comprising at least one receptacle configured to receive a protrusion included on a second device. The second device can include, for example, a dock. The component can be included in a printer configured to mate with the dock. The component can be a base portion of the printer configured to attach to various sized housing defining portions of printers, wherein the defining portions are each configured to receive a specific width of label roll that may differ from others of the defining portions. The component can also be configured to enable the printer, regardless of the size of the printer's defining portion, to mate with an accessory device that is also mate-able to a different sized printer having a similar base portion as the component. The defining portions of the printers can have a similar whistle shape, despite being different sizes. The defining portion can also be configured to protect the base component on all but one side (e.g., five sides of six sides), leaving only one side of the base component exposed to direct contact caused by dropping, among other things. The base component can further comprise a battery receptacle and/or battery interface component and/or circuitry.

Some embodiments may also include an interface component of a dock comprising: an electrical interface component comprising at least 10 and no more than 19 individual electrical contacts, wherein the individual electrical contacts are arranged in a single linear row and each of the individual electrical contacts is electrically isolated from the others; and a mechanical interface comprising at least one protrusion configured to engage a receptacle included in a second device. The second device can be a printer with which the dock is configured to mate. The dock can also be configured to mate with various sized and/or shaped printers.

BRIEF DESCRIPTION OF THE SEVERAL VIEWS OF THE DRAWING(S)

The patent or application file contains at least one drawing executed in color. Copies of this patent or patent application publication with color drawing(s) will be provided by the Office upon request and payment of the necessary fee.

Having thus described the invention in general terms, reference will now be made to the accompanying drawings, which are not necessarily drawn to scale, and wherein:

Figure 6A:
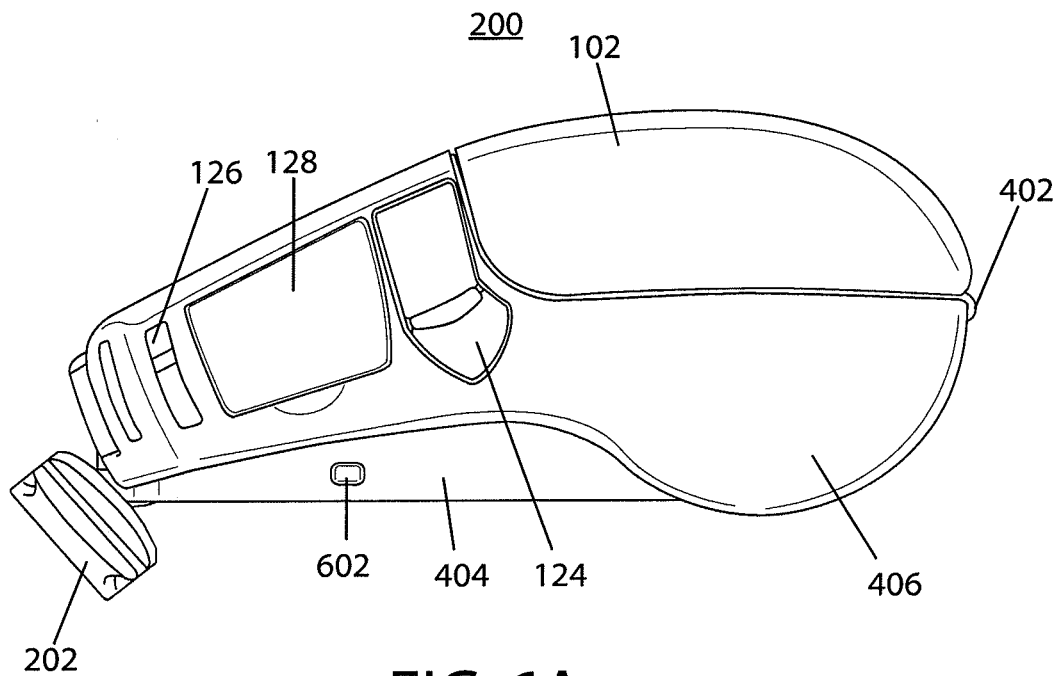
Figure 6B:
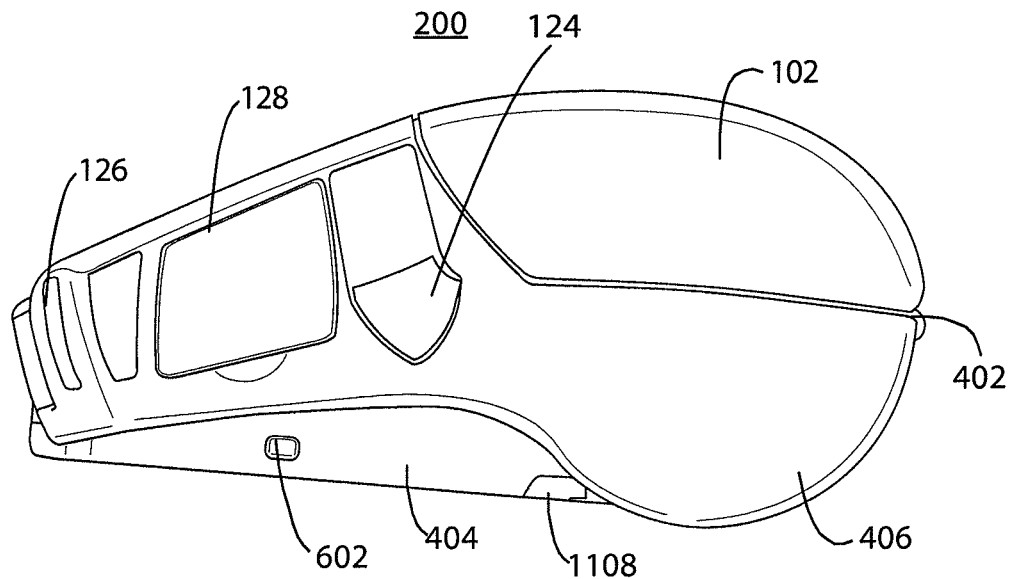
Figure 7B:
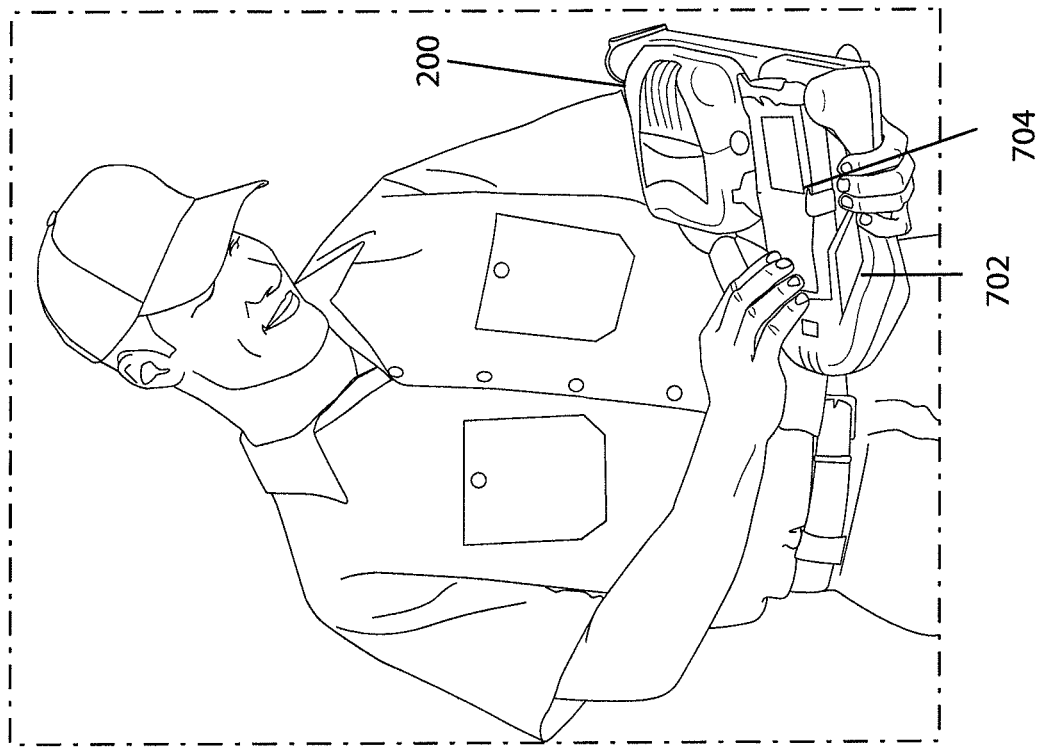
Figure 7A:
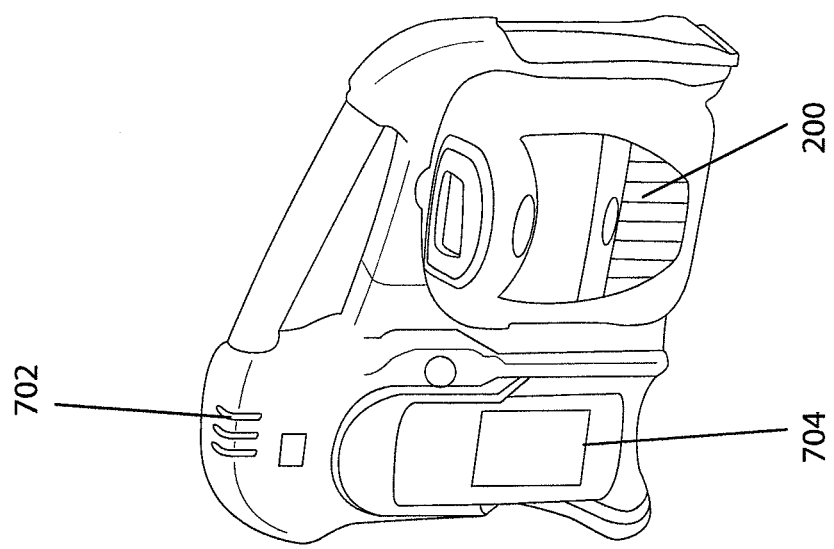
Figure 8:
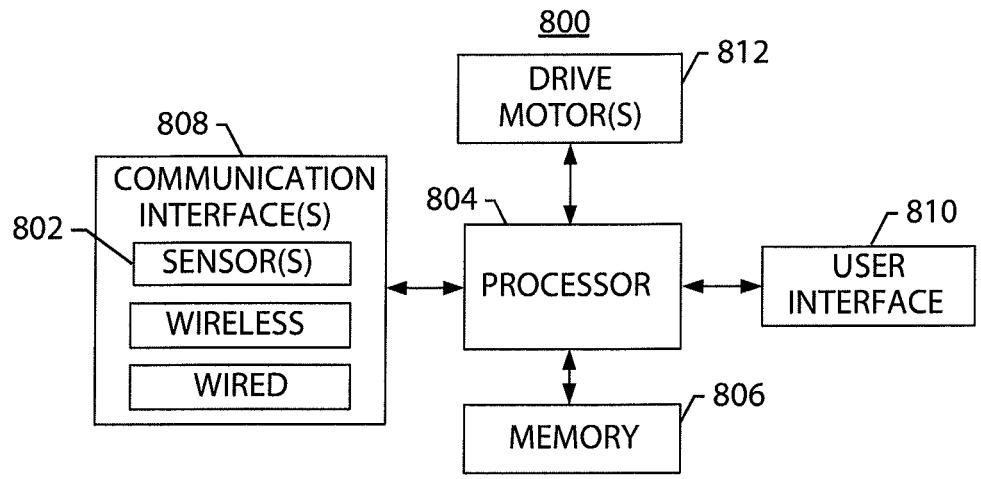
Figure 9:
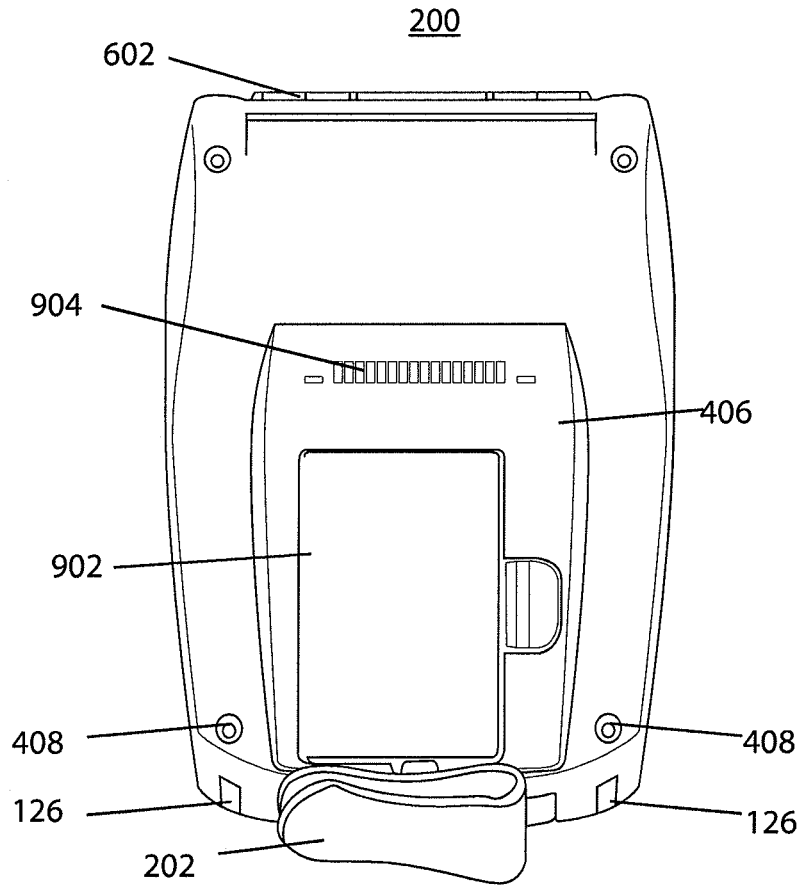
Figure 10B:
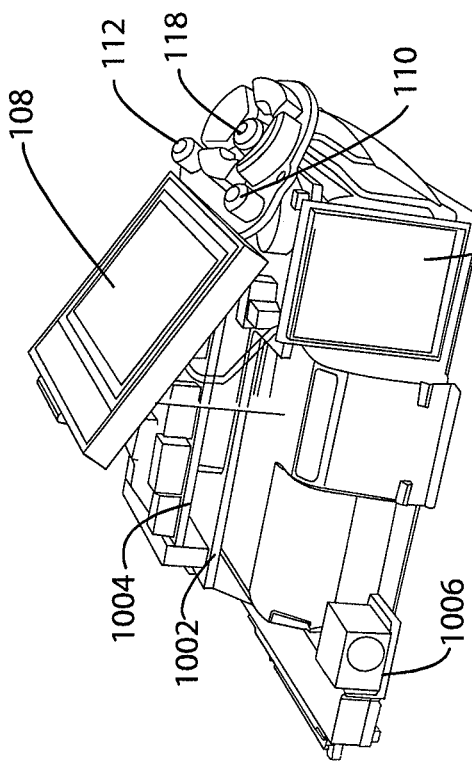
Figure 10A:
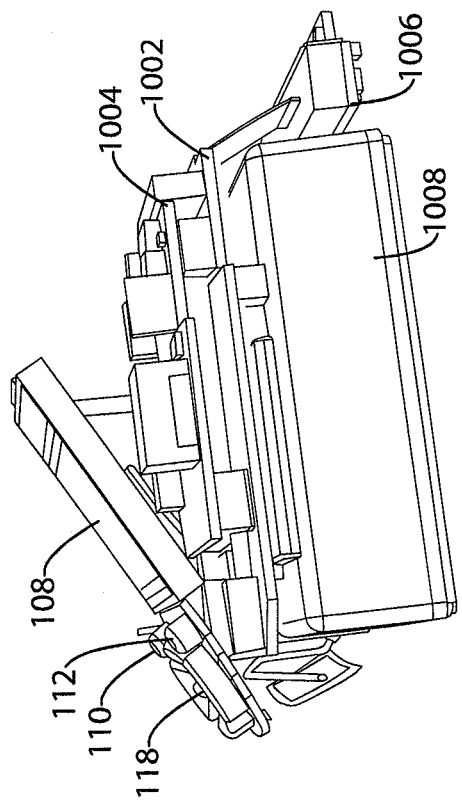
Figure 10D:
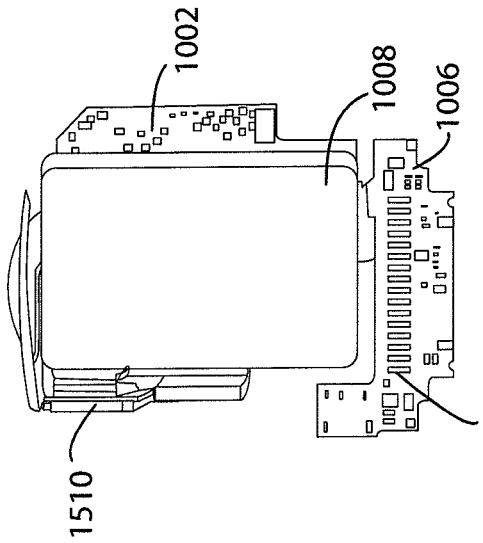
Figure 10C:
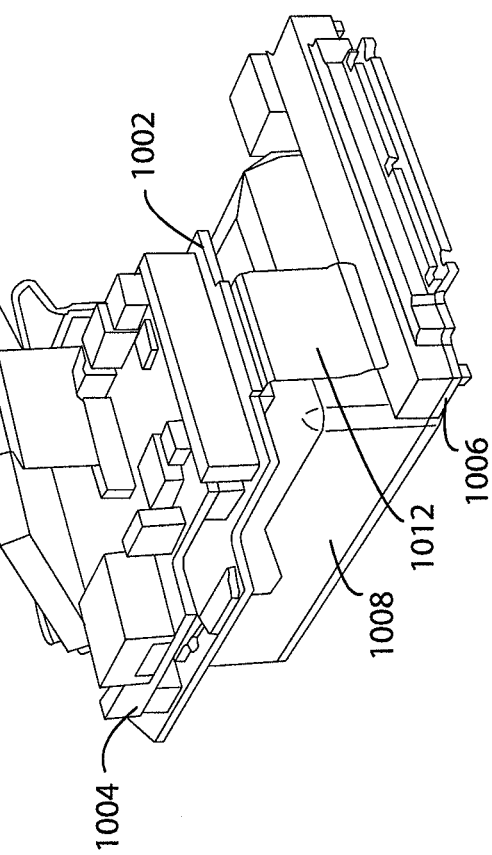
Figure 10E:
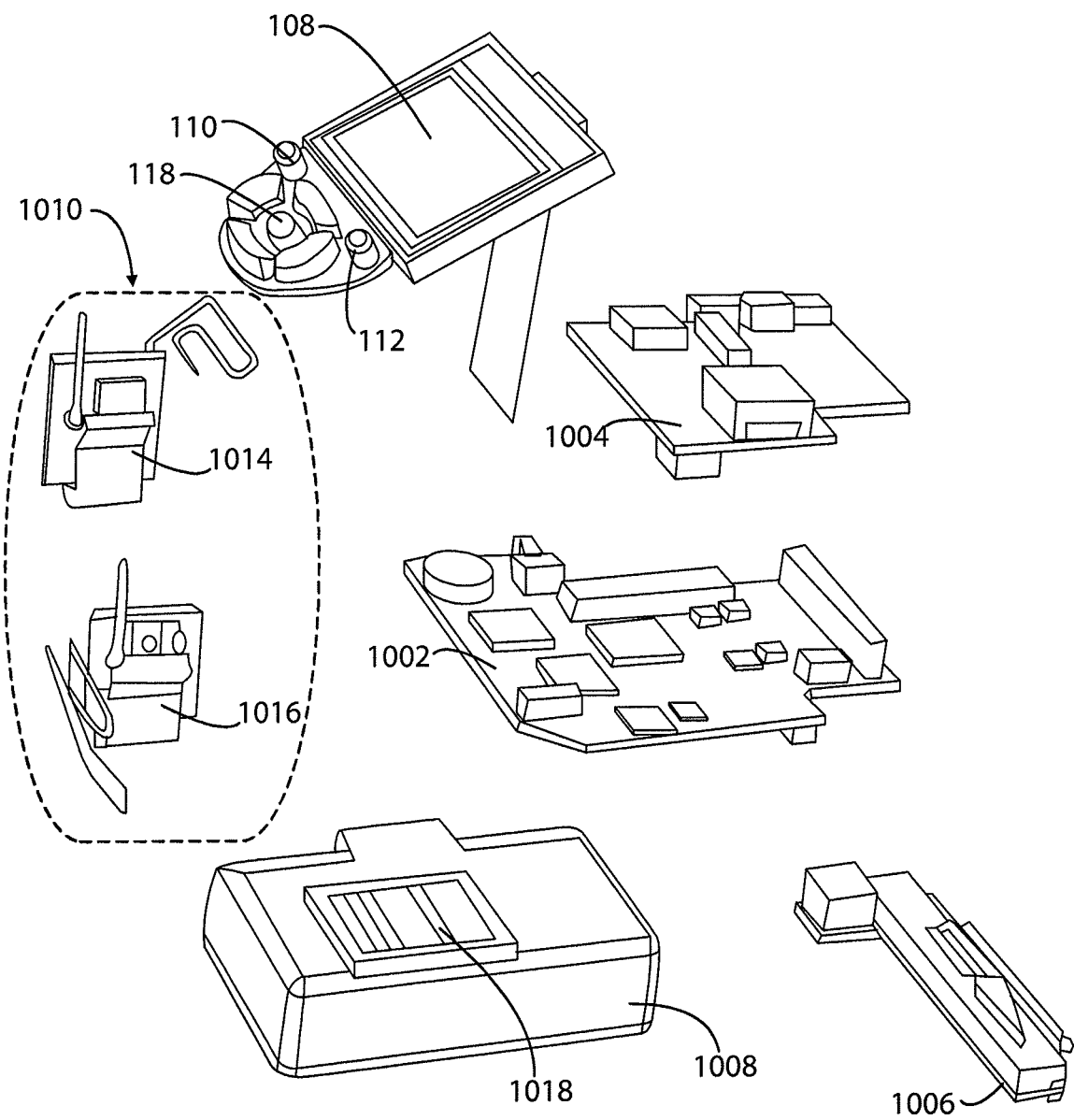
Figure 11A:
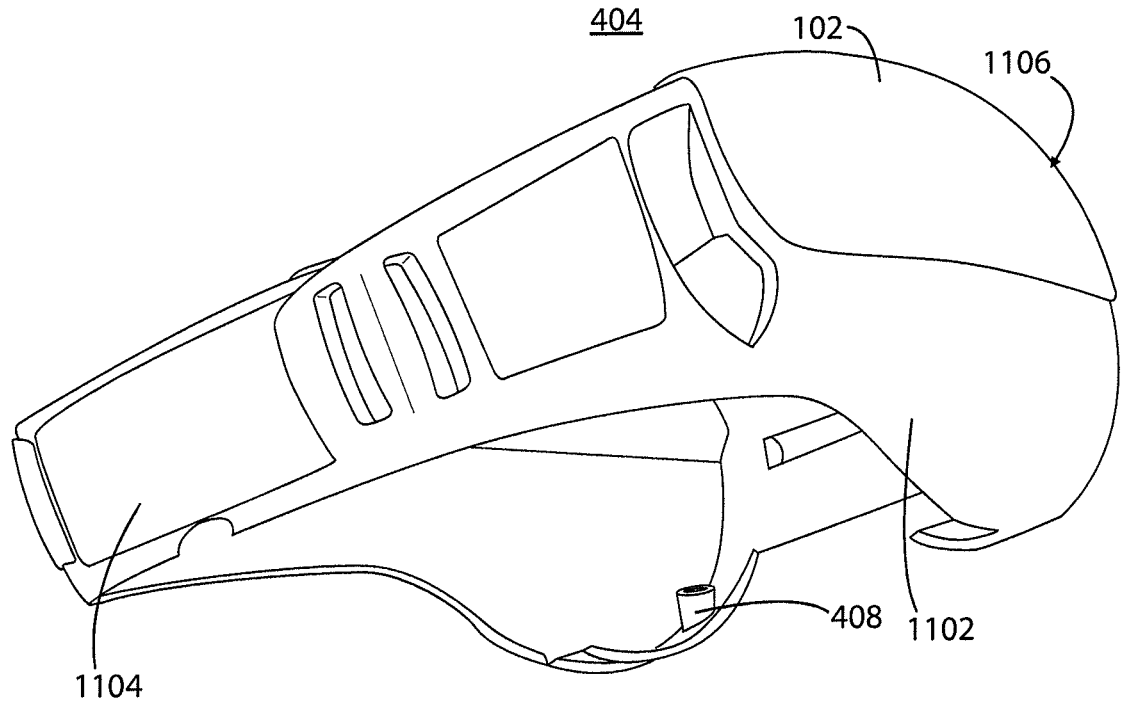
Figure 11B:
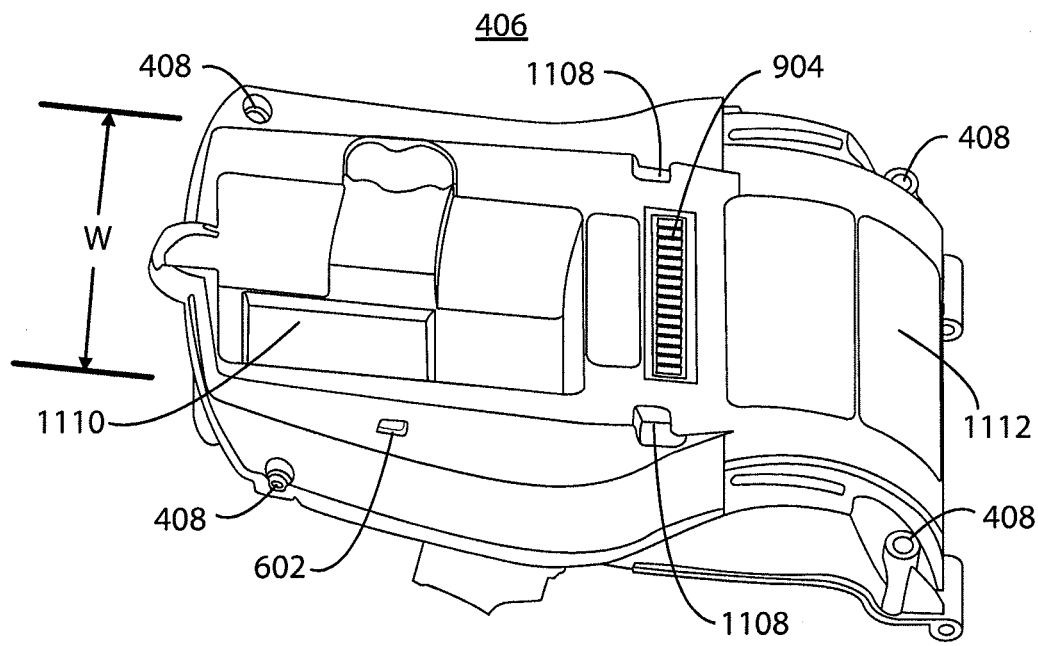
Figure 12A:
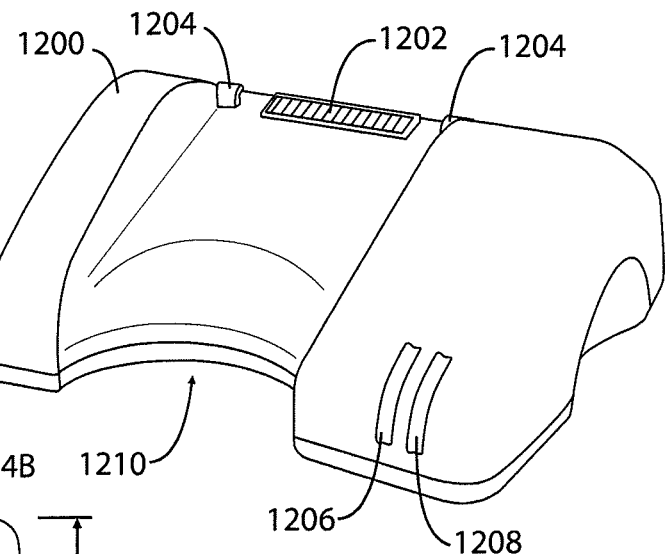
Figure 12B:
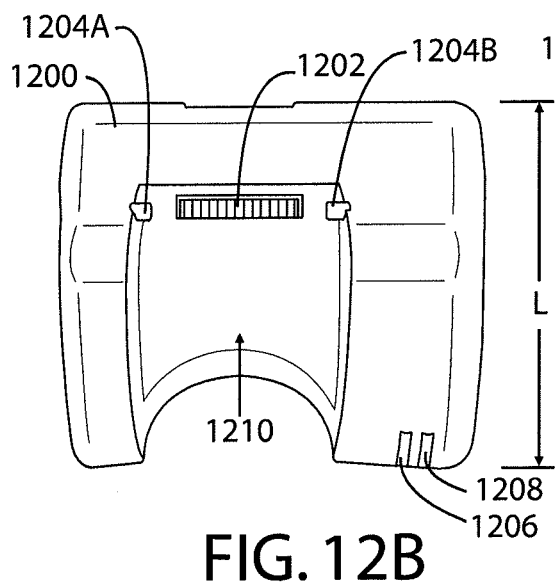
Figure 12C:
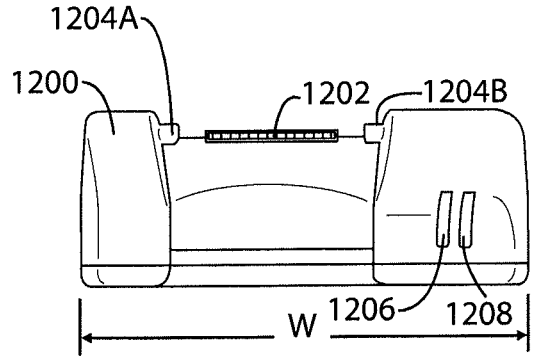
Figure 12D:
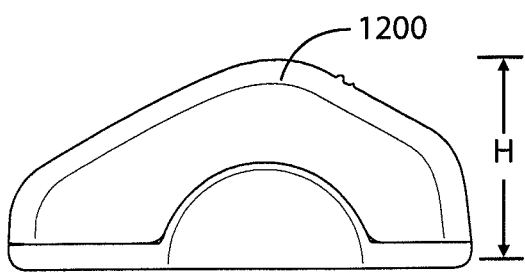
Figure 12E:
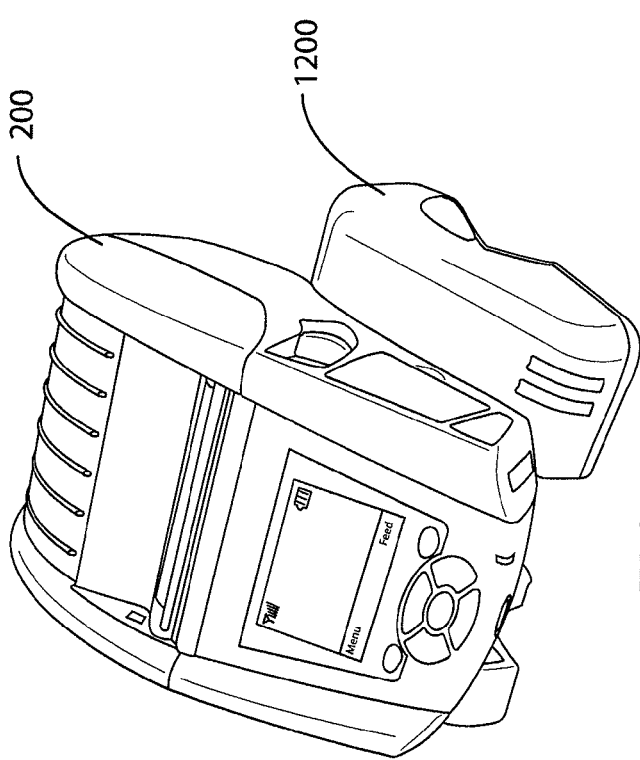
Figure 12H:
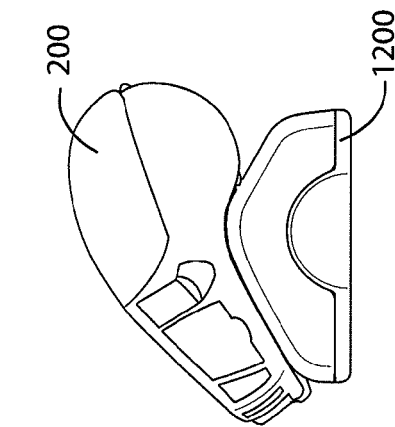
Figure 12G:
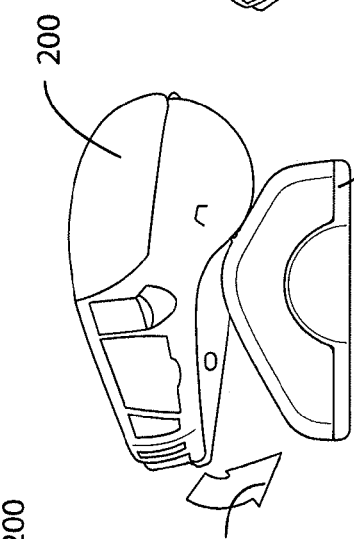
Figure 12F:
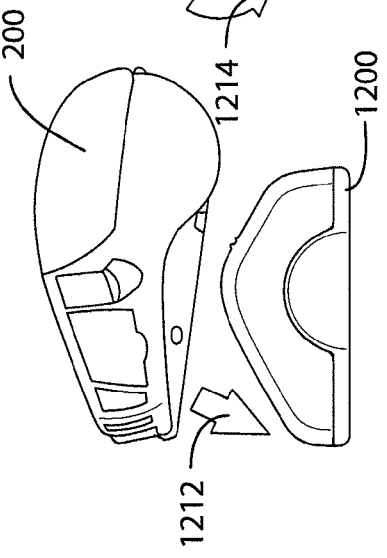
Figure 12I:
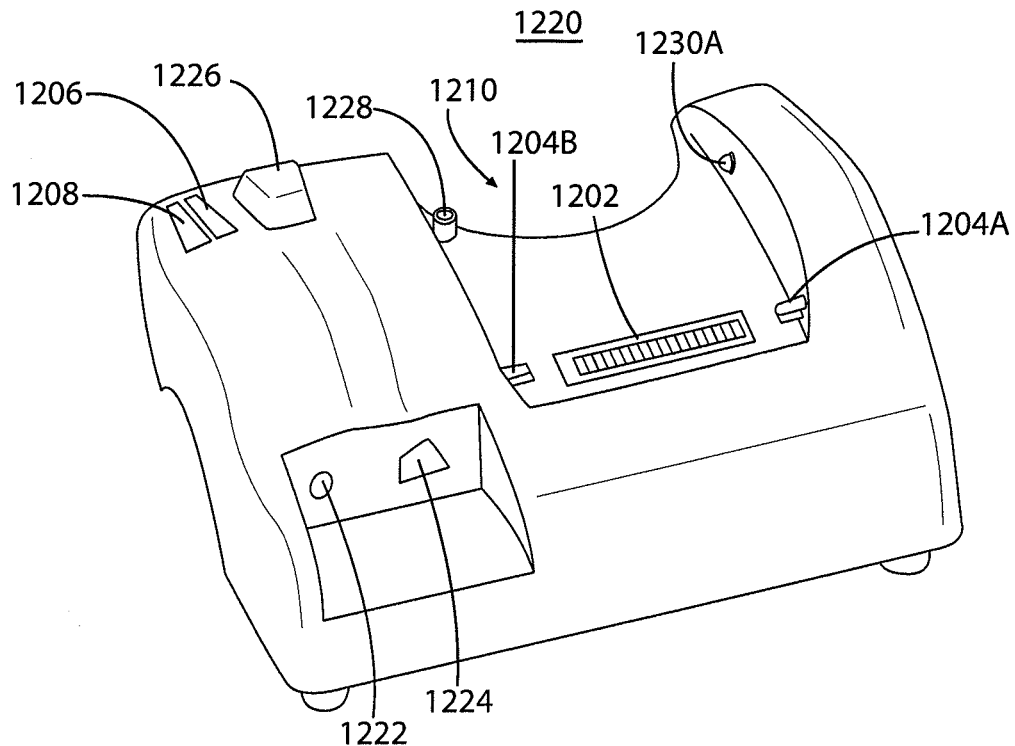
Figure 12J:
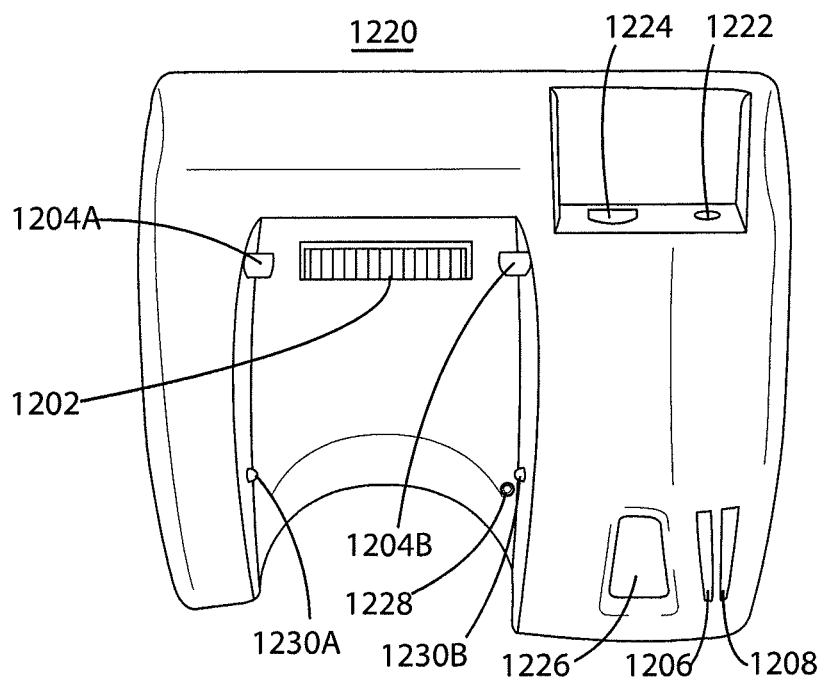
Figure 12K:
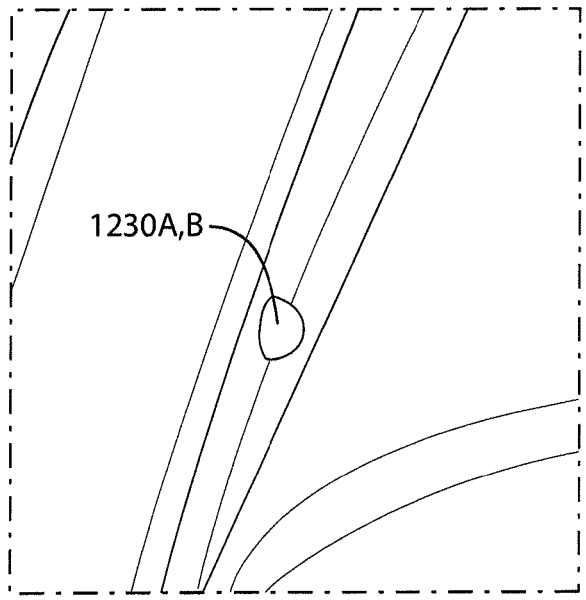
Figure 12L:
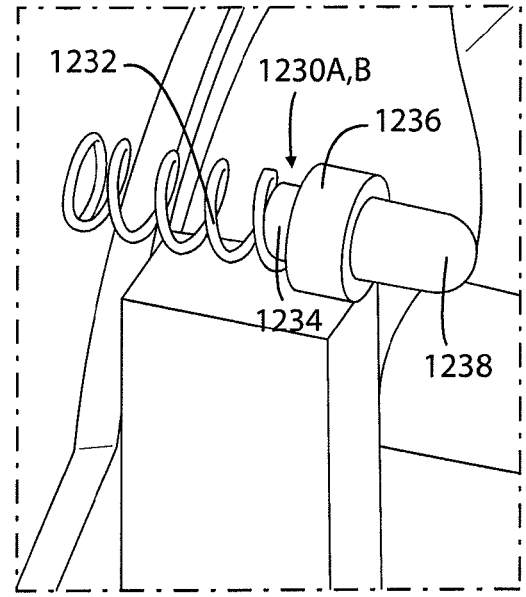
Figure 12M:
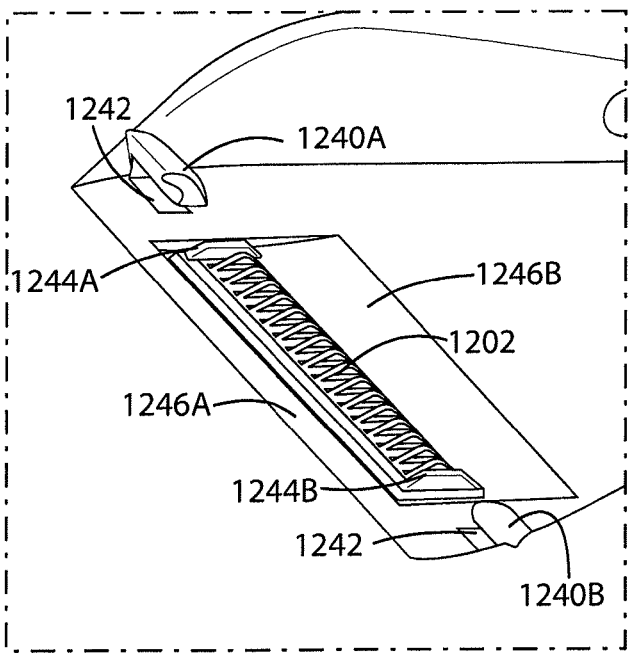
Figure 12N:
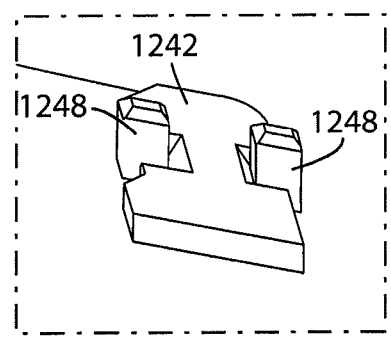
Figure 12O:
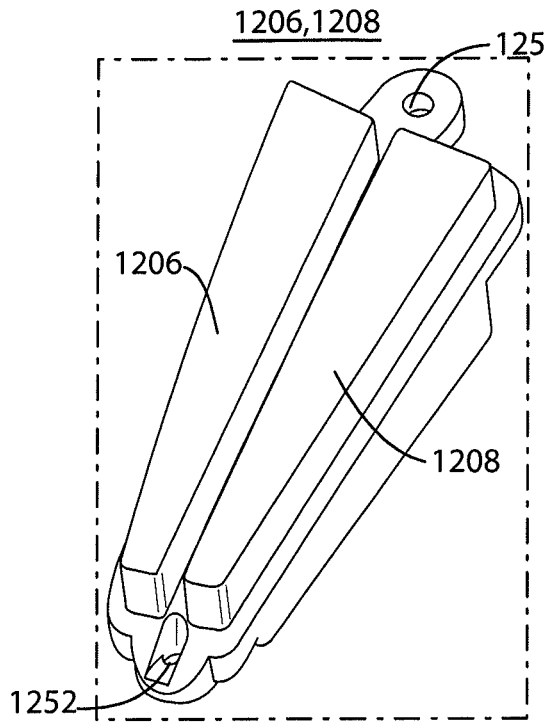
Figure 12Q:
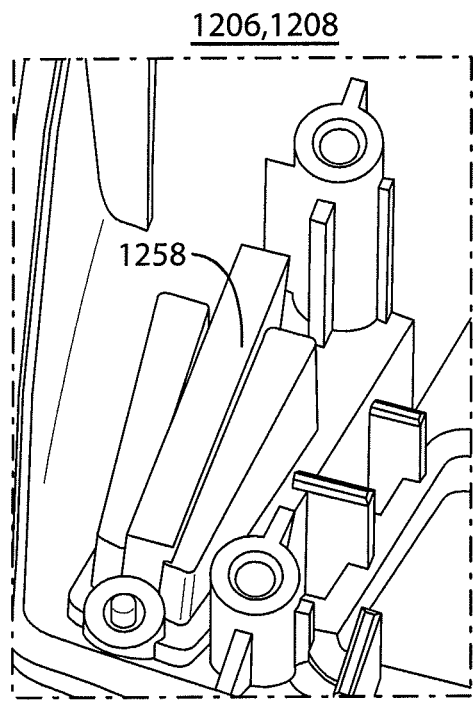
Figure 12P:
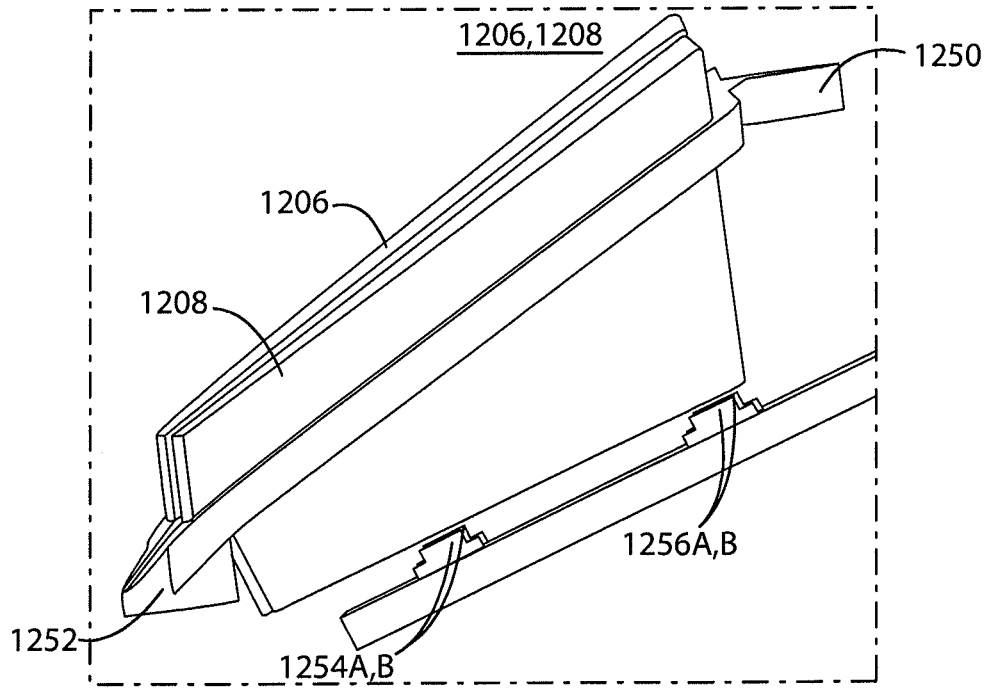
Figure 13A:
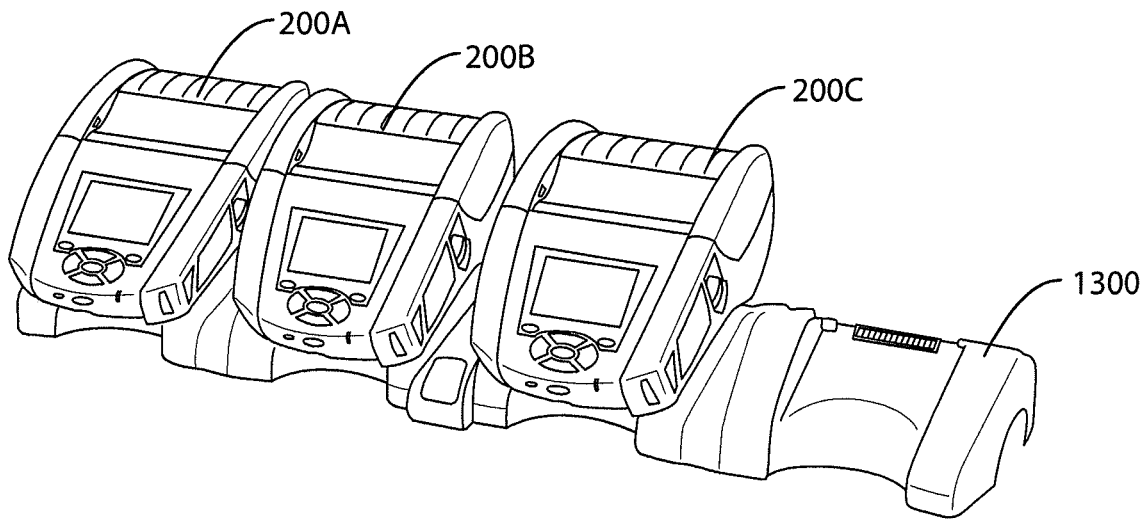
Figure 13B:
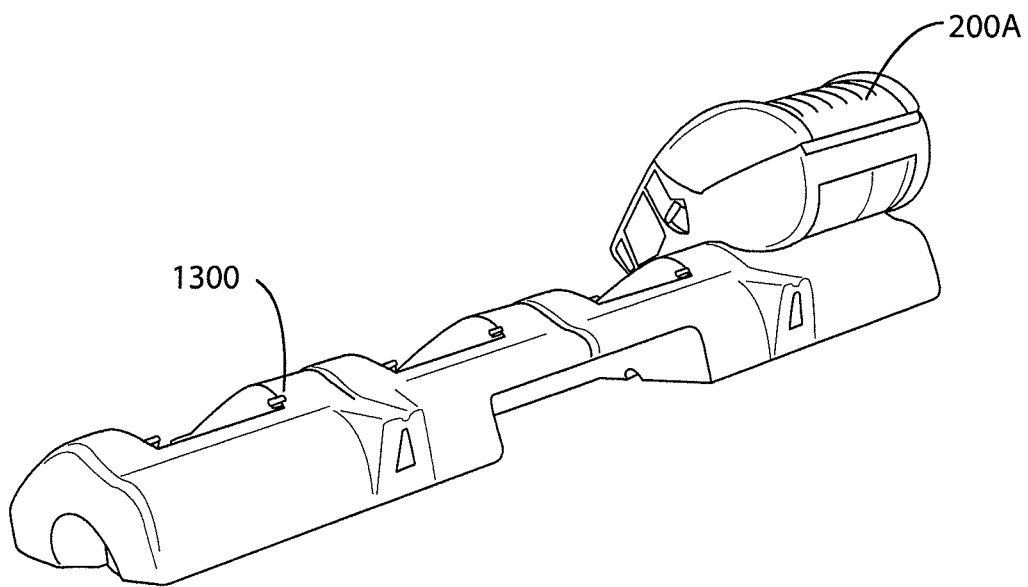
Figure 13C:
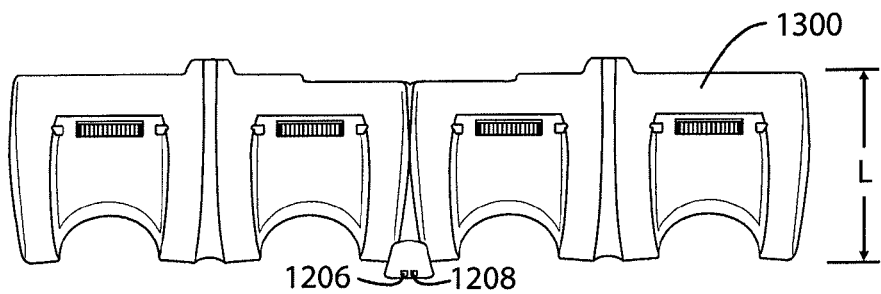
Figure 13D:
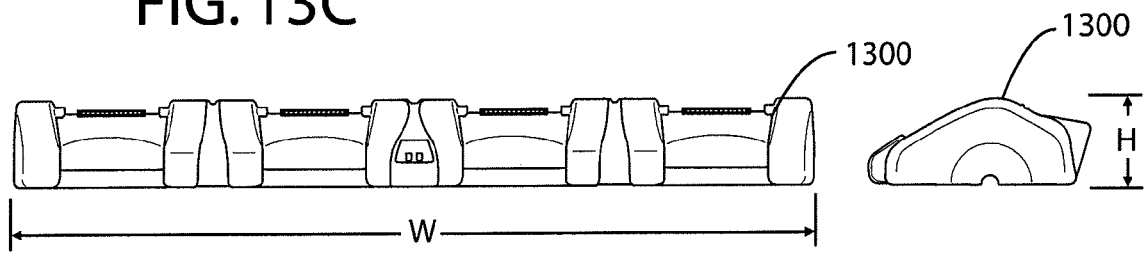
Figure 13E:
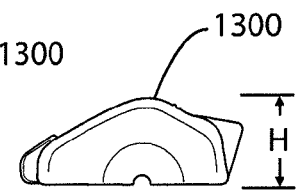
Figure 14A:
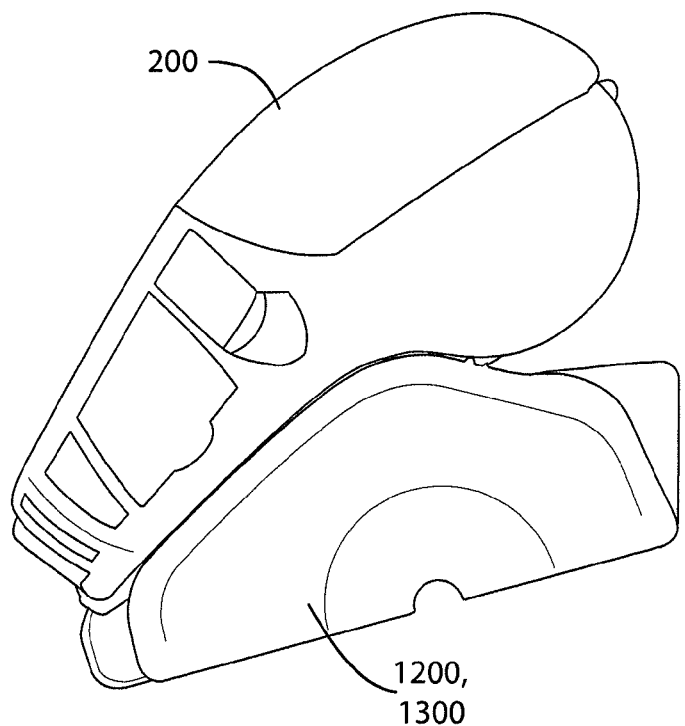
Figure 14B:
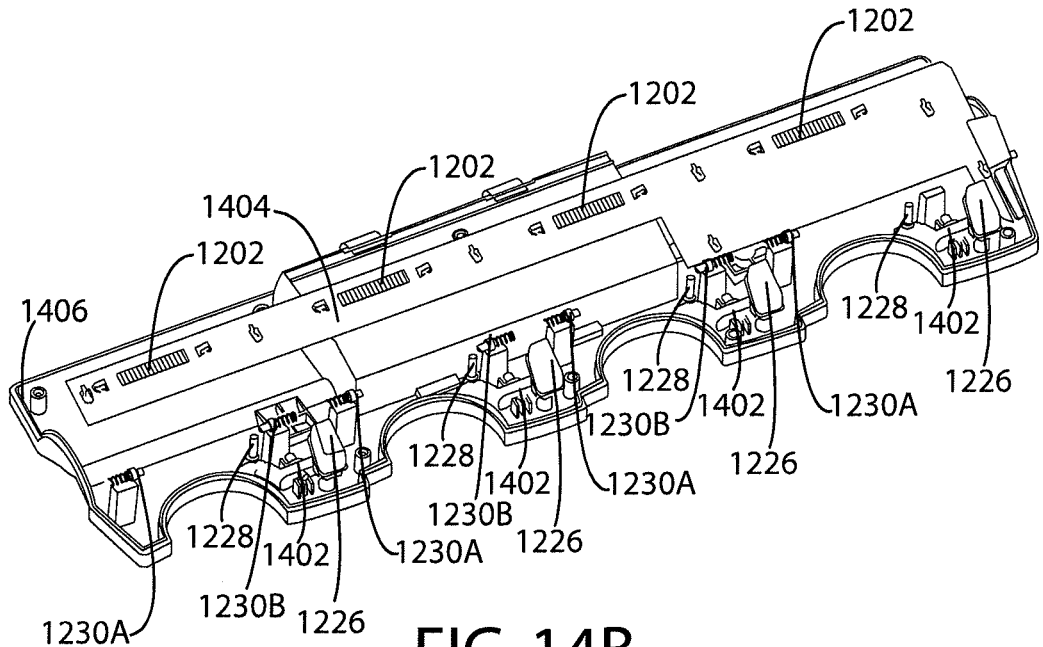
Figure 14C:
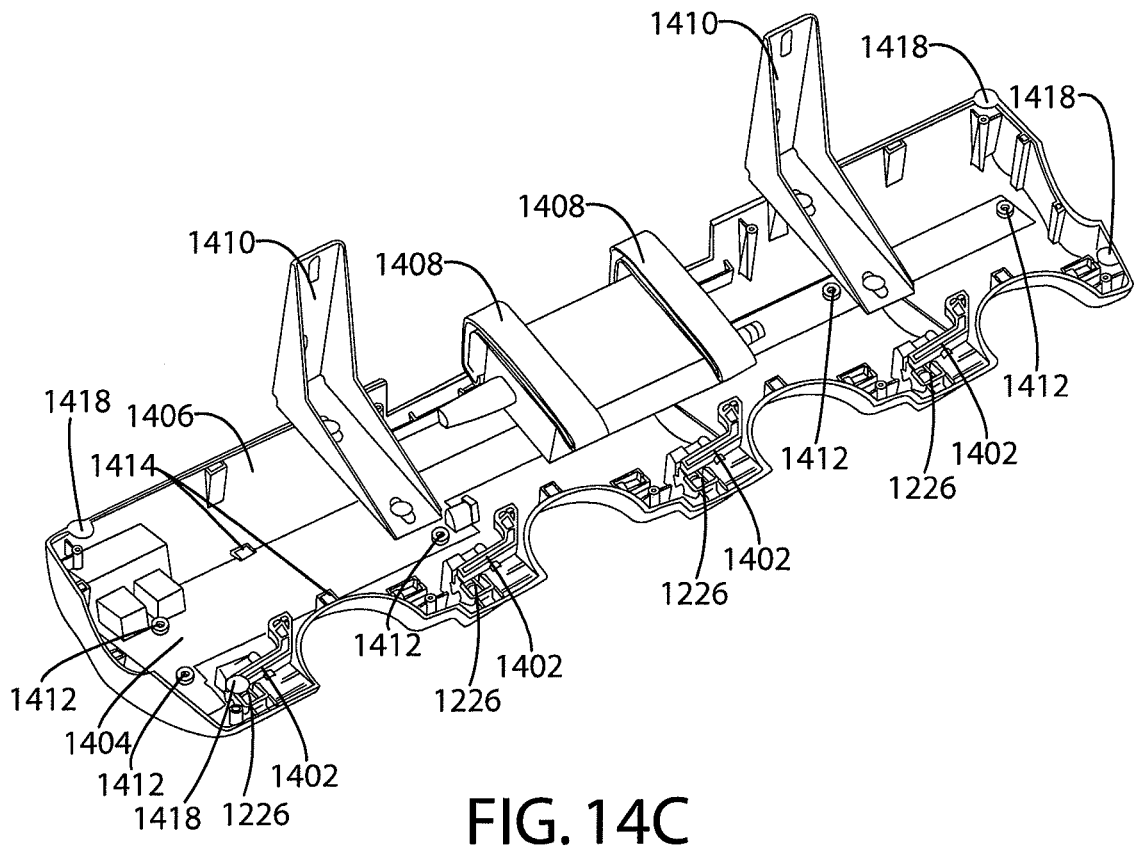
Figure 14D:
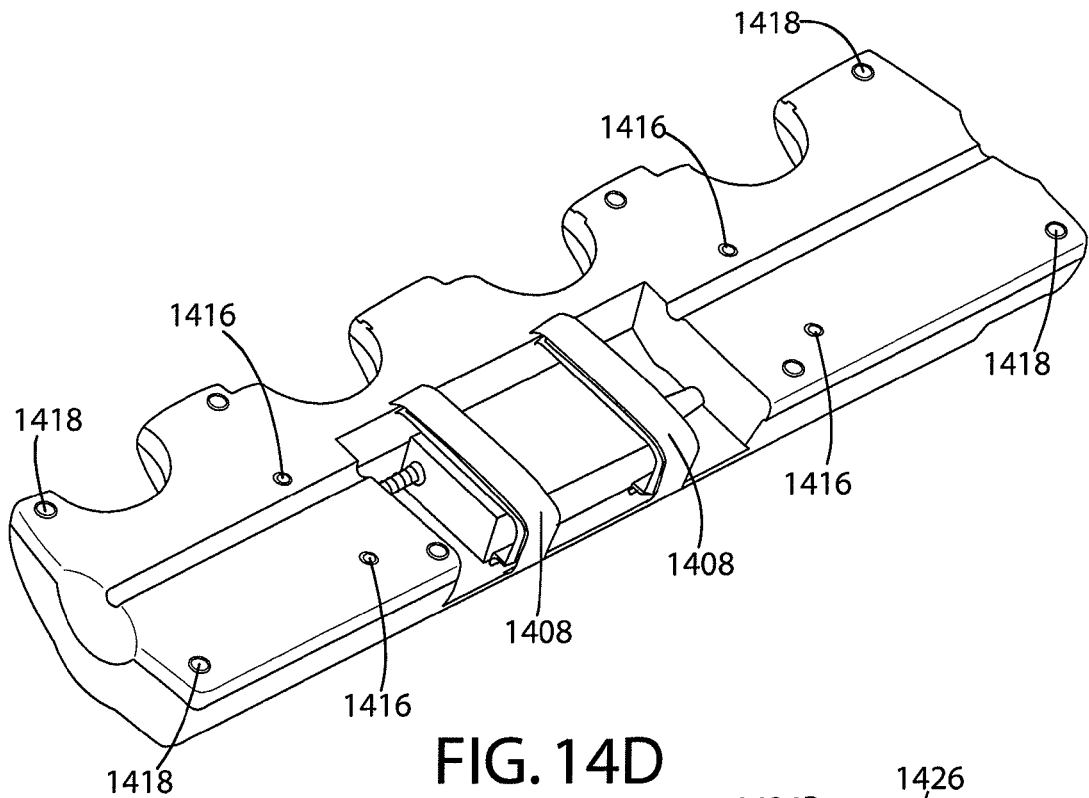
Figure 14E:
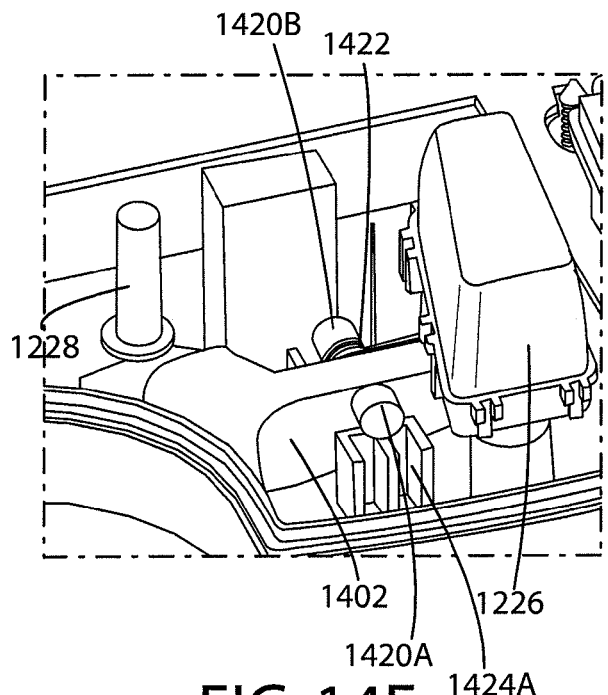
Figure 14F:
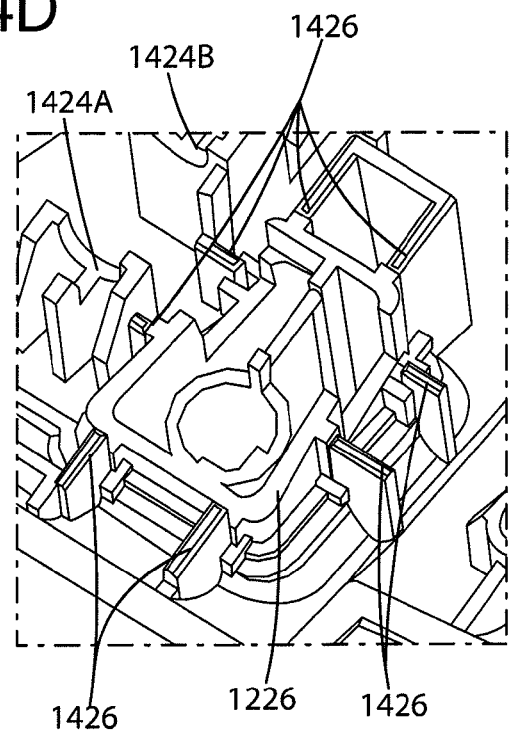
Figure 15:
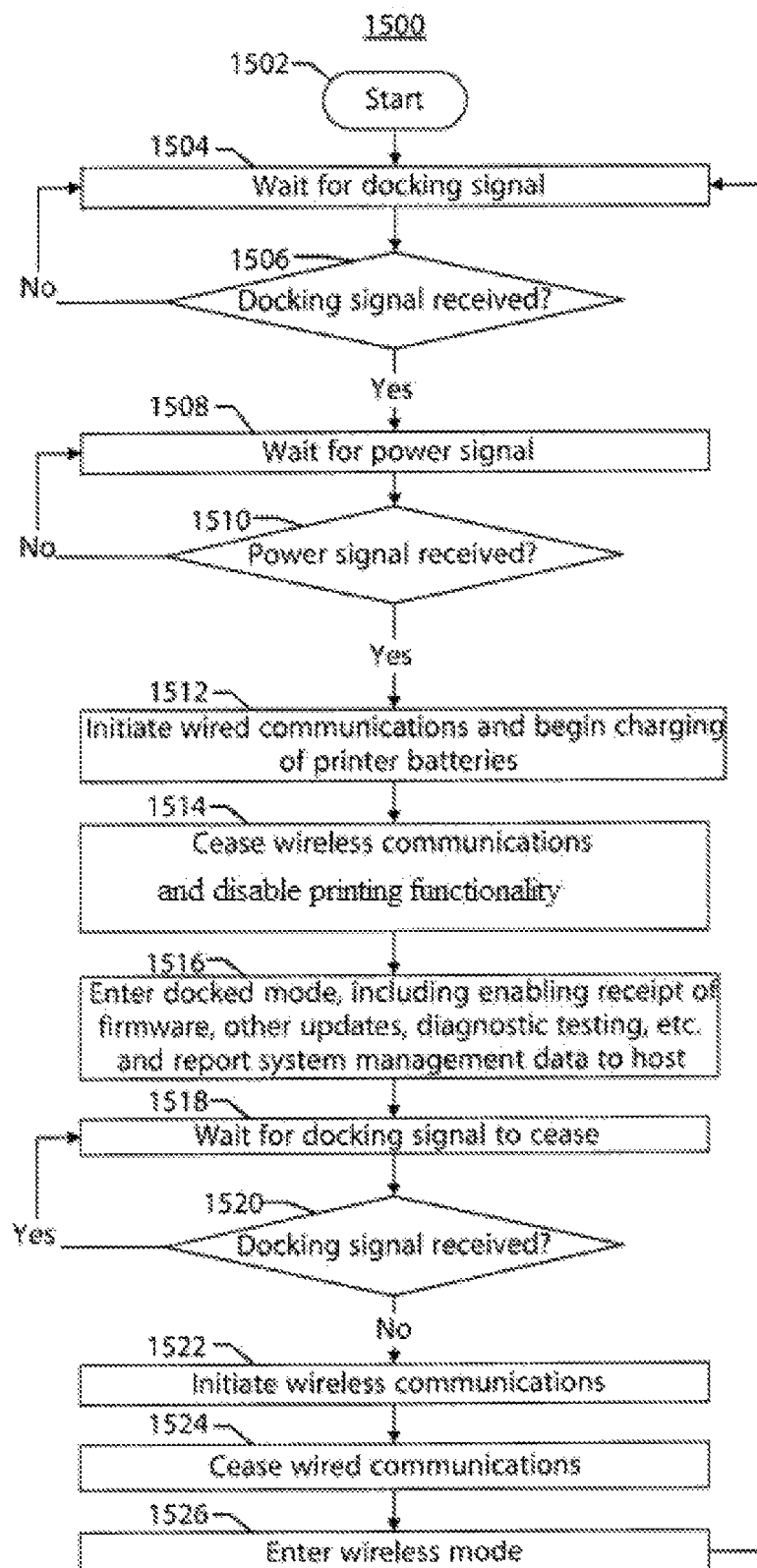
Figure 19A:
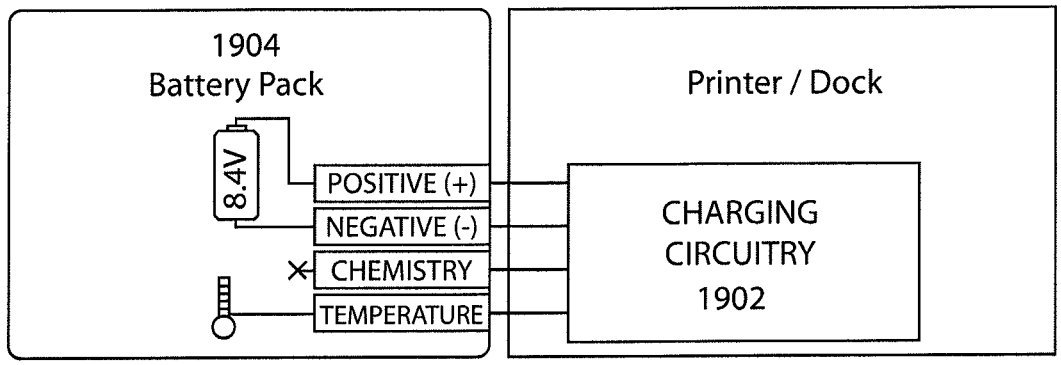
Figure 19B:
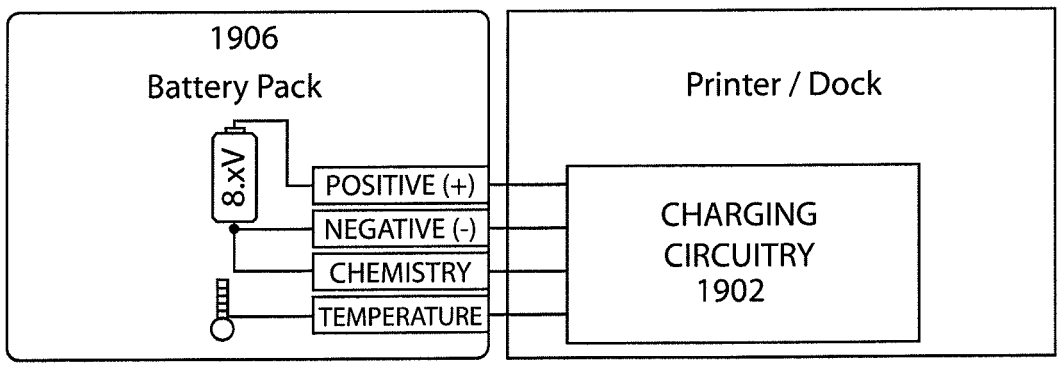
Figure 20:
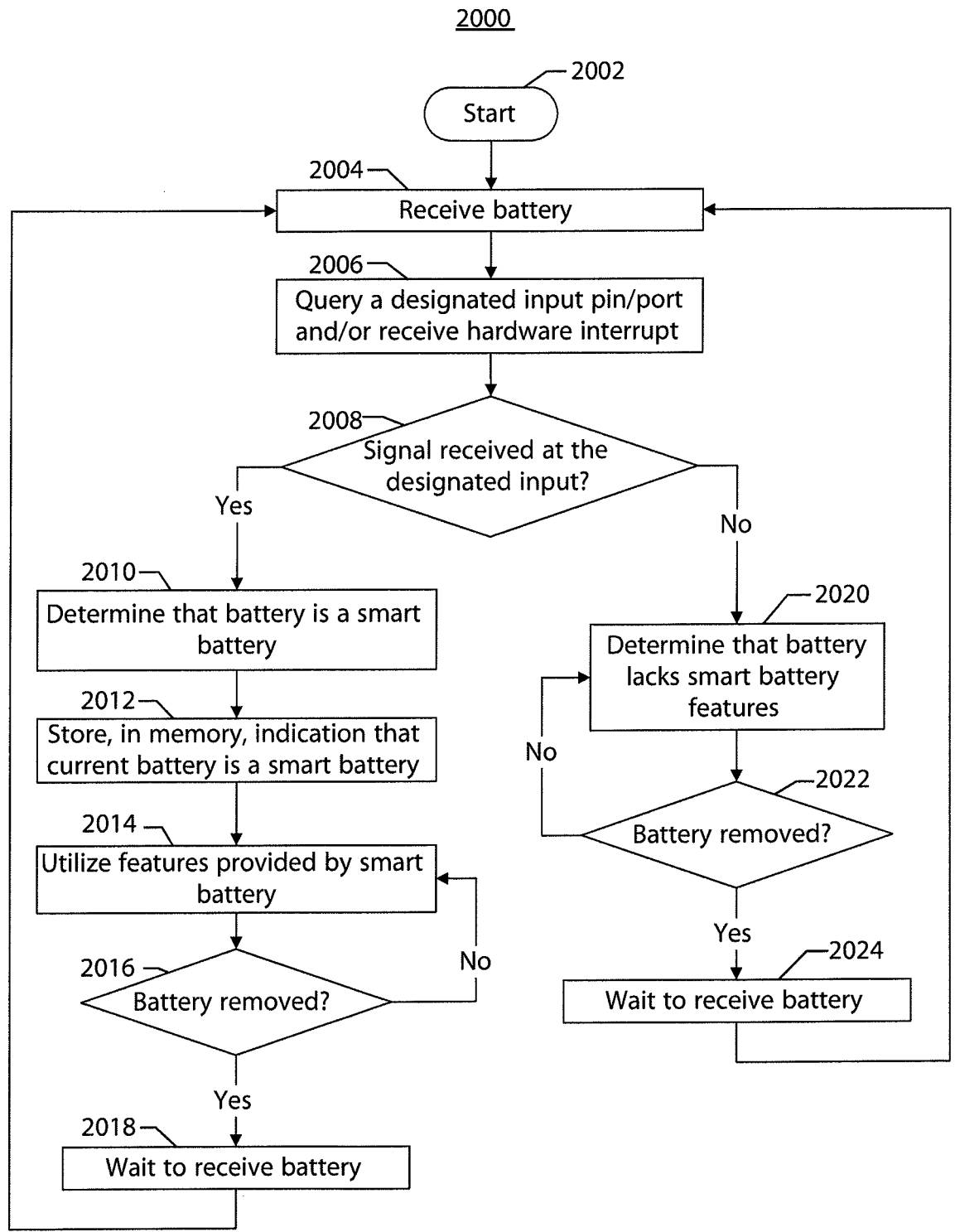
Figure 21:
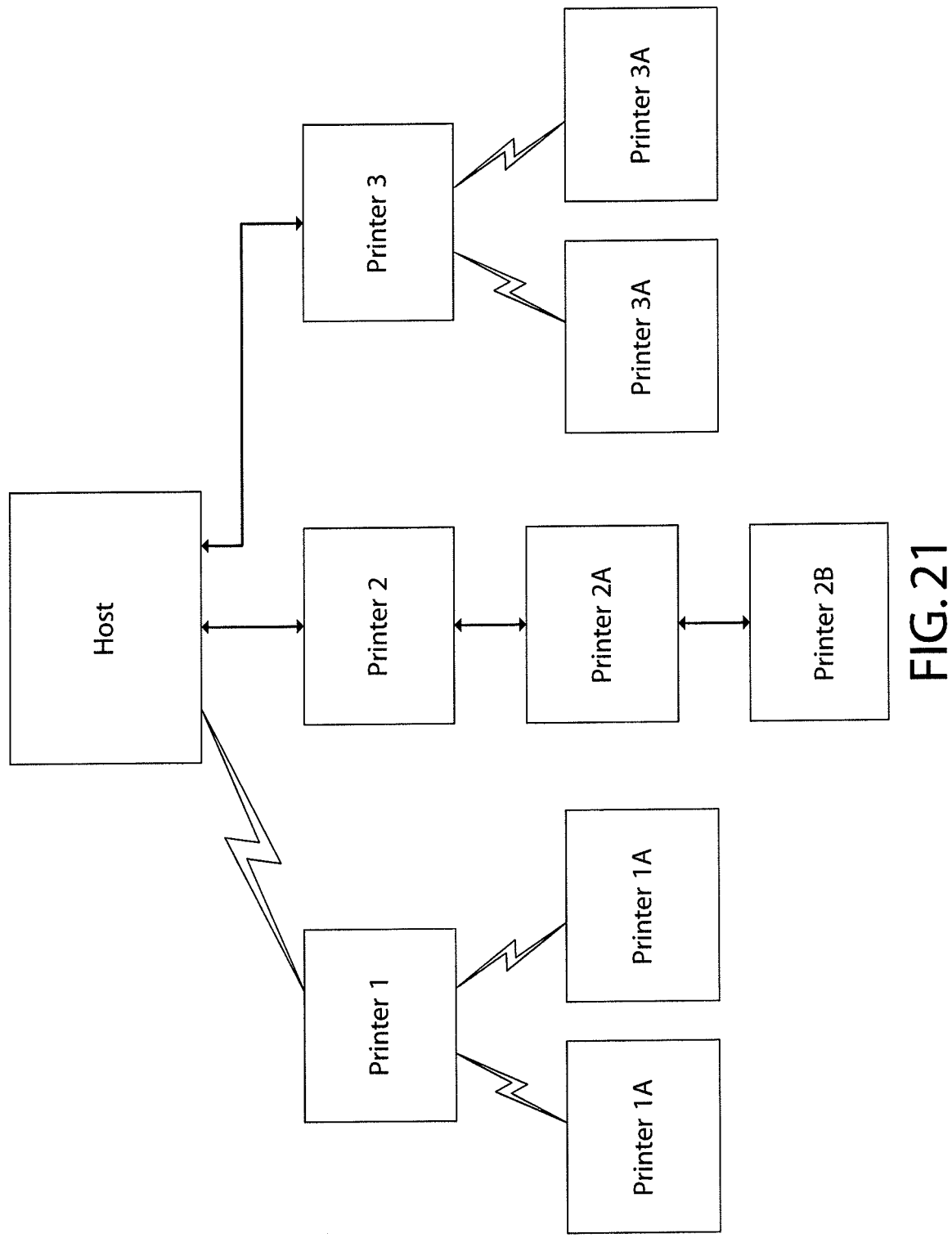

FIGS. 6A and 6B each show a right side view of embodiments of the mobile printer consistent with those discussed in connection with FIG. 2;

FIGS. 7A and 7B show a palette and terminal device that may be used with mobile printers structured in accordance with embodiments discussed herein;

FIG. 8 shows an example block diagram of circuitry that may be included in some embodiments discussed herein;

FIG. 9 shows a bottom view of the mobile printer discussed in connection with FIG. 2;

FIGS. 10A-10D show various views of example of circuitry, such as that discussed in FIG. 8, that may be included in printers that are in accordance with some embodiments discussed herein;

FIG. 10E shows an exploded view of the circuitry shown in FIGS. 10A-10D;

FIGS. 11A and 11B show exemplary portions of a housing for a printer in accordance with some embodiments discussed herein;

FIG. 12A shows a front isometric view of a dock that may receive a printer in accordance with some embodiments discussed herein;

FIG. 12B shows a front isometric view of the dock of FIG. 12A while electromechanically coupled with a printer in accordance with some embodiments discussed herein;

FIG. 12C shows a top view of the dock of FIG. 12A that may receive a printer in accordance with some embodiments discussed herein;

FIG. 12D shows a front view of the dock of FIG. 12A that may receive a printer in accordance with some embodiments discussed herein;

FIG. 12E shows a right side view of the dock of FIG. 12A that may receive a printer in accordance with some embodiments discussed herein;

FIGS. 12F-12H show an exemplary method how a printer in accordance with some embodiments discussed herein can be electromechanically coupled to the dock of FIG. 12A;

FIG. 12I shows a rear isometric view of a dock that may receive a printer in accordance with some embodiments discussed herein;

FIG. 12J shows a top view of the dock of FIG. 12I that may receive a printer in accordance with some embodiments discussed herein;

FIG. 12K shows a more detailed view of retention tabs mounted in a dock's housing and/or any other type of apparatus in accordance with some embodiments discussed herein;

FIG. 12L shows example components and shapes of the components of retention tabs in accordance with some embodiments discussed herein;

FIG. 12M shows an example electrical interface and curved protrusions that may be included in docks in accordance with some embodiments discussed herein;

FIG. 12N shows the bottom of a stopper as mounted to a dock in accordance with some embodiments discussed herein;

FIGS. 12O-12Q show an example of additional components that may be included in light emitting devices in accordance with some embodiments discussed herein;

FIG. 13A shows a front isometric view of a multi-printer dock that is electromechanically coupled to a plurality printers in accordance with embodiments discussed herein and can receive another printer in accordance with some embodiments discussed herein;

FIG. 13B shows a back isometric view of the multi-printer dock of FIG. 13A that is electromechanically coupled to a printer in accordance with embodiments discussed herein and can receive a plurality of printers in accordance with some embodiments discussed herein;

FIG. 13C shows a top view of the multi-printer dock of FIG. 13A that may receive a plurality of printers in accordance with some embodiments discussed herein;

FIG. 13D shows a front view of the multi-printer dock of FIG. 13A that may receive a plurality of printers in accordance with some embodiments discussed herein;

FIG. 13E shows a right side view of the multi-printer dock of FIG. 13A that may receive a plurality of printers in accordance with some embodiments discussed herein;

FIG. 14A shows a side view of the dock of FIG. 12A or a side view of the multi-printer dock of FIG. 13A that is mounted to a wall and electromechanically coupled to at least one printer in accordance with some embodiments discussed herein;

FIGS. 14B and 14C show various internal components of a docking unit in accordance with some embodiments discussed herein;

FIG. 14D shows a bottom view of the dock with the bottom portion of the dock's housing included (as opposed to FIG. 14C, which has the bottom portion of the dock's housing removed) in accordance with some embodiments discussed herein;

FIG. 14E shows an example ejector assembly in accordance with some embodiments discussed herein;

FIG. 14F shows a cut away view of a portion of the ejector assembly discussed in connection with FIG. 14E in accordance with some embodiments discussed herein;

FIG. 15 shows a process flow related to using a dock that may be executed by a processor and/or other hardware at least partially implemented in a printer in accordance with some embodiments discussed herein;

FIGS. 16 and 17 show interface pin mappings for interfaces that may be included in a printer and/or other device in accordance with some embodiments discussed herein;

FIGS. 18A-18H show a battery charging dock in accordance with some embodiments discussed herein;

FIGS. 19A and 19B show circuitry that can be used by a printer in accordance with some embodiments discussed herein to distinguish a smart battery from another type of battery;

FIG. 20 shows a process flow related to identifying and utilizing different batteries in a printer in accordance with some embodiments discussed herein; and FIG. 21 shows examples of print server networks in accordance with some embodiments discussed herein.

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Overview of Example Printer Platforms

Figure 1:
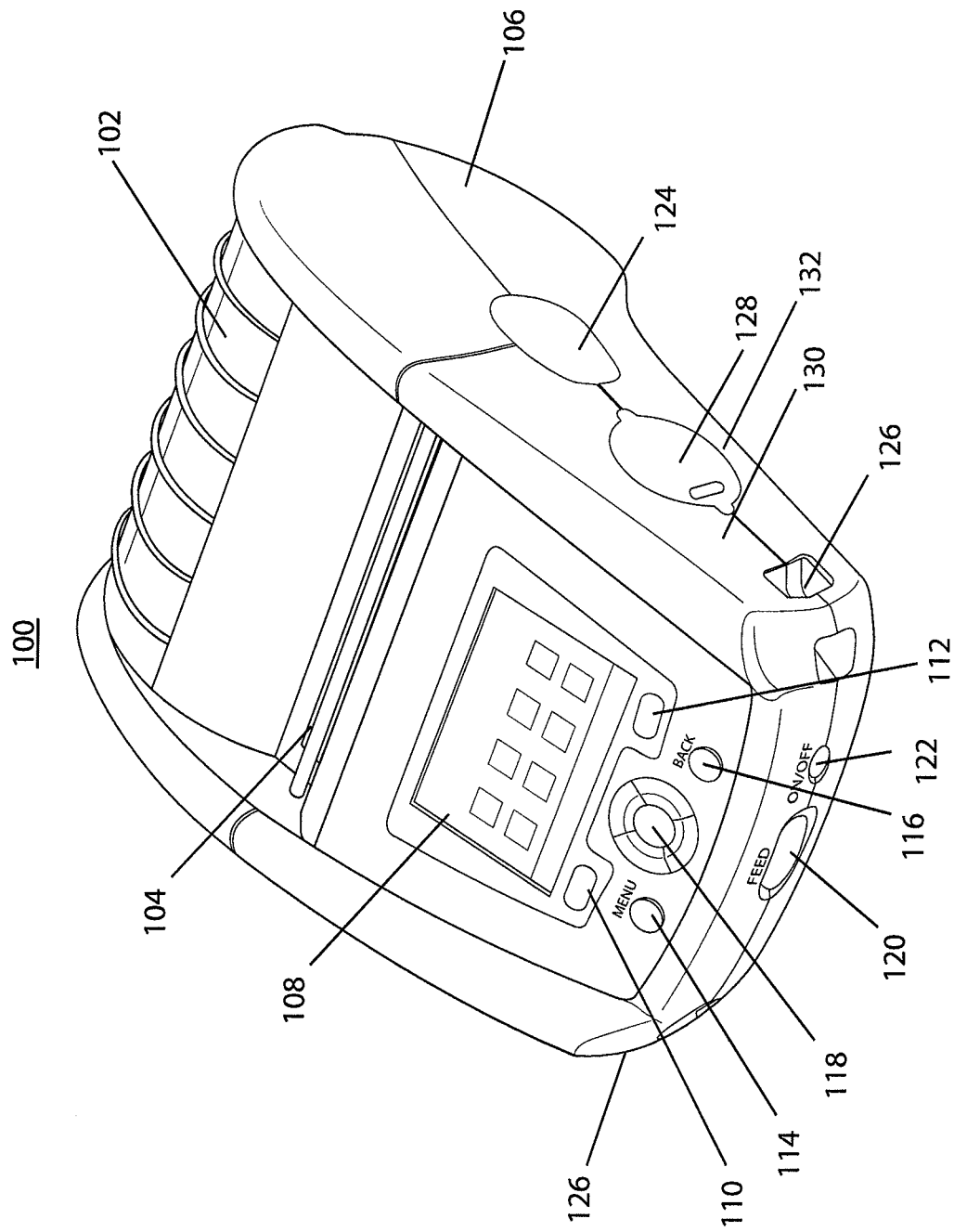
FIG. 1 shows an isometric view of a mobile printer in accordance with some embodiments discussed herein.

FIG. 1 shows mobile printer 100, which is in accordance with some embodiments of the present invention. Mobile printer 100, like some of the other exemplary printers discussed herein, can weigh less than 1.6 pounds, can have a volume of about 61 cubic inches, and can be durable enough to function properly after falling from a height of at least 5 feet. Mobile printer 100 can also be used to print user-readable indicia at, e.g., a speed of one or more inches per second. In some embodiments, the torque and/or print speed can be dynamically adjusted based upon the printing parameters selected in response to the printer's processor determining, e.g., the type of media (e.g., backless media, media with backing to be peeled, among others). Mobile printer 100 can also be configured to encode machine-readable indicia onto media.

The relatively small profile and increased durability of mobile printer 100 can be enabled by, among other things, the arrangement of the internal circuitry and/or circuit boards onto which the circuitry is mounted. For example, the circuitry of mobile printer 100 can be laid out on a plurality of circuit boards (instead of a single circuit board). Additional examples of how circuitry may be arranged on one or more circuit boards are discussed below in connection with FIGS. 8 and 10A-10E as well as in commonly-assigned U.S. patent application Ser. No. 13/085,438, titled "PRINTER MOBILITY AND SCALABILITY," which is incorporated herein in its entirety by reference.

The media can include, for example, a number of adhesive-backed labels supported by a liner or other carrier (sometimes referred to herein as a "backing"). In RFID applications, the labels may include an RFID transponder or other type of circuitry (sometimes referred to herein as an "inlay"). A peeler (discussed further in connection with FIGS. 7-13) and/or other component(s) can be included in mobile printer 100 and may be used to separate the media from the liner after printing/encoding. The media can include a single media unit, or the media can include individual media units that are rolled together, fan folded, or otherwise assembled together, and inserted into mobile printer 100. For example, media cover 102 can open allowing mobile printer 100 to receive a single media unit, a roll of media units, a fanfold of media units, or any other suitable arrangement of one or more media units. Mobile printer 100 can then feed the media through media slot 104. In some embodiments, a tear bar or other type of cutting component (discussed below) can be incorporated near media slot 104 to help the user remove a label, receipt, or other type of media unit(s) from the roll after printing/encoding.

A peeler assembly may also be included in mobile printer 100. The peeler assembly may comprise a peel bar and/or other component(s), and be positioned proximate media slot 104. Mobile printer 100 may include gears and/or other components that are adapted to automatically engage the peeler to print media (such as, e.g., media cover 102 may be configured to latch the peel bar in a peeling position), subsequent to the peeler bar being released from its stowed or other type of non-peeling position by a user and/or mobile printer 100. The peeler can then be used to at least partially remove a label or other type of media from any type of backing, such as a media liner, after printing/encoding the media. Additional examples of threadless peelers are provided in commonly-assigned U.S. patent application Ser. No. 13/085,422, titled "LABEL PEELING, UNIVERSAL PRINTHEADS AND RELATED METHODS," which is incorporated herein in its entirety by reference.

Housing 106, including media cover 102, can be made from any suitable material and/or combinations of materials. For example, housing 106 can be made from plastic(s), rubber, metal, composite material, any other type of material, or combination thereof (such as, e.g., a rubber-infused plastic). Housing material 106 can be strong enough to protect the internal components from a fall, while still allowing wireless signals, such as those used to communication to radiate through in at least some locations. Housing 106 is shown in FIG. 1 as having a center seam between top half 130 of the housing and bottom half 132 of the housing. Other embodiments, examples of which are discussed below (in connection with, e.g., in connection with, e.g., FIGS. 2-6B, 11A and 11B), include a seam line that allows, among other things, the bottom portion of the housing to be the same size and shape, regardless of the overall shape and size of printers. Additional examples of defining outer shells and other exterior features of printers that may be used in some embodiments discussed herein are provided in commonly-assigned U.S. patent application Ser. No. 13/085,438, titled "PRINTER MOBILITY AND SCALABILITY," which is incorporated herein in its entirety by reference.

Mobile printer 100 can also include one or more user input/output components, such as display 108, left button 110, right button 112, menu button 114, back button 116, navigation buttons 118, feed button 120, power button 122, and cover release button 124. Other examples of buttons, sensors and other type of user and environmental inputs may be included, some of which are discussed herein. For example, additional user inputs and/or outputs may be available to the user only when media cover 102 is open. Additional examples of printer user interfaces that may be included in some embodiments discussed herein are provided in commonly-assigned U.S. patent application Ser. No. 13/085,438, titled "PRINTER MOBILITY AND SCALABILITY," which is incorporated herein in its entirety by reference.

Display 108 can include components configured to receive data inputs and present a display. In some embodiments, display 108 may also include components that enable touch-sensitive functionality. The touch-sensitive components of display 108 can include, for example, capacitance sensor(s), resistance sensor(s), acoustic wave sensor(s), optical sensor(s), any other type of sensor(s), and/or combination thereof. Display 108 can also include a liquid crystal display ("LCD"), light emitting diode ("LED") display, an organic light emitting diode ("OLED") display, any other type of display, or combination thereof. Different types of displays have various advantages and disadvantages relative to each other. For example, a 2.1 inch OLED display may have a relatively larger viewing angle than a 2.1 inch LCD. However, as known to those skilled in the art, OLED displays are currently more expensive than comparable LCDs. Other examples of displays that may be used by some embodiments discussed herein, include an electronic paper display ("EPD," sometimes referred to as electronic ink or e-ink) or other type of bistable display(s). Power consumption, brightness, readability (in sunlight, darkness, etc.), expected life span, and other factors may also differ among different types of displays and impact the best display to be used as display 108 depending on the intended usage of mobile printer 100. In some embodiments, an ambient light sensor and/or other type of sensor can be integrated into the display and/or other portion of printer 100, such as in and/or near the peeler bar or media cover. The one or more sensors can be used to, for example, adjust the brightness of the display, detect a label that needs to be removed from the peel bar, and determine when printer 100 is moving, among other things.

Display 108 can be configured to present an icon based menu and/or any other type of menu hierarchy. Among other things, display 108 can be adapted to display Asian-language fonts in relatively high resolution. Various fonts, graphics, firmware and/or other data may be downloaded onto printer 100 (some examples of which are discussed further below).

The printer may also be configured to upload to a remote device information on printer usage, such as odometer data (e.g., the amount of media that has been printed since a given time), battery status, label size, error messages, printer modes of operation used since last docking (peel, tear, etc.), model number, software version, printhead resolution, installed memory size, amount of available/used memory space, components and other options included in printer, paper empty flag, printer paused flag, label length, indication of current mode of printer and previous modes used (e.g., since last synchronization), absolute temperature, temperature range data (over acceptable temperature, within acceptable temperature range, or below acceptable temperature), printhead open flag, ribbon out mode (is there a ribbon installed or not), and ribbon usage mode (is a ribbon being used to print or not), among other things. Additional examples of types of information that may be uploaded and/or downloaded from/to the printer are included in the Zebra Programming Language's *ZPL II the Programming Guide, Volume One,* 2005, which is a registered copyrighted work owned by the assignee of this application and is hereby incorporated by reference in its entirety.

In some embodiments, display 108 may only function as an output display component and be unable to function as an input component. For example, display 108 may lack a functioning touch-sensitive input component and/or the appropriate software/hardware/firmware necessary to enable the touch-sensitive input component.

Regardless of whether display 108 includes a touch sensitive component that displays user-selectable buttons and/or other input component(s), mobile printer 100 can include "soft" keys, such as left button 110 and right button 112, which are hardware-based keys (as opposed to software-based keys presented by a touch-sensitive display) that can be used to select options presented by display 108. In some embodiments, portions of the screen of display 108 can be dedicated to and associated with left button 110 and/or right button 112. For example, the area of display 108 located immediately above left button 110 can be used to present an option that can be selected in response to left button 110 being depressed. Likewise, the area of display 108 located immediately above right button 112 can be used to present another option that can be selected in response to right button 112 being depressed. The options presented in the screen areas associated with left button 110 and/or right button 112 can be dynamic and change based upon the current display, allowing left button 110 and right button 112 to provide flexible navigation of the menu hierarchy. Additional examples of printer user interfaces that may be used in some embodiments discussed herein are provided in commonly-assigned U.S. patent application Ser. No. 13/085,438, titled "PRINTER MOBILITY AND SCALABILITY," which is incorporated herein in its entirety by reference.

Mobile printer 100 can also include menu button 114. Internal circuitry (e.g., the processor and/or other components, such as those discussed in connection with, e.g., FIGS. 8 and 10A-10E) of mobile printer 100 can be configured to, for example, present a main menu or other type of display on display 108 in response to menu button 114 being depressed. Software and/or firmware, which include coded machine-readable instructions for executing the functionality of mobile printer 100, can be stored in memory or any other type of computer readable media device included in mobile printer 100. For example, mobile printer 100 may include 128 megabytes of memory, 256 megabytes of memory, or any other suitable amount of removable or embedded memory in the form of nontransitory volatile and/or non-volatile storage (e.g., flash memory, magnetic disk memory, etc.).

Back button 116 can cause the internal circuitry to present a display that is higher up a menu hierarchy of mobile printer 100. In other embodiments, back button 116 (or another button which is not shown) can be used to physically "backup" or otherwise control the movement of the media being printed/encoded by mobile primer 100, in yet other embodiments, back button 116 (and/or any other component of mobile printer 100) can have dynamic functionality, in that selecting back button 116 causes mobile printer 100 to respond differently depending on a range of variables. For example, back button 116 may cause display 108 to advance up the menu hierarchy while media cover 102 is in a closed position (as shown in FIG. 1) and cause the printing media to back-feed while media cover 102 is in an open position, or vice-versa.

Navigation buttons 118 are shown in FIG. 1 as comprising four directional buttons and a center button. Navigational buttons 118 can enable a user to, for example, move a cursor among and/or select one or more options presented by display 108. Navigational buttons 118 can also provide an intuitive interface for allowing a user to move to and/or select an option using fewer key presses. Additional examples of printer user interfaces that may be used in some embodiments discussed herein are provided in commonly-assigned U.S. patent application Ser. No. 13/085,438, titled "PRINTER MOBILITY AND SCALABILITY," which is incorporated herein in its entirety by reference.

Feed button 120 can be used to activate one or more rollers and feed media into the printing components of mobile printer 100. For example, when the media is supported by a liner, feed button 120 can assist a user in advancing the liner through printing components. Feed button 120 may also be used to help the user remove excess media, advance the media manually, and/or remove jammed media, just to list a few examples.

Mobile printer 100 can be powered ON and OFF using power button 122. In some embodiments, power button 122 can be used to cause mobile printer 100 to enter or exit a standby mode. For example, in response to power button 122 being depressed for less than a predetermined period of time (e.g., 5 seconds), mobile printer 100 can either enter or exit standby mode (depending on, e.g., whether or not mobile printer 100 is currently in an active or standby mode). But in response to power button 122 being depressed for more than 5 seconds, mobile printer 100 can power OFF (if ON). In some embodiments, the circuitry of mobile printer 100 can be configured to automatically power OFF after a predetermined period of time or in response to determining the battery power has dropped below a predetermined threshold. Mobile printer 100 may also be configured to power ON automatically, for example, in response to a print command being issued by another device, such as a mobile terminal. In some embodiments, mobile printer 100 can be configured to automatically enter and/or exit a stand-by or other power-saving mode (including dimming the display screen, turning OFF wireless components, and/or execute other power reduction configuration settings). For example, a power-saving mode may be entered or exited after a predetermined period of time has elapsed and/or an environmental trigger has been detected (e.g., light detected by an ambient light sensor, movement detected by a jiggle switch, accelerometer and/or other type of movement sensor, etc.).

Cover release button 124 can be used to unlock and/or open media cover 102. When media cover 102 is open, media can be loaded into mobile printer 100, media jams can be fixed, ribbon or other printing components can be replaced, the peeler bar can be released to engage the media, etc.

The relatively small size of mobile printer 100 allows mobile printer 100 to be attached, mounted, or otherwise physically coupled to a number of devices. For example, mobile printer 100 can be attached to a fork lift (or other warehouse apparatus), automobile (e.g., police car), healthcare device, shopping cart, belt loop, belt, and lanyard, among other things. To facilitate its mechanical or other type of physical coupling to another apparatus, mobile printer 100 can include channels 126, which are adapted to receive a mounting component (e.g., a shoulder strap, belt, or other type of tether), locking component, and/or other type of apparatus(es). Other mounting components, including those used for a dock, are discussed further in connection with, e.g., FIGS. 2, 5-7B and 11A-12H.

Protective cover 128 can be used to prevent water, dirt and other elements from entering one or more electrical coupling components of mobile printer 100. For example, one or more universal serial bus ("USB") ports, mini-USB ports, serial enhanced security ports, Ethernet ports, optical ports, and/or any other type of input components, output components and/or input/output components may be located behind protective cover 128. Protective cover 128 can be removed and/or opened to access the protected component(s). The protected component(s) can also incorporate, for example, strain relief technology, some examples of which are provided in commonly-assigned U.S. patent application Ser. No. 13/085,438, titled "PRINTER MOBILITY AND SCALABILITY," which is incorporated herein in its entirety by reference.

Figure 2:
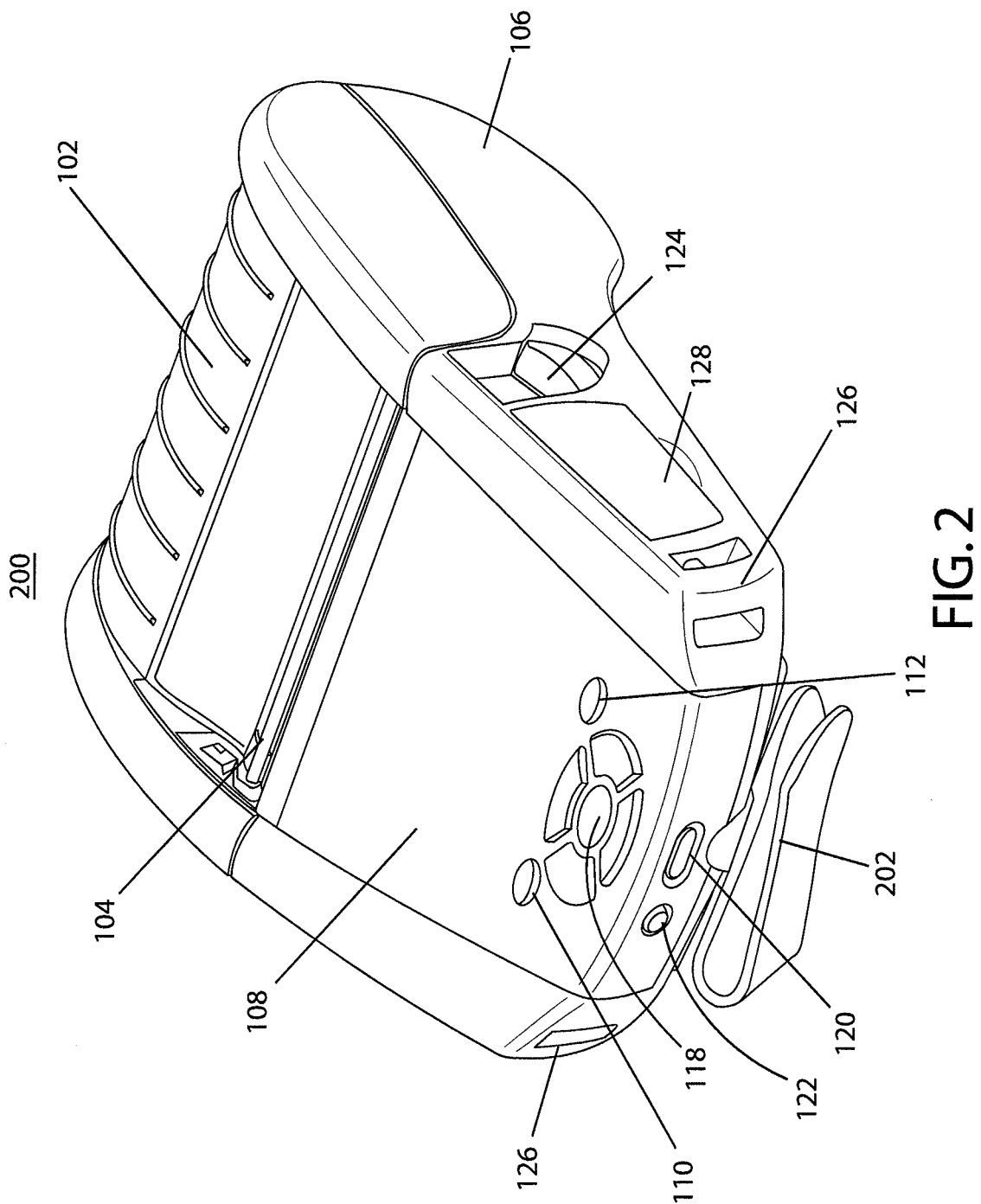
FIG. 2 shows an isometric view of another printer in accordance with some embodiments discussed herein.

FIG. 2 shows printer 200, which includes components similar to or the same as those discussed above in connection with mobile printer 100. To avoid overcomplicating the discussion, like reference numbers refer to like elements throughout the drawings. (Although a display screen is not shown in FIG. 2, reference number 108 points to a portion of housing 106 that may be adapted to receive any type of display or other type of user interface.)

In some embodiments, the portion of printer 200's housing where display 108 may be integrated can be formed from one or more different materials than other portions of the housing. For example, the side walls of the housing (such as the portions where channels 126 are located) can be formed from an injection molded plastic, and the portion for display 108 can comprise die cut rubber. When manufacturing printer 200, for example, plastic for the housing can be injected molded around the die cut rubber, which may allow the same injection mold to be used for printers that have different sized and/or types of input components (e.g., different types of display screens, navigation button arrangements, etc.). In some embodiments, a rubber and/or other type of overmold (discussed further in connection with, e.g., FIGS. 11A and 11B) can be applied to one or more of the printer's side walls and/or other components. Allowing the same molds to be used for multiple products can reduce manufacturing and machining costs sometimes associated with providing various product options to customers. In other embodiments, rather than place display 108 into rubber, the portion of the printer's housing that receives display 108 can be plastic and/or any other type of material. Other design aspects, some of which are discussed in commonly-assigned U.S. patent application Ser. No. 13/085,438, titled "PRINTER MOBILITY AND SCALABILITY," which is incorporated herein in its entirety by reference, may be included in some of the embodiments discussed herein and allow printer components to be used across various types of mobile printers, desktop printers and other devices in accordance with some embodiments of the present invention.

Printer 200 includes clip 202, which may enable printer 200 to be attached to a user's belt or belt loop. In some embodiments, clip 202 may swivel on a ball hinge or may remain in a fixed position relative printer 200. Housing 106 of printer 200 can be molded or otherwise adapted to receive clip 202 with or without another component. Some embodiments of housing 106, such as that shown in FIG. 2, lacks a seam line running through the ball joint receptacle, can directly receive clip 202 without sacrificing much, if any, strength of the connection, even absent another component. Clip 202 can be removable and/or replaced with one or more other types of attaching components. For example, a magnetic attaching component could be located where clip 202 is shown in FIG. 2, and used to attach printer 200 to a metallic surface. Additional examples of belt clips that may be used in combination with some embodiments discussed herein are provided in commonly-assigned U.S. patent application Ser. No. 13/085,438, titled "PRINTER MOBILITY AND SCALABILITY," which is incorporated herein in its entirety by reference.

Figure 3:
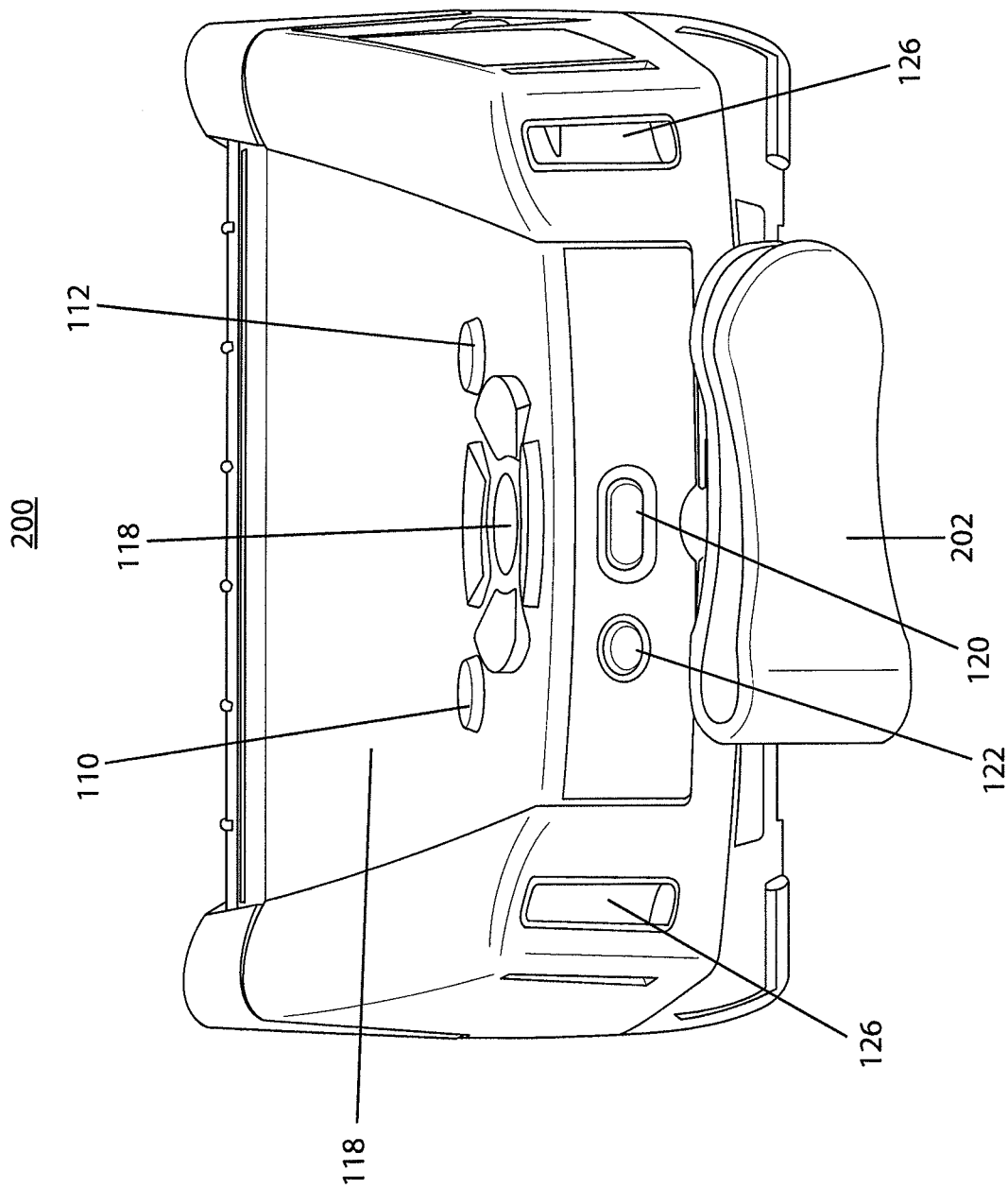
FIG. 3 shows a front view of the mobile printer discussed in connection with FIG. 2.

FIGS. 3-7 show different views of printer 200. For example, FIG. 3 shows a front view of printer 200.

Figure 4:
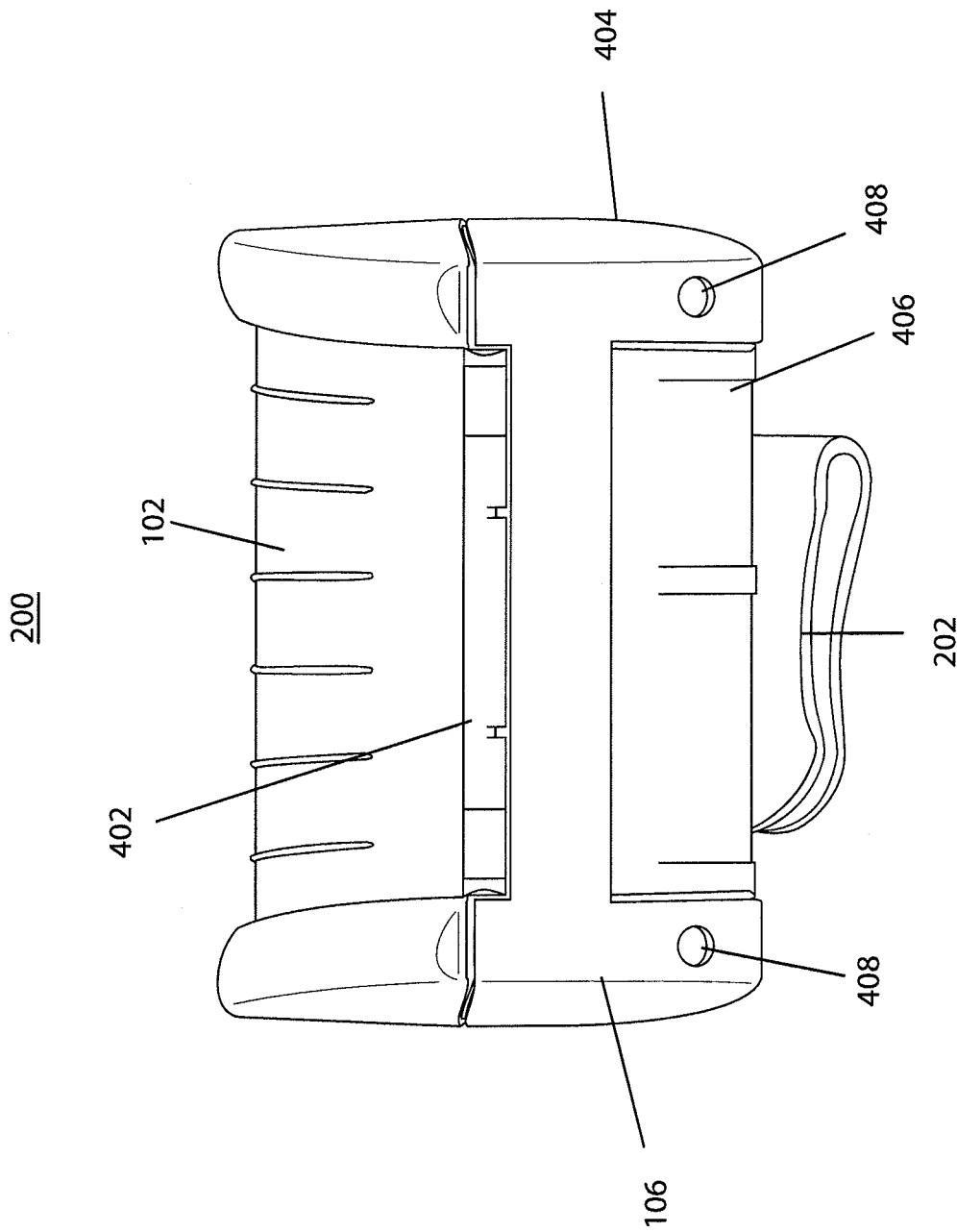
FIG. 4 shows a back view of the mobile printer discussed in connection with FIG. 2.

FIG. 4 shows a back view of printer 200. Hinge 402 can include a spring or other mechanism that allows media cover 102 to be driven open in response to a latch being released. For example, cover release button 124 can be adapted to release such a latch when depressed by a user. When media cover 102 is open, media can be loaded into printer 200, media jams can be corrected, print ribbon or other consumable printing components can be replaced, among other things. Cover release button 124 can also be configured to release and/or drive a peel bar from a non-peeling position to a ready and/or peeling position. Additional examples of peel bars' functionality, including examples of the non-peeling, ready and peeling positions, are provided in commonly-assigned U.S. patent application Ser. No. 13/085,422, titled "LABEL PEELING, UNIVERSAL PRINTHEADS AND RELATED METHODS," which is incorporated herein in its entirety by reference.

In other embodiments, the peel bar can function independent from cover release button 124. For example, cover release button 124 can be configured to open media cover 102 without causing the peel bar to be released from the latched position.

In some embodiments, cover release button 124 may be configured to function differently depending on how it is utilized (e.g., depressed). For example, when cover release button 124 is depressed partially, media cover 102 may be opened, and when cover release button 124 is depressed further (e.g., all or most of the way down), the peel bar can be released to a ready and/or peeling position.

The back view of printer 200 also shows that its housing was assembled from two pieces, namely, defining portion 404 and base portion 406. Defining portion 404 meets base portion 406 underneath printer 200 (as opposed to along the lateral sides such as housing 106 of mobile printer 100). FIGS. 11A and 11B show defining portion 404 separated from base portion 406.

Hinge 402 can attach media cover 102 to defining portion 404, and fasteners 408 (which may be screws and/or any other type of mechanical fasteners) can attach defining portion 404 to a flange of base portion 406. In some embodiments, the circuit board(s) of mobile printer 100 can be removed from (e.g., slid out of) housing 106 after base portion 406 is separated from defining portion 404. Each portion or sub-portion(s) of printer 200's housing can be constructed from any type of material, and may have a varying degree of transparency or opaqueness. For example, media cover 102 can be transparent, while the rest of the housing can be opaque.

Figure 5:
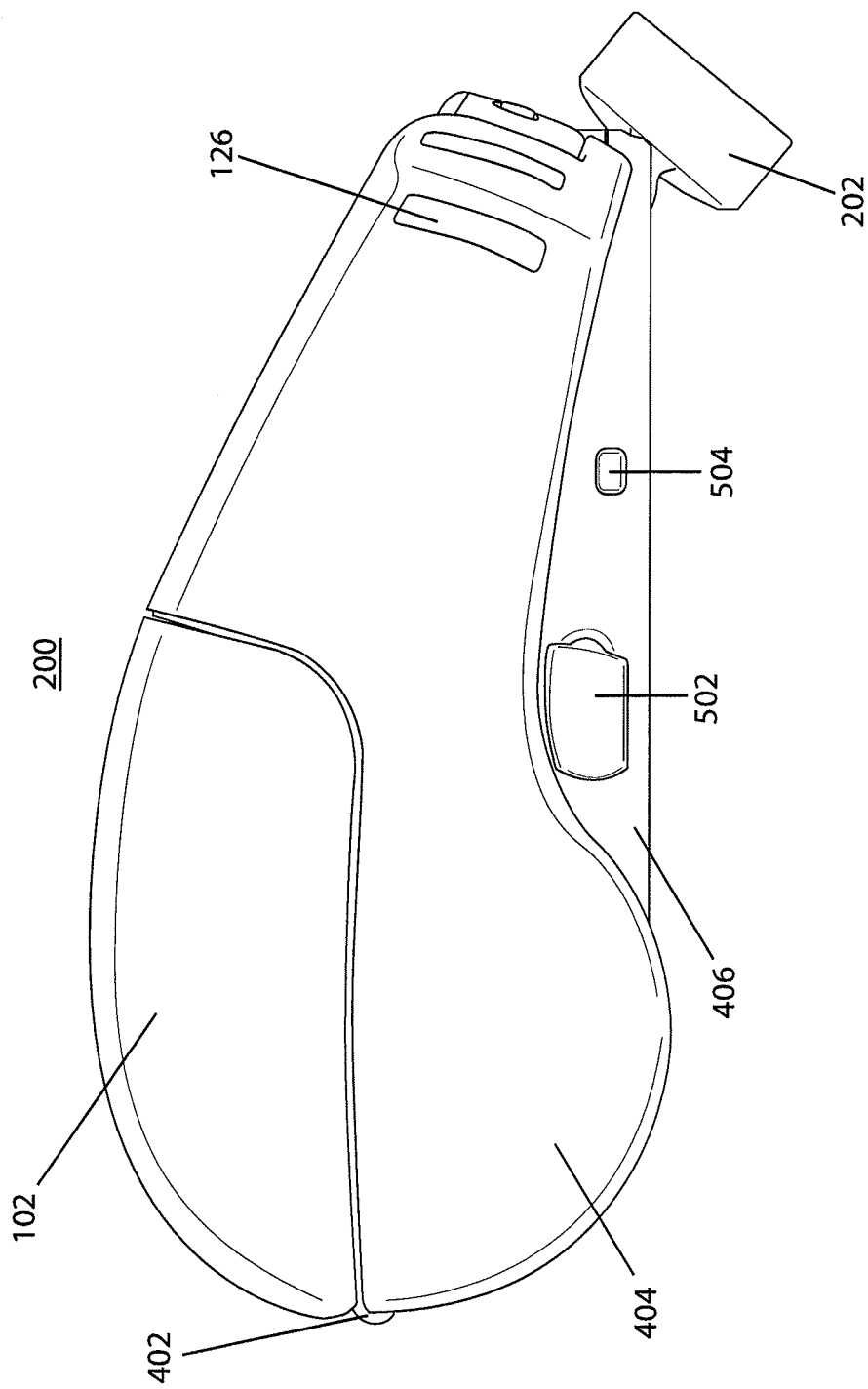
FIG. 5 shows a left side view of the mobile printer discussed in connection with FIG. 2.

FIG. 5 shows a left side view of printer 200, which includes protective cover 502 and alignment cavity 504. Similar to or the same as protective cover 128, protective cover 502 may be removed to expose one or more input, output, and/or input/output components that enable a power source, peripheral device, accessory device, network device, and/or other apparatus to be coupled with the circuitry of printer 200. In some embodiments, printer 200 can be configured to accept and/or work with accessories common to other types or models of devices. For example, a battery charger may be coupled to a port behind protective cover 502 and used to charge the battery pack of printer 200.

Alignment cavity 504 can be used to facilitate the proper electro-mechanical coupling of printer 200 with one or more accessory devices. For example, a docking station (sometimes referred to more generally herein as a "dock"), charging station, or mobile palette (such as, e.g., a modified or existing Route Palette currently sold by Zebra Technologies Corp., which is shown in FIGS. 7A and 7B) may define a protrusion that corresponds with and fits into cavity 504. As referred to herein, a "charging station," refers to an apparatus that can function as a source of power for charging the batteries of a mobile or other type of printer without facilitating data communications between the printer and a networked device. A "docking station," as used herein, refers to an apparatus that can receive and electrically couple with a printer, function as a source of power to charge the printer's batteries, and facilitate data communications between the printer and a host device (e.g., provide Ethernet communications to a network server). In some embodiments, a docking station may be associated with a fixed physical location that is known to the host device and can be used to determine the location of printer 200. Exemplary docking stations are shown and discussed in connection with, e.g., FIGS. 12A-14 and 18A-18H.

FIGS. 6A and 6B show two different example right side views of printer 200, which are both shown as including cavity 602. Cavity 602 may be a detent adapted to receive a coupling mechanism, and may be the same as or similar to cavity 504 in design, functionality and/or application. In other embodiments (not shown), cavity 602 can take a different shape and/or form to cause printer 200 to be aligned in a particular manner relative to, e.g., a docking station or other apparatus. For example, notch 1108 of FIG. 6B is an example of another type of receptacle that may be configured to act as a mechanical connection interface that is used to align and/or otherwise enable printer 200 to mate with an accessory device. Notch 1108 and its operation is discussed further in connection with, e.g., FIGS. 11A-12H.

In some embodiment, cavities 504, 602 and/or notch 1108 may operate to mechanically align printer 200 in a desirable presentation manner when printer 200 is docked onto a docking station and/or mated with any other apparatus. By being properly aligned and coupled with a docking station, for example, the location of printer 200 may be determined based on the docking station's known location.

FIGS. 7A and 7B show palette 702 that can be configured to receive terminal 704 and printer 200 and/or any other printer in accordance with some embodiments discussed herein. Printer 200 may be configured to communicate with terminal 704 via connections within palette 702 (for a sense of enhanced security) and/or wirelessly (via Bluetooth, WiFi, RFID and/or cellular, among others). A user can then use palette 702, terminal 704 and printer 200 as shown in FIG. 7B. Palette 702, printer 200 and various other apparatuses in accordance with some embodiments discussed herein can include one or more common accessory interfaces, which may include electrical and/or mechanical coupling components configured to mate with one another, some examples of which are discussed below in connection with FIGS. 9, 11A-11B. The common accessory interface may allow printer 200 to be removed from palette 702 and another, different type of printer to be installed in the place of printer 200.

Circuitry

FIG. 8 shows a block diagram of example circuitry that may be included in printer 800. Printer 800 may be embodied as a desktop, mobile and/or any other type of printer, some examples of which are discussed herein, including printers 100 and 200 discussed above. As shown in FIG. 8 and in accordance with some embodiments, printer 800 includes various means, such as processor 804, memory 806, communication interface 808 and user interface 810 that can be configured to perform the various functions herein described. These means of printer 800 as described herein may be embodied as, for example, hardware elements, including control circuitry (e.g., processor 804, including any suitably programmed processor and/or combinational logic circuit, among other things), a computer program product comprising computer-readable program instructions (e.g., software/firmware) stored on a nontransitory computer-readable medium (e.g., memory 806) that is executable by the printer's other circuitry (e.g., processor 804), or some combination thereof.

Processor 804 may, for example, be embodied as various means including one or more microprocessors with accompanying digital signal processor(s), processor(s) without an accompanying digital signal processor, one or more coprocessors, multi-core processors, controllers, computers, various other processing elements including integrated circuits such as, for example, an ASIC (application specific integrated circuit) or FPGA (field programmable gate array), or some combination thereof. Accordingly, although shown in FIG. 8 as a single processor, in some embodiments processor 804 comprises a plurality of processors and/or any other type of control circuitry. The plurality of processors, for example, may be embodied on a single computing device or may be distributed across a plurality of computing devices collectively configured to function as printer 800. The plurality of processors may be in operative communication with each other and may be collectively configured to perform one or more functionalities of printer 800 as described herein. In an example embodiment, processor 804 is configured to execute instructions stored in memory 806 and/or that are otherwise accessible to processor 804. These instructions, when executed by processor 804, may cause printer 800 to perform one or more of the functionalities of printer 800 as described herein. As such, whether configured by hardware, firmware/software methods, or by a combination thereof, processor 804 may comprise an entity capable of performing operations according to embodiments of the present invention while configured accordingly. Thus, for example, when processor 804 is embodied as an ASIC, FPGA or the like, processor 804 may comprise specifically configured hardware for conducting one or more operations described herein. Alternatively, as another example, when processor 804 is embodied as an executor of instructions, such as may be stored in memory 806, the instructions may specifically configure processor 804 to perform one or more algorithms and operations described herein.

Memory 806 may comprise, for example, volatile storage, non-volatile storage, or some combination thereof. Although shown in FIG. 8 as a single memory component, memory 806 may comprise a plurality of memory components. The plurality of memory components may be embodied on a single computing device or distributed across a plurality of computing devices. In various embodiments, memory 806 may comprise, for example, a hard disk, random access memory, cache memory, flash memory, a compact disc read only memory (CD-ROM), digital versatile disc read only memory (DVD-ROM), circuitry configured to store information, any other type of memory, or some combination thereof. Memory 806 may be configured to store information, data, applications and instructions, among other things, for enabling printer 800 to provide various functionality in accordance with some example embodiments of the present invention. For example, memory 806 is configured to buffer input data for processing by processor 804. Additionally or alternatively, in at least some embodiments, memory 806 can be configured to store program instructions for execution by processor 804. Memory 806 may store information in the form of static and/or dynamic information. This stored information may be stored and/or used by printer 800 during the course of performing its functions.

Communication interface 808 may be embodied as any device or means embodied in circuitry, hardware, a computer program product comprising computer readable program instructions stored on a computer readable medium (e.g., memory 806) and executed by a processing device (e.g., processor 804), or a combination thereof that is configured to receive and/or transmit data from/to another device, such as, for example, a second printer 800 and/or the like. In some embodiments, communications interface 808 can be a component of a common accessories interface, which may also include a mechanical interface. Examples of devices using and aspects of a common accessory interface are discussed herein in connection with, e.g., FIGS. 9-14 and 16-18H.

In some embodiments, communication interface 808 is at least partially embodied as or otherwise controlled by processor 804. As referred to herein, being "controlled" by processor 804 includes processor 804 providing commands and other types of instructions as well as receiving and responding to data received by the components being instructed, among other things. In this regard, communication interface 808 may be in communication with processor 804, such as via a bus (not shown). Communication interface 808 may include, for example, an antenna, a transmitter, a receiver, a transceiver, network interface card and/or supporting hardware and/or firmware/software for enabling communications with another computing device. Communications interface 808 may also include one or more sensors, such as sensor 802, which can be configured to detect various environmental and/or other conditions (e.g., ambient light, acceleration, component position, etc.). Communication interface 808 may also be configured to receive and/or transmit data using any protocol suitable for facilitating communications between computing and/or other types of devices. Examples of docking stations are provided herein, such as in connection with, e.g., FIGS. 7A, 7B, 12-14 and 18A-18H. Communication interface 808 may additionally be in communication with the memory 806, user interface 810 and/or any other component of printer 800, such as via a bus (not shown).

User interface 810 may be in communication with processor 804 to receive an indication of a user input and/or to provide an audible, visual, mechanical, or other output to a user. As such, user interface 810 may include, for example, display 108, left button 110, right button 112, menu button 114, back button 116, navigation buttons 118, feed button 120, power button 122, an audio transducer, and/or other input/output mechanisms.

Printer 800 may also include one or more drive motors 812, which may be configured to move one or more media units when printing, among other things. Drive motors 812 can be controlled by, e.g., processor 804. For example, processor 804 can be configured to cause electric drive motors 812 to move one or more media units past a printhead at a first speed. In some embodiments, processor 804 and drive motors 812 can be configured to move various media units at various speeds. Additional examples of controlling print speed are provided in commonly-assigned U.S. patent application Ser. No. 13/085,422, titled "LABEL PEELING, UNIVERSAL PRINTHEADS AND RELATED METHODS," which is incorporated herein in its entirety by reference.

Electrical Interface and Circuit Board Layout

FIG. 9 shows a bottom view of printer 200, which includes battery cover 902 and electrical contacts 904. Electrical contacts 904 may be part of communications interface 808 discussed above. Electrical contacts 904 can be configured to work together as a single electrical interface. In other embodiments, one or more of the electrical contacts shown in FIG. 9 can be incorporated into a cable and/or any other type of interface. For example, electrical contacts 904 can be a single 16-pin interface that can allow printer 200 to have wired network communications while charging its battery from a mains and/or other power source. Examples of the 16-pin and other types of interfaces are discussed further in connection with, e.g., FIGS. 16 and 17.

Electrical contacts 904, like other electrical components discussed herein, can be coupled to internal circuitry, such as the circuitry discussed in connection with FIG. 8. FIGS. 10A-10F show a more detailed example of circuitry in accordance with some embodiments. Because some applications of mobile printers may benefit from the printer being relatively small, light and rugged, some embodiments discussed herein may include the printer's internal circuitry being split among multiple circuit boards as shown in FIGS. 10A-10F.

The circuit boards can be linked together using a three dimensional ("3D") approach. For example, multiple boards and components thereon can be laid out and designed such that they fit together like a 3D puzzle, thereby giving a relatively low vertical profile despite being stacked. In addition, the circuit boards can be layered together to realize a reduction in wireless emissions and other noise between the boards. Board 1002 can be the main board that has the processor (and other processing circuitry, such as processor 804) and/or memory (e.g., memory 810) installed thereon. Board 1004 can be configured to be the personality board that has the various input and output interfaces mounted therein. The input/output interfaces can, for example, be coupled to components such as display 108, left button 110, right button 112, and navigation buttons 118. Board 1006 can be configured to be a capsulated power interface board and/or "dock board" that can be coupled to electrical contacts 904 (discussed above) and/or battery pack container 1008. Board 1006 can be used in a printer to provide a flexible power and/or wired communications interface that is configured to mate with various accessories and other devices, some examples of which are discussed herein. Ribbon interfaces, such as interface 1012, can be used to electrically couple boards together. Board 1010 can also be included a remote wireless board. For example, board 1010 can include Bluetooth component 1016 on one side and WiFi component 1016 on the other side, as shown in the circuitry exploded view of FIG. 10E. Additional examples of printer circuitry arranged on plurality of circuit boards are provided in U.S. patent application Ser. No. 13/085,438, titled "PRINTER MOBILITY AND SCALABILITY," which is incorporated herein in its entirety by reference.

Electrical contacts 904, shown in FIG. 10D, can be used when coupling printer 200 to a peripheral device, docking station or other type of apparatus. For example and as discussed above, electrical contacts 904 can facilitate the transfer of power to and/or from printer 200. When used as a power port, one or more of electrical contacts 904 can be used to charge the batteries of printer 200 as discussed above. As another example, electrical contacts 904 can function as an input port, output port, or combined input/output port that facilitates the transfer of data to and/or from printer 200 and/or the smart battery pack. When used as a data port, electrical contacts 904 can engage with, for example, a docking station and allow printer 200 and smart batteries therein to have Ethernet and/or other type(s) of network connectivity as discussed above. Smart docking may also be implemented, thereby enabling printer 200 and/or smart batteries to establish an Ethernet connection when power is provided (via, e.g., electrical contacts 904 or any other power port of printer 200). Smart docking may help increase the battery life of printer 200 by only implementing power consuming data communications while connected to an external power source. In some embodiments, power may be drawn over the Ethernet connection to charge one or more batteries of printer 200 or enable printer 200 to run without depleting its battery power.

In some embodiments, examples of which are discussed below, battery pack container 1008 can include and/or be coupled to circuitry 1018. The electrical contacts of circuitry 1018, which are configured to facilitate the transfer of power from a battery pack inside battery pack container 1008, can be elongated as shown in FIG. 10E. The elongated contacts can allow the same design/type of battery pack container 1008 to be used in printers having various sizes. For example, in a relatively small printer housing (such as a printer adapted to accommodate a two inch media roll), board 1002 may be mounted in the center of the printer's housing and make contact with the right-side portion of the contacts included in circuitry 1018. However, in a larger printer's housing (such as a printer adapted to accommodate a four inch media roll, while retaining the whistle shape shown in some of the drawings), board 1002 may be mounted towards the right of the printer's housing and make contact with the left-side portion of the contacts included in circuitry 1018 (if the battery pack is located in the center of the printer). As referred to herein, the "whistle" shape refers a more rounded back portion that is configured to receive media units via media cover 102, and tapers to a relatively thinner front portion that is not as high as the back portion and is more straight than the back portion. The front portion includes one or more user interface components on a relatively flat surface located generally at a distal end opposite the rounded portion. A display screen and/or other type of user interfaces may be located on the "top" surface in portion of the printer's housing that defines the taper. As used herein, the relative "front", "back", "top", "bottom", "right" and "left" would be understood to one of ordinary skill in the art in view of the description of the drawings FIGS. 3-6B and 9 that are referred to as "front", "back", "bottom", "right" and "left" side views. The whistle shape may allow printers to be smaller and lighter.

FIG. 10E shows an exploded view of the circuitry and other internal components that may be included in a printer in accordance with some embodiments discussed herein, such as printers 100 and 200 discussed above. In some embodiments, boards 1002, 1004, 1006 and/or 1010 may be mounted to a frame (not shown) without using screws or other types of fasteners. Instead of or in addition to fasteners, boards 1002, 1004, and/or 1006 can slide into slots created by protrusions in the frame. Additional examples of how circuit boards may be arranged within a printer are discussed in commonly-assigned U.S. patent application Ser. No. 13/085,438, titled "PRINTER MOBILITY AND SCALABILITY," which is incorporated herein in its entirety by reference.

Scalable Printer Housing

As noted above, the "whistle" shape of printer 200 and/or the overall size of the printer can be scalable and/or change for different printers. For example, a printer that is configured to accommodate a 4 inch medial roll may be larger than a printer that is configured to accommodate a media roll up to (and including) 2 inches. As another example, a larger display screen may be included as an upgrade to the standard sized display screen, requiring more space on defining portion 404 of the printer's housing.

While different printers may have differing sized and shaped defining portion 404 shown in FIG. 11A, the different printers can each include the same bottom housing portion, such as base portion 406 shown in FIG. 11B, that is at least substantially the same shape and size. The common bottom or "base" housing portion can also include, for example, a coupling area that includes a common communications interface, such as electrical contacts 904, detents 504 and 602, and/or notches 1108, among other things, which can be spaced apart and shaped consistently across printers and/or other devices. In some embodiments, the coupling area can be defined by the size and shape of at least the portion of base portion 406 that includes these features. For example, all base portions and/or coupling areas may be defined by the same width, "w", of the portion of base portion 406 that includes battery receptacle 1110. Even embodiments that do not include a battery receptacle or a smaller battery receptacle than what is shown in FIG. 11B, may include one or more pieces of housing that separates detent 602 from detent 504 (not shown in FIG. 11B, but discussed above in connection with FIG. 5) and/or separates notches 1108 at the width "w". In other words, the coupling area can be defined by the relative positioning of notches 1108, electrical contacts 904 (e.g., flanking the distal ends of electrical contacts 904) and/or detents 504, 602 in three dimensional space. An accessory device and/or any other type of device, some examples of which are discussed in connection with FIGS. 7A, 7B, and 12A-14F, may include a reciprocal coupling area that is configured to receive, engage and/or otherwise couple with one or more of notches 1108, electrical contacts 904 and/or detents 504, 602.

Incorporating such homogenous base portions and/or at least common coupling areas with different printer housing defining portions and/or types of devices (having, e.g., different sizes, features, materials and functionality, among other things) can enable a wide variety of printers and/or other devices to be configured to interface with common accessories and peripheral devices, among other things, that include a reciprocal coupling area configured to mate with the features included in the coupling area shown FIG. 11B. For example, wider mobile printers may be configured to accommodate wider rolls of media by having a wider defining portion 404, but have the same or similar sized and shaped base portion 406 (or at least same or similar sized and shaped coupling area) as a smaller printer that is configured to accommodate narrower rolls of media. As another example, longer mobile printers may be configured to accommodate larger display screens and/or more buttons by having a longer defining portion 404, but have the same or similar sized and shaped base portion 406 (or at least same or similar sized and shaped coupling area) as a shorter printer that is configured to accommodate smaller display screens. Despite the relatively larger width and/or length, some embodiments of wider, longer mobile printers may still conform to the whistle shape shown in FIGS. 1, 2 and 5-6B. Similarly, other printers (not shown) that do not conform to the whistle shape may still have the common coupling area and/or base portion 406.

Further to the discussion above, the seam line between defining portion 404 and base portion 406 does not run around the lateral sides of printer 200, but instead runs off center along the bottom edge of the printer's housing. While some embodiments of mobile printers may utilized a split "Upper/Lower" housing approach (such as that shown in FIG. 1), other embodiments may use more of an "defining/base" housing body design (such as that shown in FIGS. 4-7, 11A and 11B, for example). The defining/base split can create a more continuous uni-body structure that may fare much better in durability testing. The complexity of overmolds sometimes applied to printer housings can also been reduced with the defining/base split of the printer's housing discussed herein. For example, rather than apply an overmold to both the upper and lower housing portions, the overmold may instead be applied to only the defining portion of the housing. Additionally, printer housings that utilize the defining/base body design may realize improved durability as a result of eliminating the seam line on the portion of the external, outer plastic printer housings that is most likely to contact the ground when dropped on the printer's side wall 1102, front wall 1104, and curved back wall 1106, which are shown in FIG. 11A. Because base portion 406 is within and at least largely surrounded by defining portion 404 on all four sides as well as its top portion, base portion 406 is largely protected by defining portion 404 and its protective features (such as an overmold).

In other embodiments, the seam line between the base portion and defining portion may run along a top edge of the bottom portion (as opposed to the bottom edge of the upper portion as shown in FIGS. 11A and 11B), and the bottom portion may be considered the "defining" portion of the printer's housing (not shown) that is configured to at least largely surround all four sides and the bottom of a top portion. Similarly, one skilled in the art may realize from the discussion herein that the seam line may run along a back edge, front edge, right side edge, or any other edge (none which are shown), such that the defining portion is neither the "top" nor the "bottom" of the printer's housing without departing from the spirit of the embodiments discussed herein. In these alternative embodiments, like those shown in FIGS. 11A and 11B, one piece of the printer's housing substantially surrounds at least five of the six sides of the printer.

Base portion 406, as shown in FIG. 11B, can also be used as part of a common accessories interface that can mechanically and/or electrically couple with a variety of different printers, thereby reducing the number of printer accessories needed to support one or more product lines. For example, the defining/base housing design and the features incorporated in the base portion can allow for a single accessories interface across printer family sizes. Printers having a whistle shape (such as those shown in FIGS. 4-7, 11A and 11B), for example, can have a common base area, shape and coupling components regardless of the printer's overall width (as determined by defining portion 404 of the printer's housing in the example shown in FIGS. 11A and 11B). For example, in addition to the coupling components discussed above (e.g., cavity 504 and cavity 602 adapted to receive a spring loaded or other type of mechanical coupling device and electrical contacts 904), base portion 406 can also include notches 1108 adapted to receive and lock onto male connecting components of a docking, peripheral, and/or other accessory device, among other things.

Defining portion 404 and/or base portion 406 can also include and or be adapted to integrate with one or more strain relief components, such as locking strain relief component. Among other things, strain relief component(s) may help reduce and/or eliminate strain placed on internal circuitry by a universal serial bus ("USB") and/or other input/output cables. The strain can result from a connection made to a second printer, portable data terminal, scanner, credit card reader, personal computer, etc., Additional examples of strain relief components are provided in commonly-assigned U.S. patent application Ser. No. 13/085,438, titled "PRINTER MOBILITY AND SCALABILITY," and commonly-assigned U.S. Pat. No. 7,066,754, titled "PRINTER CABLE AND ASSOCIATED STRAIN RELIEF COLLAR FOR CREATING A RUGGEDIZED CONNECTION FOR AN ELECTRICAL TERMINAL OF A PRINTER AND ASSOCIATED METHODS THEREFOR," both of which are incorporated by reference herein in their entireties.

Docking and Undocking of Mobile Printer

Mobile printers sometimes connect to a network using wireless technology, which drains battery power of the mobile printer relatively quickly. Docks, such as docking unit 1200, docking station 1300 and 1302 shown in FIGS. 12A-14F, can be configured to electromechanically couple to a mobile printer, such as printer 200, and provide the printer wired network connectivity while docked.

FIGS. 12A-12D show various views of docking unit 1200. Docking unit 1200 may include electrical interface component 1202, which may be configured to facilitate communications with a printer and/or any other device. Docking unit 1200 may also be configured to connect to one or more power sources (e.g., analog to digital converter, mains power, battery, etc.), or more wired networks (e.g., the Internet, corporate intranet, etc.) and/or any other devices via one or more additional cables and/or components (not shown).

Electrical interface component 1202 can enable data, power, ground and other types of signals to be provided to, for example, a printer's electrical interface component (such as electrical contacts 904). For example, electrical interface component 1202 can comprise at least 10 and no more than 19 individual electrical contacts, wherein the individual electrical contacts of electrical interface component 1202 are arranged in a single linear row as shown in FIG. 12B. Each of the individual electrical contacts can be electrically isolated from the others.

Docking unit 1200 may also include one or more mechanical interfaces, such as curved protrusions 1204A and 1204B shown in FIGS. 12A-12C, which are configured to engage, receive and/or otherwise mate with another device regardless of the device's overall shape or size. Curved protrusions 1204A and 1204B can each be configured to engage a receptacle (such as notches 1108) included in another device (such as printer 200). For example, protrusions 1204A and 1204B can flank the distal ends of the linear electrical interface component 1202 (which may be positioned there between as shown in FIG. 12B), and have a question mark shape that begins with a straight portion and terminates in a curved portion next to electrical interface component 1202. As such, protrusions 1204A and 1204B can be male connector components that are configured to guide and removably lock a device (such as, e.g., printer 200) into position, such that the device's electrical interface (such as, e.g., electrical contacts 904) makes sufficient contact with electrical interface component 1202. Another example of curved protrusions, which do not have a question mark shape and are only curved, are discussed in connection with FIG. 12M. Also discussed in connection with FIG. 12M and with FIG. 12N are stoppers that may be used in connection with various types of curved protrusions that are used to mate a dock with a printer and/or any other pair of devices.

Docking unit 1200 may also include one or more user interface components. For example, light emitting device 1206 can indicate whether Ethernet (and/or any other type of network) communications are taking place (e.g., the light can flash when communications are taking place). As another example, light emitting device 1208 can be illuminated when the dock is receiving sufficient power. In some embodiments, light emitting device 1208 may be illuminated regardless of whether a printer is in the dock and/or properly coupled thereto. In other embodiments, the illumination of light emitting device 1208 can be dependent on the connection state with the printer and/or any other criteria. In some embodiments, the lack of illumination of one or both of light emitting devices 1206 and 1208 can have special meaning, which the user may appreciate. An example of additional components that may be included in light emitting devices 1206, 1208 are discussed in connection with FIGS. 12O-12Q.

In other embodiments (not shown), one or more other user interface components may be provided in addition to or instead of light emitting devices 1206, 1208. For example, a display screen, touch sensitive component, one or more buttons, and/or audio transducer, among other things may be included in docking unit 1200.

Docking unit 1200 may have any suitable dimensions. For example, "L" shown in the top view of FIG. 12B may be 5.10 inches; "W" shown in the front view of FIG. 12C may be 5.90 inches; and "H" shown in the right-side view of FIG. 12D may be 2.34 inches. Docking unit 1200 may also include curved trough 1210 which may be configured to receive a device, such as a printer 200. Although the size and shape of curved trough 1210 and the various other physical attributes of docking unit 1200 may be fixed and not adjustable, docking unit 1200 may be able to mate with various sized and shaped printers that have a common base portion (such as base portion 406 discussed above) having a common accessory interface. For example, the shape and size of at least a portion of the dock (including, e.g., curved trough 1210), the mechanical interface (e.g., curved protrusions 1204A and 1204B, optional retention tabs, etc.) and the electrical component interface can define the dock's coupling area, which may be configured to couple with a printer's (or other device's) coupling area (such as that discussed above in connection with FIG. 11B).

FIG. 12E shows an example of what printer 200 may look like when mated with docking unit 1200. While mated, printer 200 may receive power and/or communications from docking unit 1200.

FIGS. 12F-12H show how printer 200 or any other type of device including a common accessory interface may be electromechanically mated to docking unit 1200. For example, printer 200 can approach docking unit 1200 in the direction shown by motion arrow 1212. When printer 200's mechanical interface (e.g., notches 1108) comes into contact with protrusions 1204A, 1204B while moving in the direction of motion arrow 1212, the shape of protrusions 1204A and 1204B can cause printer 200 to move in the direction of motion arrow 1214 shown in FIG. 12G. When mated, printer 200 may rest on docking unit 1200 as shown in right-side view of FIG. 12H.

In some embodiments, as shown in FIGS. 13A-13E, two or more docking units, similar to or the same as docking unit 1200, can be combined (permanently or removably) to form multi-printer docking station 1300. For example, docking unit 1200 may include an attachment mechanism (not shown) on one or more of its sides that enables docking unit 1200 to be removably or non-removably connected (electrically, mechanically, or combination thereof) to one or more other docking units and/or any other type of device. Alternatively, some embodiments of docking station 1300 can be a completely separate device that is not formed from a plurality of individual docking units, but is instead manufactured as a single unit.

FIGS. 12I-12D show various views of docking unit 1220. Docking unit 1220 may include one or more of the components that are the same as or similar to those included in docking unit 1220, such electrical interface component 1202, protrusions 1204A, 1204B, light emitting devices 1206, 1208 and trough 1210. Like the other docks discussed herein, docking unit 1220 may be configured to facilitate communications with a printer and/or any other device. Docking unit 1220 may also be configured to connect to one or more power sources (e.g., analog to digital converter, mains power, battery, etc.) via power port 1222, or more wired networks (e.g., the Internet, corporate intranet, etc.) via wired network port 1224 and/or any other devices via one or more additional cables and/or components (not shown). For example, an analog-to-digital converter or other type of device can be connected to power port 1222. As another example, wired port 1224 can be connected to, e.g., an Ethernet cable, USB cable, wireless communication port, and/or any other type communications component.

Docking unit 1220 may also include eject button 1226, which may be configured to decouple a printer or other device mated to docking unit 1220. For example, in response to eject button 1226 being depressed by a user, plunger 1228 may protrude (as shown in FIG. 12I) from its retracted position (as shown in FIG. 12J) and push the printer in an upward direction. Eject button 1226, plunger 1228 and an example internal assembly that couples the two together are discussed further in connection with, e.g., FIGS. 14E and 14F.

The printer may also include detents and/or other type of receptacles (such as cavities 504, 602 discussed herein) that are configured to receive and couple with retractable retention tabs 1230A and 1230B (retention tab 1230B is not shown in the rear isometric view of FIG. 12I, but is shown in the top view of FIG. 12J). Retention tabs 1230A, 1230B can be spring loaded, rounded members that can be retracted into the housing of docking unit 1220 in response to a force being applied to them. The upward force applied by plunger 1228 can be sufficient to cause the housing of docking unit 1220 to cause retention tabs 1230A, 1230B to be retracted within the docking unit's housing, thereby allowing docking unit 1220 to decoupled from the printer (or other type of device). A more detailed example of retention tabs 1230A,B are discussed further in connection with, e.g., FIGS. 12K and 12L. Although eject button 1226, plunger 1228 and retention tabs 1230A, 1230B are only discussed in reference to a docking unit, one skilled in the art would appreciate that these (and other) features may be incorporated in other devices discussed herein. Similarly, various combinations and omissions of features discussed herein may be included in devices and methods in accordance with some embodiments.

FIG. 12K shows a more detailed view of retention tabs 1230A,B mounted in a dock's housing and/or any other type of apparatus. Retention tabs 1230A,B and their relative placement may also (help) define the coupling area of the dock.

FIG. 12L shows example components and shapes of the components of retention tabs 1230A,B. For example, retention tabs 1230A,B may each include spring 1232, spring mount 1234, flange 1236 and hemispheric tip 1238. Spring 1232 may be configured to provide enough force to lock a printer securely in the dock, while still being compressible in response to a plunger pushing the printer in a direction orthogonal to that of the force exerted by spring 1232. Spring mount 1234 can be configured to receive spring 1232. Flange 1236 can be configured to stop retention tab 1230A,B from being ejected from the housing of the dock. Flange 1236 can also be configured to exert a force on spring 1232 that is sufficient to cause spring 1232 to compress in response to a printer being removed from the dock.

FIG. 12M shows a more detailed view of an example electrical interface 1202 and curved protrusions 1240 that may be included in docks in accordance with some embodiments discussed herein. Electrical interface 1202 and curved protrusions 1240 and their relative placement in the dock may also (help) define the coupling area of the dock.

Curved protrusions 1240 may be similar to curved protrusions 1204A,B. However, curved protrusions 1240 may not be question marked shape, such as curved protrusions 1204A, B, and may only include the curved portion of the question mark. Located below each curved protrusion 1240 is stopper 1242, an example of which is discussed in greater detail in FIG. 12N.

Also shown in FIG. 12M are ribs 1244A and 1244B. Ribs 1244A and 1244B can be configured to prevent damage to interface 1202 that may otherwise be sustained when a printer and/or other device is mounted to the dock. Ribs 1244A and 1244B can be, for example, 1.5 mm in height. Additionally, the dock's housing can be sloped at 1246A and 1246B.

FIG. 12N shows the bottom of stopper 1242 as mounted to a dock. For example, stopper 1242 can be mounted inside of the dock using protrusions 1248. Stopper 1242 can be assembled into the upper case of the dock by heat stake and be configured to close the opening crated in the housing when manufacturing protrusions 1240 of the dock.

FIGS. 12O-12Q show an example of additional components that may be included in light emitting devices 1206, 1208. Light emitting devices 1206, 1208 can be an LED illuminated light pipe made from diffusion polycarbonate material. In some embodiments, the light pipe material can be fogged. One or more mounting components 1250 and 1252 may be included in light emitting devices 1206, 1208 to enable light emitting devices 1206, 1208 to be incorporated into a dock.

To avoid a hot spot and make the light appear evenly illuminated to a user, four LEDs 1254A,B and 1256A,B, may be used in light emitting devices 1206, 1208. For example, LEDs 1254A and 1256A can be used to illuminate light emitting device 1208, while LEDs 1254B and 1256B can be used to illuminate light emitting device 1206. One or more of LEDs 1254A,B and 1256A,B may be a soft tool light pipe, which has had good preliminary test results.

As shown in FIG. 12Q, foam 1258 may be included in light emitting devices 1206, 1208. Foam 1258 may help reduce the light interaction between light emitting devices 1206 and 1208.

Docking station 1300 is shown in FIGS. 13A-13E as including four docks that each include its own electromechanical interface components, such as those discussed in connection with FIGS. 12A-12D. Each dock can be mated to a printer, such as printers 200A, 200B and 200C shown in the front isometric view of FIG. 13A. FIG. 13B. shows a rear isometric view of docking station 1300 having one printer, printer 200A, mated thereto.

Docking station 1300 may have any suitable dimensions. For example, "L" shown in the top view of FIG. 13C may be 5.64 inches; "W" shown in the front view of FIG. 13D may be 21.20 inches; and "H" shown in the right-side view of FIG. 13E may be 2.34 inches. Each dock of docking station 1300 may include an electromechanical interface (such as, e.g., protrusions 1204A, 1204B and electrical interface component 1202) and a curved trough configured to receive a device, such as a printer 200, among other things. Although one or more of the docks included in docking station 1300 may include a different electromechanical interface and/or different size/shape than another dock included in docking station 1300.

One or more docks of docking station 1300 may also share one or more user interface components. For example, as shown in FIG. 13C, one pair of light emitting devices 1206 and 1208 can be included in docking station 1300. In other embodiments, each dock of docking station 1300 or various combinations of docks (e.g., pairs of docks) may have one or more dedicated user interface(s).

FIG. 14A shows how a docking unit and/or docking station, such as docking unit 1200 or docking station 1300, and/or any other apparatus having a dock can be mounted to a wall with a printer, such as printer 200, coupled thereto.

FIGS. 14B and 14C show various internal components of a docking unit. Like components have like reference numerals. FIG. 14B shows a top view and FIG. 14C shows a bottom view.

In addition to some of the components discussed above, FIGS. 14B and 14C also respectively show a top and bottom view of ejector assembly 1402 that couples eject button 1226 and plunger 1228 together. Ejector assembly 1402 can also be configured to convert a downward mechanical motion applied to eject button 1226 into an upward mechanical motion of plunger 1228. A more detailed example of ejector assembly 1402 is discussed further in connection with, e.g., FIGS. 14E and 14F.

Also shown in FIGS. 14B and 14C is circuit board 1404, which may be configured to include one or more electrical connections and/or circuitry to facilitate the flow of power, data and/or other types of electrical signals. In some embodiments, the dock's circuitry can include a control processor, memory and/or any other suitable component. For example, circuit board 1404 can include connection components between a primary and/or secondary RJ45 interface components and/or a direct current ("DC") port. One or more of the ports included in the dock can be mounted inside the housing to avoid electrostatic discharge, among other things. For example, the communication port(s) and power port(s) can be mounted 1 mm within the housing's exterior surface. As referred to herein, the "primary port" may be a port used for communications with Ethernet and/or other type of routing device, whereas the "secondary port" may be used to conduct daisy chain communications. In some embodiments, only the primary port may be used to control the illumination of a visual indicator, such as light emitting device 1206.

Circuit board 1404 can be mounted to frame 1406 as can Velcro 1408 and wall mounts 1410. Velcro 1408 and/or wall mounts 1410 can be used to mount the dock to one or more other of apparatuses and/or fasten the adaptor. Ribs 1412 may also be included in the dock. Screws 1414 may be used to mount circuit board 1404 to frame 1406. Ribs 1414 may be used to constrain circuit board 1404 to frame 1406.

FIG. 14D shows a bottom view of the dock with the bottom portion of the dock's housing included (as opposed to FIG. 14C, which has the bottom portion of the dock's housing removed). Also shown in FIG. 14C are brass inserts 1416, which may be molded into the bottom of the dock when the dock is tooled. Rubber feet 1418 are also shown in FIG. 14C, which may be configured to prevent the dock from slipping when placed on a table and/or other type of surface.

FIG. 14E shows an example ejector assembly 1402. Ejector assembly 1402 may include mounting members 1420A and 1420B. One or more of mounting members 1420A and 1420B may also include a sprint, such as spring 1422, which may be configured to exert a force that causes eject button 1226 to remain up and plunger 1228 to remain within the housing and/or otherwise unobtrusive to the mounting of a printer in the dock. Spring 1422 can be configured to allow a user to depress button 1226 with sufficient force to cause plunger 1228 to protrude and eject a printer from the dock. Mounting members 1420A and 1420B can also be used to mount ejector assembly 1402 onto support members 1424A and 1424B, respectively (though the angle of the drawing of FIG. 14E does not shown support member 1424B, but the angle of FIG. 14F does). The curved trough of support members 1424A and 1424B in combination with the rounded shape of mounting members 1420A and 1420B can allow ejector assembly to rock on an axis running through the center of mounting members 1420A and 1420B in response to eject button 1226 being depressed.

Ribs 1426 may also be included in ejector assembly 1402 as shown in FIG. 14F. Ribs 1426 can aid in minimizing eject button 1226's potential to wobble, while enable eject button 1226 to more easily move up and down smoothly. Ribs 1426 may guide the movement of eject button 1226.

The printers and/or docks discussed herein can include circuitry configured to provide, for example, wired network access simultaneously with battery charging. In addition, some embodiments provide for a seamless, automatic transition between wireless network access to wired network access when docked. FIG. 15 shows an exemplary method, namely process 1500, that may enable a printer to automatically implement a seamless transition from wireless communications to wired communications, and vice-versa, in response to being docked and undocked. In some embodiments, rather than implement a fully automatic transition, a user and/or other device(s) (such as a host device) may be included in the process of transitioning from wireless network access to wired network access, and/or vice-versa.

FIG. 15, like FIG. 20 and the other methods discussed herein, may be implemented by and/or with the processor and/or other components of a printer, such as mobile printer 100, printer 200 and/or printer 800 discussed above. Like some other processes discussed herein, process 1500 is represented by a flow diagram in accordance with some exemplary methods, computer program products and/or systems discussed herein, including printers 100, 200 and/or 800. It will be understood that each operation, action, step and/or other types of functions shown in the diagram, and/or combinations of functions in the diagrams, can be implemented by various means. Means for implementing the functions of the flow diagram, combinations of the actions in the diagrams, and/or other functionality of example embodiments of the present invention described herein, may include hardware and/or a computer program product including a computer-readable storage medium (as opposed to or in addition to a computer-readable transmission medium) having one or more computer program code instructions, program instructions, or executable computer-readable program code instructions stored therein. For example, program code instructions associated with FIG. 15 may be stored on one or more storage devices, such as memory 806, and executed by one or more processors, such as processor 804. Additionally or alternatively, one or more of the program code instructions discussed herein may be stored and/or performed by distributed components, such as those discussed in connection with printers 100, 200 and/or 800. As will be appreciated, any such program code instructions may be loaded onto computers, processors, other programmable apparatuses (e.g., printer 100, 200 and/or 800) from one or more computer-readable storage mediums (e.g., memory 806) to produce a particular machine, such that the particular machine becomes a means for implementing the functions of the actions discussed in connection with, e.g., FIG. 15 and/or the other drawings discussed herein.

The program code instructions stored on the programmable apparatus may also be stored in a nontransitory computer-readable storage medium that can direct a computer, a processor (such as processor 804) and/or other programmable apparatus (including other types of control circuitry) to function in a particular manner to thereby generate a particular article of manufacture. The article of manufacture becomes a means for implementing the functions of the actions discussed in connection with, e.g., FIG. 15 and the other methods included herein. The program code instructions may be retrieved from a computer-readable storage medium and loaded into a computer, processor, and/or other programmable apparatus to configure the computer, processor, or other programmable apparatus to execute actions to be performed on or by the computer, processor, and/or other programmable apparatus. Retrieval, loading, and execution of the program code instructions may be performed sequentially such that one instruction is retrieved, loaded, and executed at a time. In some example embodiments, retrieval, loading and/or execution may be performed in parallel by one or more machines, such that multiple instructions are retrieved, loaded, and/or executed together. Execution of the program code instructions may produce a computer-implemented process such that the instructions executed by the computer, processor, other programmable apparatus, or network thereof provides actions for implementing the functions specified in the actions discussed in connection with, e.g., process 1500 of FIG. 15.

Process 1500 starts at 1502 and waits at 1504 for the printer to receive a docking signal. The docking signal can be any type of suitable signal, such as a logical 1 signal or a logical 0 signal applied to at least one pin of the printer's electrical interface interface. In some embodiments, the docking signal may be more complex and involve, for example, bidirectional handshaking and/or execution of another type of authentication protocol, among other things.

If a docking signal has not been received at 1506, process 1500 returns to 1504 and continues to wait for a docking signal. Once a docking signal is received at 1506, in some embodiments, the printer's circuitry can wait at 1508 for a power signal before initiating wired communications through a dock (such as those discussed above). In some embodiments, the printer may receive the power signal from the dock.

If a power signal is not detected and/or received by the printer at 1510, process 1500 returns to 1508 and the printer's circuitry continues to wait. In response to determining at 1510 that a power signal has been received, the printer's processor can initiate wired communications at 1512 and begin charging the printer's batteries. For example, the printer's control circuitry (e.g., processor) may include firmware that enables the printer to determine the docked state of the printer based on, e.g., the presence or absence of external power through the dock interface. While in the docked state, the printer may be configured to enter a docked mode, in which the control circuitry can to determine whether to begin wired and/or wireless Ethernet communications. The printer's control circuitry can also be configured (based on, e.g., firmware) to determine the appropriate internet protocol address to use on each interface, in accordance with, for example, the protocol outlined in one or more Request For Comments (RFC), such as, e.g., RFC2131 (Dynamic Host Configuration Protocol). One or more other functions may also be performed at 1512, such as, e.g., conducting hardware testing (including testing, e.g., control circuitry, memory, file system integrity, and/or printhead, among other things).

In some embodiments, one or more of these steps discussed herein may also include providing visual, audible and/or tactile responses to the user. For example, a wireless icon on the printer may be removed from the display screen and/or a wired connection icon may presented. As another example, a beeping noise may occur.

At 1514, the printer's processor can cause one or more of the printer's wireless components (such as its WiFi component, BlueTooth component, and/or any other wireless components) to cease network communications. In some embodiments, one or more (other) wireless components (such as a Bluetooth component) may continue to conduct wireless network communications while the printer is docked. For example, more energy-intensive and/or longer range wireless communications may be disabled while docked, whereas less energy intensive and/or shorter range communications may continue while the printer is docked. In some embodiments, certain types of communications (such as firmware updates) may only occur while docked to conserver battery power when not docked.

In some embodiments, rather than discontinue the use of one or more components, the printer's circuitry may be configured to determine what the components are being used for and discontinue particular uses based on docked usage instructions stored in the printer's and/or any other storage device the printer's control circuitry can access. For example, in response to determining it is docked, the printer can be configured to cease WiFi communications for accessing the Internet (and instead use the dock's wired Ethernet connection), but still be configured to conduct peer-to-peer networking with other printers. In some embodiments, the printer can receive information upon being docked that informs the printer what functionality is enabled by the dock, which the printer can use to determine which functionality is to be disabled and/or enabled. For example, any functionality that may be provided through the dock may be ceased absent the dock (such as, e.g., accessing the Internet or corporate network), but any non-docked functionality enable (such as communicate with a BlueTooth slave device) the dock fails to the printer to perform may still be performed by the printer.

In addition to increasing the printer's battery life by conducting at least some types of communications using the dock (e.g., Ethernet communications, accessing the Internet, etc.), the printer may enter a docked mode at 1516. In the docked mode, the printer may be preprogrammed to, dynamically configured to, or otherwise be enabled to receive firmware and other types of updates (such as updates to firmware and/or available fonts), undergo diagnostic testing, report usage data and other information to a host device, update print formats, and be remotely controlled, among other things. In some embodiments, at 1516 the printer may notify a network host device of its docked status by generating and sending a signal (using wireless and/or wired communication protocols) indicating the printer is docked and/or has entered a docked mode. Instructions outlining the printer's docked mode may be stored locally at the printer, stored in memory included in the dock, and/or provided to the printer from a remote location in response to the printer generating and sending the docked status signal. In some embodiments, the dock may include circuitry to perform some or all of the functionality discussed herein in connection with a printer. For example, the dock may be configured to generate a docked status signal (in addition to or instead of the docked status signal generated by the printer), which is sent to a network host device.

Also, as noted above, one or more displays, sounds and/or tactile responses may be generated that indicate to the user what the printer and/or other system components are currently doing. For example, as firmware is being updated, a display may be generated and presented that indicates file downloads are in progress. If a firmware update fails (e.g., while downloading or programming thereafter), the printer can be configured to automatically revert back to the previous firmware version and/or inform the user of the failed firmware update.

In executing 1512, 1514 and 1516, while a user and/or other device may be involved in some embodiments, the printer may, for example, switch IP addresses and/or take any other action automatically and without user interaction. The transition from wireless communications to wired communications can appear seamless to the user (e.g., the user does not have to enter configuration data and/or otherwise take part in the transition for wireless to wired communications, other than physically place the printer correctly onto the dock). In some other embodiments, one or more visual indicators (e.g., light emitting devices, display screen, printing of human/machine-readable indicia, etc.), audio components (e.g., audio transducers, etc.), tactile components (e.g., vibration components, etc.), networking components, any other type of component(s), or combination thereof, can be used to indicate that the printer is properly docked, charging, executing the seamless transition, has executed the seamless transition, entered a fault state, experienced an error, any other type of information, or combination thereof.

The printer can be configured to then wait at 1518 for the docking signal to cease and/or to receive an undocked signal from the printer and/or dock. If the printer is still docked at 1520, the printer continues to wait at 1518. In response to the printer being undocked (e.g., the docking signal is no longer being received), the printer's processor and/or other circuitry can be configured to determine that the printer has been detached from the dock and is now mobile. The printer can then initiate wireless communications at 1522 and cease attempting to perform wired communications at 1524. The printer may then enter, at 1526, a mobile mode which may include, for example, activating some components (e.g., such as a global positioning system, among others) and/or enabling some functionality, and/or deactivating other components and/or functionality (e.g., dimming or turning OFF user interface components, such as display screens). In some embodiments, at 1526 the printer may notify a host by sending wireless communications indicating the printer has entered wireless mode. (In some embodiments, the dock may be configured to generate and/or send the undocking notification in response to an eject button on the dock being depressed and/or the printer otherwise unmated from the dock.) A network host device may then, for example, increase certain communications (e.g., more actively and/or frequently monitor the location of the mobile printer) and/or limit certain communications to the mobile printer (such as those involving confidential and/or executable code, among other things). Communications that were limited may be queued for future wired communications the next time the printer is docked and/or enters docked mode and checks-in with the host.

In executing 1522, 1524 and 1526, while a user and/or other device may be involved in some embodiments, the printer may, for example, switch IP addresses and/or take any other action automatically and without receiving any specific indication from a user to do so. For example, the transition from wired communications to wireless communications can appear seamless to the user, because the user does not have to enter configuration data and/or otherwise take part in the transition for wired to wireless communications, other than physically remove the printer form the dock in some embodiments. After entering the wireless mode at 1526, process 1500 can return to 1504 and operate accordingly while waiting for a docking signal.

Network, Accessory and Other Types of Interfaces

As noted above, the printer, dock, and/or other devices can include one or more electrical interface components, such as electrical contacts 904 and electrical interface component 1202, in accordance with some embodiments discussed herein. For example, electrical contacts 904 can comprise a 16-pin interface that couples with a dock as discussed above.

As referred to herein, a "pin" is an electrically conductive contact that is electrically insulated from one or more adjacent contacts. Each pin can take any suitable shape. A pin can be a flat, rectangular piece of metal, a rounded hemisphere, a long narrow cylinder and/or any other suitable shape that can facilitate "wired" communications. A 16-pin interface, for example, includes an electrical interface component that includes sixteen individual contacts that are electrically isolated or otherwise insulated from each another. As referred to herein, "wired" includes any nongaseous communication medium that can facilitate transmission of a transitory signal, such as metal and optical fiber, among other things.

Each of the interfaces discussed herein can include one or more docking indicator pins that the control circuitry can use to determine when the interface component of the printer is mated with the docking station. For example, the printer's connecting component can be configured to receive a signal (e.g., a ground signal, a high signal, etc.) over a particular pin included in the docking station's electrical interface component 1202. In some embodiments, the signal provided over the docking indicator pin can causes the printer's circuitry to generate of an interrupt command and, for example, execute at least a portion of process 1500 discussed above.

FIG. 16 shows various pin maps, namely pin map 1602, pin map 1604, pin map 1606 and pin map 1608, in accordance with some embodiments discussed herein. The pin numbers (i.e., 1-16) in each pin map of FIG. 16 collectively show an example of the relative placement of one or more pin assignments (e.g., a docked number pin may be placed at the end of a linear row of contacts and next to a positive charge pin). In some embodiments, different arrangements of the pin assignments may be used (as compared to those shown in FIG. 16) and/or one or more additional or alternative pin assignments may be included in the interface. For example, instead of two of the ground pins shown in pin map 1602, there may be a USB data pair included in the 16-pin interface.

Pin map 1602 shows an example of how a 16-pin interface can be utilized. An advantage of the 16-pin interface shown by pin map 1602 includes the ability to use an i.MX25 Ethernet port, which may include an integrated Fast Ethernet Controller (FEC), (and/or a variety of other types of ports) in one interface. Another advantage that may be appreciated by a 16-pin interface having the assignments of pin map 1602 is that QNX real time operating system firmware could be omitted from the device(s) including the 16-pin interface. Also, as shown in FIG. 16, the 16-pin interface can include one or more contacts I²C dedicated electrical contacts at pins 6 and 7. Like other interfaces discussed herein, the 16-pin interface can be implemented as a cable interface (having a male or female connector component), as metal contacts (spring loaded, embedded, or otherwise), and/or as any other type of signal carrying medium.

Pin map 1604 shows an example of how a 12-pin interface can be utilized by some embodiments discussed herein. An advantage of the 12-pin interface shown by pin map 1604 includes a relatively low docking pin count, USB host functionality may be enabled and a lower susceptibility to electrostatic discharge. In addition, if included in a dock and a printer, the 12-pin interface mapped as shown by pin map 1604 can cause the dock to bear the cost of the Ethernet-related components (as opposed to the printer).

Similar to the 16-pin interface discussed above, the 12-pin interface (and/or any other interface discussed herein) can be configured to enable, for example, the printer to conduct wired communications (via Ethernet, USB and/or other protocol) when the printer is docked and the dock is powered and/or connected to a network. Each of these interfaces may therefore be used to, for example, increase a mobile or other type of printer's battery life. In addition, for example, the printer may be connected to the Ethernet while the printer is charging through a set of contacts located in the same interface. The interface may facilitate the transfer of power used to charge a battery using, e.g., pins 2 and 3. This enables several use scenarios, including updating firmware, updating formats and uploading usage data, and other discussed herein. In other embodiments, the printer can be configured only execute some types of wireless communications when being charged by a docking station and/or charging station, such as discussed above.

Pin map 1606 shows an example of how a 19-pin interface can be utilized by some embodiments discussed herein. The advantages of the 19-pin interface shown by pin map 1606 include the ability to use an i.MX25 Ethernet port (and/or a variety of other types of ports) in one interface, the option to omit QNX firmware from the device(s) including the 19-pin interface and, if included in a dock and a printer, the 19-pin interface mapped shown by pin map 1606 can cause the dock to bear the cost of the Ethernet-related components (as opposed to the printer). Pin map 1606 can include facilitate the transfer of signals between the MAC and the PHY. Pin map 1602, for comparison, can facilitate the transfer of signals between the PHY and magnetics. As such, pin maps 1606 and 1602 can be different interfaces and comprise different sets of signals.

Pin map 1608 shows an example of how an 8-pin interface that can be utilized by some embodiments discussed herein. An advantage of the 8-pin interface shown by pin map 1608 includes a relatively low pin count, which avoids the cost of Ethernet-related components in any device that utilizes it.

While many implementations of fast Ethernet interfaces require at least three discrete components (MAC, external PHY and a combined magnetics/connector), these components may be split between printer and dock. For example, an initial implementation can include the MAC and PHY within the mobile printer, with the magnetics/connector contained in the dock (using pin map 1602). A second example implementation has the MAC within the mobile printer, with the PHY and magnetics/connector (using pin map 1606), resulting in a reduced part count inside the mobile printer, and an increased part count within the dock. A third example implementation (using pin map 1608) would not include the MAC, PHY or magnetics/connector in either the mobile printer or dock, reducing parts count in both elements.

FIG. 17 shows table 1700, which includes an "x" next to various types of communication protocols and other functions that may be facilitated by one or more types of electrical interface components, such as electrical contacts 904 and electrical interface component 1202, having varying pin counts (i.e., 15, 12, 8, 10, 13, and 5) in accordance with some embodiments discussed herein. Each "x" in FIG. 17 indicates a functionality that may be offered by a interface having the number of pins identified in the corresponding column header. For example, a battery pack may require at least four interfaces to be charged. Therefore, a electrical interface component intended to enable battery charging would need at least four pins for the battery and at least one pin to convey a docking signal (discussed further in connection with, e.g., FIG. 15) for a total of five pins.

Smart Battery

Returning to FIG. 9, battery cover 902 can protect one or more batteries and/or battery packs from which a device, such as printer 200, is configured to receive electrical power (e.g., when not properly docked). In addition to the batteries being charged while in a device, such as a printer, the batteries can be charged in a dedicated battery charging dock device. FIGS. 18A-18H show examples of battery charging dock 1800 and battery pack 1802.

Figure 18A:
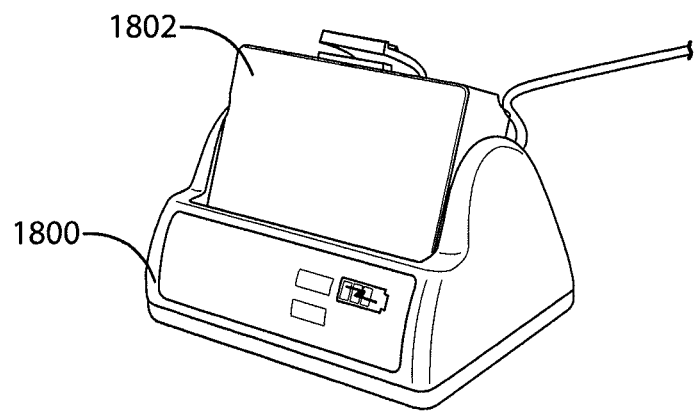
Figure 18B:
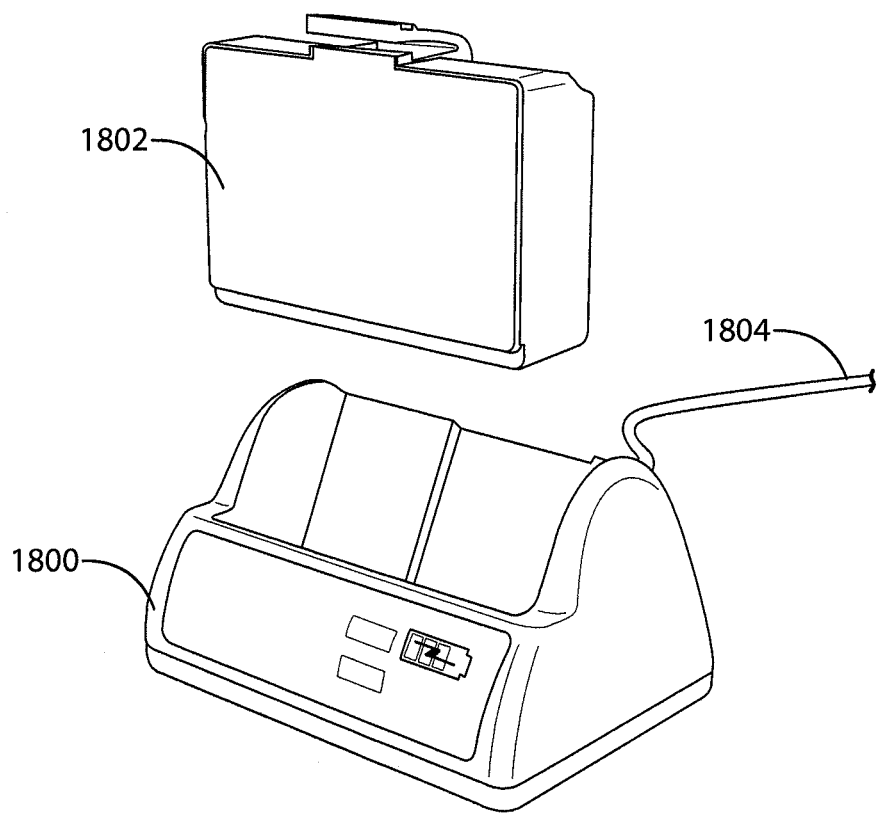
Figure 18C:
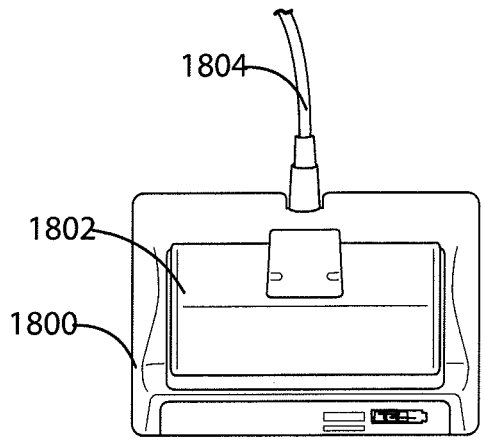
Figure 18D:
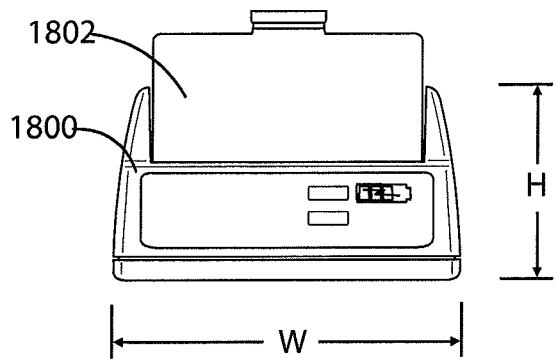
Figure 18E:
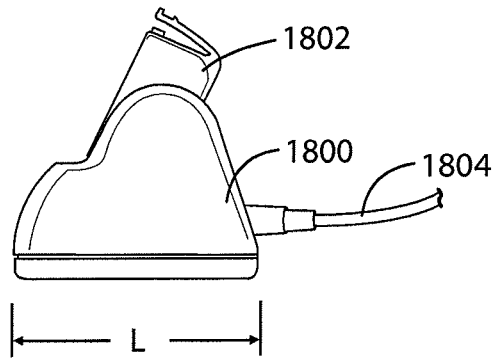

FIG. 18A shows, for example, an isometric front view of battery charging dock 1800 electromechanically coupled to battery pack 1802. While mated as shown in FIG. 18A, electricity may flow from a mains (or other) power source, through cable 1804, through battery charging dock 1800, through a interface (not shown) to battery pack 1802, thereby enabling battery charging dock 1800 to charge battery pack 1802. FIG. 18C shows a top view of battery charging dock 1800 mated to battery pack 1802.

Battery charging dock 1800 may have any suitable dimensions. For example, "W" shown in the front view of FIG. 18D may be 3.70 inches; "H" shown in FIG. 18D may be 2.08 inches; and "L" shown in the right side view of FIG. 18E may be 2.60 inches.

Figure 18F:
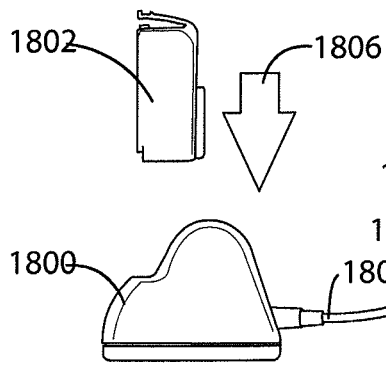
Figure 18G:
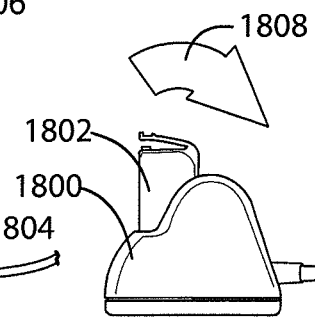
Figure 18H:
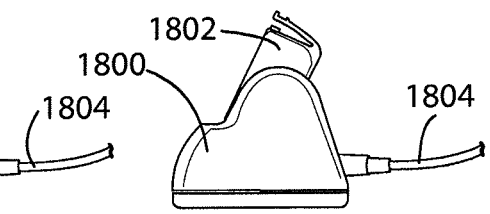

FIGS. 18F-18H show an example of how battery pack 1802 can be mated with battery charging dock 1800. Battery charging dock 1800 can include a mounting interface similar to or the same as those discussed above in connection with, e.g., battery charging dock 1800. For example, battery charging dock 1800 can include one or more curved protrusions configured to mate with a notch, slot and/or other type of receptacle included in battery pack 1802. For example, battery pack 1802 can approach battery charging dock 1800 in the direction shown by motion arrow 1806 in FIG. 18F. When battery pack 1802's mechanical interface (e.g., notches) comes into contact with the mechanical interface of battery charging dock 1800 while moving in the direction of motion arrow 1806, the mechanical interface of battery charging dock 1800 can cause battery pack 1802 to move in the direction of motion arrow 1808 shown in FIG. 18G. When mated, battery pack 1802 may rest on battery charging dock 1800 as shown in right-side view of FIG. 18H.

In some embodiments, battery pack 1802 may include one or more smart batteries that include circuitry enabling battery pack 1802 to communicate with a network via battery charging device 1800. In this regard, battery pack 1802 can be tracked similar to or the same as printers consistent with, e.g., the fleet management examples discussed further below. For example, charging device 1800 may include control circuitry and/or communications circuitry, which can be configured to facilitate wired data communications (via, e.g., cable 1804) and/or wireless communications (such as those discussed herein).

Some printers, docks and/or other battery charging devices in accordance with embodiments discussed herein may be configured to use and/or charge various types of battery packs that may have differing voltage outputs and/or other functionality (such as, e.g., smart functionality). Accordingly, such printers, docks and/or other charging devices may also be adapted to mechanically, electrically, and/or electromechanically recognize if a higher power battery is inserted therein (e.g., behind battery cover 902 shown in FIG. 9) and adjust the charging device's functionality automatically. For example, a printer may be configured to operate effectively with batteries configured to provide a 4.2 volt output ("4.2 volt batteries") as well as with batteries configured to provide a 4.3 volt output ("4.3 volt batteries"). In such embodiments, charging circuitry, such as charging circuitry 1902 shown in FIGS. 19A and 19B, may be included in a printer (such as printers 100, 200 and/or 800), a dock (such as docking unit 1200, docking unit 1220 and/or docking station 1300) and/or any other charging device. Charging circuitry 1902 can then enable the charging device to automatically detect the type of battery installed (e.g., either a 4.2 volt battery or a 4.3 volt battery), which can enable the printer (or other device) to adjust various printing and other settings and/or perform other functionality (such as facilitate the transfer of information from a smart battery to a remotely located network device). When in a printer, for example, charging circuitry 1902 may be circuitry (such as circuitry 1018) coupled to and/or included within the printer's control circuitry (such as, e.g., processor 804).

FIG. 19A shows charging circuitry 1902 coupled to battery pack 1904. Charging circuitry 1902 may have at least three pins couple to battery pack 1904. For example, charging circuitry 1902 may use its positive pin, negative pin and temperature pin when battery pack 1904 is installed. Charging circuitry 1902 may have at least one additional pin, a chemistry pin, which is not used with battery pack 1904. In response to determining the battery is installed and chemistry pin is unused, charging circuitry 1902 can be configured to determine that battery pack 1904 is a first type of battery pack. For example, charging circuitry 1902 can be configured to determine that battery pack 1904 includes two 4.2 volt batteries and that battery pack 1904 lacks the circuitry and/or other functionality to be a smart battery. As another example, charging circuitry 1902 can be configured to determine that battery pack 1904 lacks smart-battery capabilities (some examples of which are discussed herein). As a result, charging circuitry 1902 may access memory (such as memory 806), retrieve and execute instructions for standard charging and facilitate the charging of battery pack 1904 in accordance with the standard charging instructions (such as at 8.4 volts for two 4.2 volt batteries).

FIG. 19B shows charging circuitry 1902 coupled to battery pack 1906. Unlike battery pack 1904, charging circuitry 1902 may determine that its chemistry pin is being used with battery pack 1906. For example, in 4.3 volt and/or smart battery applications, the battery may ground the chemistry pin. As another example, the battery may provide a positive voltage to the chemistry pin. In response to determining the chemistry pin is being used, charging circuitry 1902 can be configured to determine that battery pack 1906 is a second type of battery pack. For example, charging circuitry 1902 can be configured to determine that battery pack 1906 includes two 4.3 volt batteries and/or that battery pack 1906 includes the properly programmed circuitry to function as a smart battery. As a result, charging circuitry 1902 may access memory (such as memory 806), retrieve a smart battery charging parameter and facilitate the charging of battery pack 1904 in accordance with the standard parameter (such as at 8.6 volts for two 4.3 volt batteries). In some embodiments, specific smart batteries may be configured to instruct charging circuitry 1902 what voltage to charge the smart battery with, which may enable charging circuitry 1902 to charge the smart battery without accessing its own memory.

In addition to or instead of retrieving charging parameters, the charging device may be configured to enter a smart battery and/or higher voltage mode (and/or any other type of mode associated with the particular battery pack and/or type of battery pack). Instructions describing functionality associated with the mode can be stored in memory (that is, e.g., included in the printer, included in the battery, and/or stored remotely at a network database). As noted above, a smart battery, for example, can provide a higher voltage and include its own circuitry (e.g., control circuitry, communications circuitry and/or memory, among other things), and the smart battery mode of the charging device can cause the device to be configured to utilize these features of the smart battery. For example, a smart battery can provide additional information to a printer, which the printer may be configured to process and/or transmit (e.g., relay) to the network for fleet management purposes, some examples of which are discussed below.

As another example, when the chemistry pin is unused (and/or any other indication is given), the device can determine the battery is of a traditional type and be configured to operate in a traditional battery mode. While in the traditional battery mode, the device can draw or provide power without attempting further communications with the battery. The amount of power drawn or provided can also be determined by the parameters associated with traditional battery mode. For example, the traditional battery mode may draw or provide less power from/to the battery than when in smart battery mode. Instructions describing the parameters and other functionality associated with the traditional battery mode can be stored in memory (that is, e.g., included in the printer and/or stored remotely at a network database).

The printer, such as printers 100, 200 and/or 800, can also be configured to execute some or all of process 2000 of FIG. 20 using its circuitry (such as circuitry 1018 and/or processor 804). Process 2000 starts at 2002 and proceeds to 2004 at which a battery is received by the printer. For example, the battery is installed behind cover 902 into battery pack container 1008 at 2004.

At 2006, the printer can query (e.g., wait to receive a power signal, a grounded signal, etc) a designated input pin/port (such as the chemistry pin of the printer's battery interface) and/or otherwise wait to receive a hardware interrupt from a smart battery. In some embodiments, the printer may need to be receiving power (from the battery and/or another source) before executing 2006. For example, when a smart battery is installed at 2004, such as lithium ion battery with smart technology (e.g., equipped with memory, an integrated circuit, and/or transponder), the smart battery may be configured to ground the printer's chemistry pin, whereas when a legacy or other type of battery is installed the printer's chemistry pin may not make electrical contact with a the battery and/or may not be grounded by the battery even if contact is made.

At 2008, when a hardware interrupt and/or other type of signal is received by the printer at the chemistry pin, process 2000 proceeds to 2010 at which the printer determines that the battery is a smart battery. In some embodiments, although not shown in FIG. 20, the printer can be configured to authenticate the smart battery before proceeding. If the battery is authenticated, the battery parameters, including current charge status, whether or not the batter is charging, battery life status, battery serial number and/or any other information provided by the battery can be stored by the printer, uploaded to a remote device and/or otherwise made available should a device request and/or user request to the information. (Similarly, other information stored on the printer and/or remotely may be made available in response to a request for the information.) If the battery cannot be authenticated, the printer's operations can be disabled and/or an error message can be displayed, and process 2000 can end or proceed to 2018 (skipping 2014).

At 2012, the printer may store in memory an indication that the currently installed battery is a smart batter. The printer may also take other actions it is configured to execute, such as notify a host or other device information related to the smart battery installed and/or facilitate network access for each smart battery.

At 2014, the printer can be configured to utilize various features provided by the smart battery. For example, the printer's circuitry (e.g., processor 804, communications interfaces 808 and/or circuitry 1018) may communicate with each smart battery and, in response, receive information regarding each smart battery's remaining charge, operating temperature, and/or other battery data. As long as the battery is not removed at 2016 from the printer, the printer can be configured to continue to utilize the features enabled by the smart battery. After at least one smart battery is removed at 2018, the printer will wait at 2020 to receive another battery and process 2000 can then return to 2004 once the new battery is received. In some embodiments, the printer may be configured to utilize some smart battery-related functionality even if the battery is removed (such as if, e.g., the battery has its own wireless communications interface).

Subsequent to receiving a battery at 2004, querying the input pin/port at 2006, and not receiving the expected signal at 2008, the printer can be configured to determine at 2020 that the battery lacks properly functioning smart battery capabilities. As long as the battery is not removed at 2022 from the printer, the printer can be configured to continue to utilize the battery (e.g., draw power from the battery). After the battery is removed at 2022, the printer will wait at 2024 to receive another battery and process 2000 can then return to 2004 when the new battery is received.

Print Server

In some embodiments, one or more printers in a network of devices (wired and/or wireless) can be configured to function as a print server for one or more other printers connected to either the print server's USB host port, Bluetooth, serial port or other type of port (which may be separate from or in addition to the interface components discussed in connection with FIG. 16). In some embodiments, while functioning as a print server, the printer can continue to function as a printer (e.g., print and/or encode indicia onto media). Furthermore, one or more slave printer(s) receiving commands from the print server device can act as a pass thru to the next printer in a "daisy chain" configuration, thus creating a small virtual network of printers (such as a print cluster). As shown in FIG. 21, a host device can be configured to communicate with more than one print server device, which in turn each communicate with one or more printer slave devices.

For example, in FIG. 21, Printer 1 can communicate with the host device over an 802.11 or other type of wireless or wired connection and act as a Bluetooth master to slave devices, Printers 1A. The hose device may be, for example, a remotely located network device (such as a network server, personal computer, handheld device, cellular phone and/or other computing device), among other things. As such, printers 1A can be paired to Printer 1 as Bluetooth slave devices. This can enable, among other things, a group of people functioning independent of wires to conduct inventory control in a retail store and/or warehouse. More or less than two slave devices may communicate with Printer 1 via Bluetooth and/or other type of communications. Printer 1 can also be enabled to act as an access point for a wireless print cluster comprising two Printers 1A as shown in FIG. 21.

As another example, Printer 2 can be docked and connected to the host device using a wired connection. Printer 2 can also include a USB host port and any necessary hardware, software and/or firmware. Printer 2A can be connected to Printer 2's USB host port and also have a USB host port and any necessary hardware, software and/or firmware. Printer 2B can be connected to Printer 2A, thereby creating a daisy chain connection to the host device via USB (P2 USB Host→P2A USB P2, P2 USB Host→P2B USB P2A, etc). This can allow Printer 2 to forward data from the network to any printer in the daisy chain.

In some embodiments, Printer 2 may connect wirelessly to the host device, and be used to provide, for example, multi-printing at a mobile print cart. For example, each printer in the daisy chain can be configured print a different color label. The printer daisy chain may also be established using a multi-printer docking station, such as those discussed above, using I²C (which may be provided using, e.g., pins 6 and 7 of the interfaces discussed in connection with FIG. 16).

As another example, the print server device, Printer 3, can be connected to the host device via a wired connection (e.g., through a dock) and communicate with slave devices, Printers 3A, wirelessly. Other combinations and/or types of connections may also be used to enable a print server network.

Remote Serviceability and Fleet Management

As discussed above, some docking stations in accordance with embodiments discussed herein may have a wired Ethernet and/or other network connection, such as those shown in connection with, e.g., FIG. 16. When docked, the wireless connection of the printer may be automatically disabled and the wired connection enabled as discussed above in connection with, e.g., FIG. 15. The printer can then be updated and maintained while the battery is being charged. One of the advantages to updating and maintaining printers while being charged includes utilizing time that may otherwise be down time for the printer. This, in addition to other configurations, methods and features discussed herein, can facilitate the maximization of the usable run time of the printers.

As noted above, the printer can seamlessly transition from wireless to wired communications in response to being placed properly (or otherwise) in the docking station. Likewise, a seamless transition from wired to wireless communications may occur in response to the printer being removed from the docking station. An input pin on the docking interface can be used to detect when the printer is in the docking station. The printer's interface making electrical contact with the input pin of the docking station can be used to generate an interrupt (referred to as a docking signal) that can be used to disable one or more of the wireless communications interface and enable the wired communications interface.

Printer system software management systems and methods can enable printers to, for example, download firmware, update configurations, download fonts, and perform remote diagnostics. The ability to manage printers remotely can be used to provide support to printers potentially having operational issues and also find aging batteries for replacement before the batteries cease to work properly and cause unexpected printer downtime. Remote diagnostics can comprise, for example, battery management, such as remotely determining battery charge levels, battery health (e.g., good, replace, poor), battery age, and whether battery reconditioning is required, among other things. Remote diagnostics can also comprise monitoring printer status (e.g., out of paper, head latch open, printing, media cover open, network status, peeler sensor blocked, peeler bar engaged, among other things), print server device status, environmental conditions (e.g., temperature, humidity, supplied power, among other things detected by one or more sensors), and/or any other information that may improve printer and/or network device performance.

Remote serviceability may be available to a mobile printer while the mobile printer is docked and/or otherwise connected to the Ethernet or other type of network as discussed above. In some embodiments, remote serviceability may only be enabled while connected to a docking station owned or associated with a particular user and/or mobile printer. Remote serviceability can facilitate fleet management of a plurality of mobile printers, including monitoring, tracking, analyzing historical information associated with mobile printers (such as information related to the battery charging of mobile printers). Monitoring, tracking, and analyzing historical information can be assisted by providing each mobile printer and/or one or more components of each mobile printer a unique identifier (such as a battery identifier, printer identifier, radio identifier, location identifier, Ethernet dock identifier, among others). System software management (such as generation of reports) can also be provided with other fleet management services. In some embodiments, a printer 200 having wireless connectivity may be configured to act as a print server for non-wireless printers that may be connected to the same Ethernet or other network to which printer 200 is connected.

CONCLUSION

Various other features for, modifications to and other embodiments of the inventions set forth herein will come to mind to one skilled in the art to which these inventions pertain having the benefit of the teachings presented in the foregoing descriptions and the associated drawings. For example, while examples discussed herein are often related to mobile printers, one skilled in the art would appreciate that other types of printers, such as desktop or less mobile printers, as well as other types of devices may benefit from embodiments discussed herein. Therefore, it is to be understood that the inventions are not to be limited to the specific embodiments disclosed and that modifications and other embodiments are intended to be included herein. Although specific terms are employed herein, they are used in a generic and descriptive sense only and not for purposes of limitation.

That which is claimed is:

1. A printer, comprising:
a wireless communications component;
an interface component configured to:
couple with a dock; and
facilitate a wired network connection; and
control circuitry configured to:
determine when the interface component is mated with the dock;
in response to determining the interface component is mated with the dock:
cease wireless communications with the wireless communications component; and
facilitate wired communications with a remote network server via the interface component, wherein the wired communications include information related to remote management of the printer.

2. The printer of claim 1, wherein:
the printer further comprises a battery; and
the control circuitry is further configured to:
determine whether the battery is to be charged via the interface component; and
in response to determining the battery is to be charged, facilitate charging of the battery.

3. The printer of claim 1, wherein:
the primer further comprises a battery pack, including:
a battery module including a positive terminal and a negative terminal; and
a charging dock interface including:
a positive contact connected with the positive terminal;
a negative contact connected with the negative terminal; and a chemistry contact connected with one of the positive terminal and the negative terminal; and the control circuitry is further configured to:
 determine whether the battery pack is to be charged via the interface component; and
 in response to determining the battery pack is to be charged, facilitate charging of the battery pack.

4. The printer of claim 1, wherein the control circuitry is further configured to determine the interface component is mated with the dock in response to receiving a signal from a docking indicator pin included in the interface component.

5. The printer of claim 4, wherein the signal causes generation of an interrupt command.

6. The printer of claim 1, wherein the control circuitry is further configured to initiate wireless communications using the wireless communications component in response to determining the interface component has been unmated with the dock.

7. The printer of claim 6, wherein the control circuitry is further configured to determine that the interface component has been unmated with the dock in response to receiving a low signal from a docking indicator pin included in the interface component.

8. The printer of claim 1, wherein the wired communications further include at least one of:
 downloading of printer firmware;
 determining whether an update is available for the printer;
 downloading of at least one of printer fonts and graphics;
 facilitating diagnostic testing of the printer from a remote machine; or
 providing technical support to the printer using the remote machine.

9. The printer of claim 1, wherein the wired communications further include battery information including at least one of:
 an age of the battery;
 a charge level of the battery;
 a health indicator for the battery; or
 an indication as to whether reconditioning is recommended for the battery.

10. The printer of claim 1, wherein the wired communications further include the control circuitry providing information about a status of the printer to a remote machine.

11. A method, comprising:
 coupling a printer with a dock;
 facilitating a wired network connection;
 determining when an interface component of the printer is mated with the dock;
 in response to determining the interface component is mated with the dock:
  ceasing wireless communications with a wireless communications component; and
  facilitating wired communications with a remote network server via the interface component, wherein the wired communications include information related to remote management of the printer.

12. The method of claim 11 further comprising:
 determining whether a battery is to be charged via the interface component; and
 in response to determining the battery is to be charged, facilitating charging of the battery.

13. The method of claim 11 further comprising:
 determining whether a battery pack is to be charged via the interface component, wherein the battery pack includes:
  a battery module including a positive terminal and a negative terminal; and
  a charging dock interface including:
   a positive contact connected with the positive terminal;
   a negative contact connected with the negative terminal; and
   a chemistry contact connected with one of the positive terminal and the negative terminal; and
 in response to determining the battery pack is to be charged, facilitating charging of the battery pack.

14. The method of claim 11 further comprising determining the interface component is mated with the dock in response to receiving a signal from a docking indicator pin included in the interface component.

15. The method of claim 14 further comprising generating an interrupt command in response to the signal.

16. The method of claim 11 further comprising initiating wireless communications using the wireless communications component in response to determining the interface component has been unmated with the dock.

17. The method of claim 16 further comprising determining that the interface component has been unmated with the dock in response to receiving a low signal from a docking indicator pin included in the interface component.

18. The method of claim 11, wherein the wired communications further include at least one of:
 downloading of printer firmware;
 updating printer configurations;
 downloading of at least one of printer fonts and graphics;
 facilitating diagnostic testing of the printer from a remote machine; or
 providing technical support to the printer using the remote machine.

19. The method of claim 11, wherein the wired communications further include battery information including at least one of:
 an age of the battery;
 a charge level of the battery;
 a health indicator for the battery; or
 an indication as to whether reconditioning is recommended for the battery.

20. The method of claim 11, further comprising providing information about a battery to a remote machine by providing information about a status of the printer to a remote machine.

* * * * *